United States Patent [19]

Ochiai

[11] Patent Number: 5,561,039
[45] Date of Patent: Oct. 1, 1996

[54] SILVER HALIDE PHOTOGRAPHIC LIGHT-SENSITIVE MATERIAL

[75] Inventor: Yoshiro Ochiai, Kanagawa, Japan

[73] Assignee: Fuji Photo Film Co., Ltd., Kanagawa, Japan

[21] Appl. No.: 458,245

[22] Filed: Jun. 2, 1995

[30] Foreign Application Priority Data

Aug. 17, 1994 [JP] Japan .................................. 6-215315

[51] Int. Cl.$^6$ ................................ G03C 1/12; G03C 1/09
[52] U.S. Cl. ....................... 430/575; 430/584; 430/604; 430/605; 430/611
[58] Field of Search ............................... 430/584, 603, 430/611, 604, 605, 575, 582, 576

[56] References Cited

U.S. PATENT DOCUMENTS

| | | | |
|---|---|---|---|
| 5,110,719 | 5/1992 | Shuto et al. | 430/608 |
| 5,223,389 | 6/1993 | Matsunaga et al. | 430/584 |
| 5,290,675 | 3/1994 | Hioki et al. | 430/584 |

FOREIGN PATENT DOCUMENTS

| | | |
|---|---|---|
| 4146428 | 5/1992 | Japan . |
| 1412462 | 7/1992 | WIPO . |

*Primary Examiner*—Thorl Chea
*Attorney, Agent, or Firm*—Sughrue, Mion, Zinn, Macpeak & Seas

[57] ABSTRACT

A silver halide photographic light-sensitive material. It comprises a support and at least one silver halide emulsion layer thereon, wherein at least one silver halide emulsion layer comprises silver chlorobromide emulsion particles containing 95 mol % or more of silver chloride or silver chloride emulsion particles as well as at least one thiosulfonic compound of formula (X) and at least one sulfinic compound of formula (Y), and the particles contained in the silver halide emulsion layer are sensitized by gold, selenium, or tellurium, and are spectrally sensitized by a red-sensitive methine dye represented by formula (I):

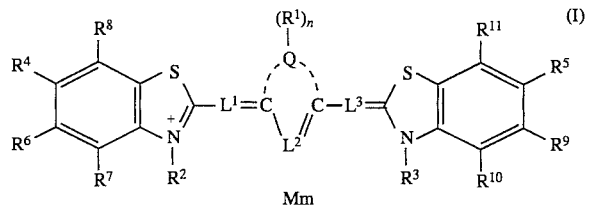

$$R^{21}-SO_2S-M^{21} \qquad (X)$$

$$R^{22}-SO_2-M^{22} \qquad (Y)$$

wherein Q, $R^1$ and other symbols each independently represents a specific atom or group, n is an integer from 0 to 6, M is a counter ion which neutralizes an electric charge, and m is 0 or 1.

21 Claims, No Drawings

SILVER HALIDE PHOTOGRAPHIC LIGHT-SENSITIVE MATERIAL

BACKGROUND OF THE INVENTION

1. Field of the Invention

The present invention relates to a silver halide photographic light-sensitive material, and particularly to a silver halide photographic light-sensitive material exhibiting high sensitivity, reduced fogging, and in addition, with reduced variation in sensitivity when time passes from exposure to development.

2. Description of the Related Art

There are various silver halide photographic light-sensitive materials currently available from the market and methods of forming images thereon. They are used in wide fields. In recent years, there are stronger needs for enhancing a quick processing performance of color printing papers, and thus many studies have been conducted. It has already been known that when the silver chloride content in silver halide emulsion to be used is increased, developing speed is dramatically enhanced. In the market, emulsions used for color printing papers have come to contain richer silver chloride.

Moreover, in response to diversified needs of users, a variety of print sizes with greater magnifications such as a panorama size, a high-vision size, etc. have come to be easily obtained. In order not to impair productivity in cases where such prints with greater magnifications are exposed, techniques for improving sensitivity of light-sensitive materials are still more desired. However, in the manufacture of silver halide emulsions with a high silver chloride content, there is a drawback that ordinary chemical sensitization hardly permits production of emulsions with high sensitivity. Accordingly, in silver chloride-rich emulsions, attempts have been made to enhance their sensitivities.

Among the attempts, it has conventionally been known that incorporation of silver halide emulsion which has undergone chemical sensitization with a gold, selenium, or tellurium compound into a light-sensitive material is effective for achieving high sensitivity. (See, for example, U.S. Pat. No. 2,642,361, JP-B-43-13,489, and Canada Patent No. 800,958.) However, light-sensitive materials containing silver halide emulsions which have been chemically sensitized sometimes cause considerable fogging despite their improved sensitivity. Therefore, it is necessary that some measure must be taken to reduce fogging.

For example, azaindenes, azoles, heterocyclic mercapto compounds and thioketo compounds are known as antifoggants. Particularly, it is known that mercapto compounds such as metcaptothizoles, mercaptobenzothiazoles, mercaptobenzimidazoles, mercaptothiadiazoles, mercaptotetrazoles, and mercaptopyrimidines are effective.

U.S. Pat. No. 3,047,393 and JP-B-58-27,486 disclose the use of thiosulfonic compounds as antifoggants.

In addition, U.S. Pat. No. 2,394,198 and WO No. 92-12,462 disclose a method of preventing fogging by combined use of a thiosulfonic compound and a sulfinic compound.

The present inventors used the above techniques to investigate both high sensitization and reduction in fogging of red-sensitive emulsions by gold, selenium and tellurium. As a result, it was confirmed that there was obtained an effect of reducing fogging when the above-mentioned mercapto compounds or thiosulfonic compound was used. However, the effect was not at a sufficient level.

On the other hand, when a thiosulfonic compound and a sulfinic compound were used in combination, fogging was remarkably reduced. In these attempts, there occurs a drawback that considerable variation in sensitivity is caused when time passes from exposure to development.

SUMMARY OF THE INVENTION

An object of the present invention is to provide a silver halide photographic light-sensitive material exhibiting high sensitivity and reduced fogging.

Another object of the present invention is to provide a silver halide photographic light-sensitive material exhibiting reduced variation in sensitivity when time passes from exposure to development.

The above-described objects have been effectively accomplished by a silver halide photographic light-sensitive material comprising a support and at least one silver halide emulsion layer thereon, wherein at least one silver halide emulsion layer comprises silver chlorobromide emulsion particles containing 95 mol % or more of silver chloride or silver chloride emulsion particles as well as at least one thiosulfonic compound of formula (X) and at least one sulfinic compound of formula (Y), and wherein the particles contained in the silver halide emulsion layer are sensitized by gold, selenium, or tellurium, and are spectrally sensitized by a red-sensitive methine dye represented by the following formula (I):

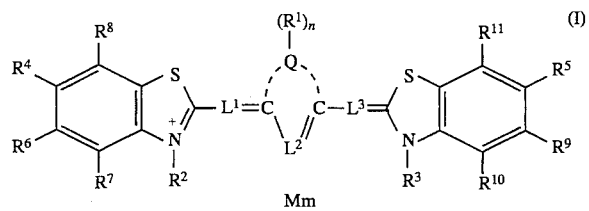

wherein Q represents a group of non-metal atoms necessary for forming a 5- or 6- membered ring, $R^1$, $R^2$, $R^3$, $R^4$, $R^5$, $R^6$, $R^7$, $R^8$, $R^9$, $R^{10}$, and $R^{11}$ each independently represents a hydrogen atom or a substituent, provided that at least one of $R^1$, $R^2$ and $R^8$ is a group containing an aromatic group and that both $R^4$ and $R^5$ are not hydrogen atoms, $L^1$, $L^2$, and $L^3$ each independently represents a methine group, n is an integer from 0 to 6, M is a counter ion which neutralizes an electric charge, and m is 0 or 1.

$$R^{21}\text{—}SO_2S\text{—}M^{21} \qquad (X)$$

$$R^{22}\text{—}SO_2\text{—}M^{22} \qquad (Y)$$

wherein $R^{21}$ and $R^{22}$ each independently represents an aliphatic group, an aromatic group, or a heterocyclic group, and $M^{21}$ and $M^{22}$ each independently represents a cation.

The present invention will next be described in more detail.

Specific examples of sensitizers for effecting gold sensitization in the present invention include chloroauric acid, potassium chloroaurate, potassium aurithiocyanate, gold sulfide, gold selenide, and other gold compounds disclosed, for example, in U.S. Pat. No. 2,642,361, 5,049,484, and 5,049,485.

In selenium sensitization, unstable selenium compounds may be used which include those described, for example, in JP-B-43-13,489, JP-B-44-15,748, JP-A-4-25,832, JP-A-4-109,240, JP-A-271,341, and EP-A-0,506,009.

Specific examples of the unstable selenium compounds include colloidal metallic selenium, selenoureas (such as N,N-dimethylselenourea, trifluoromethylcarbonyl-trimethylselenourea, and acetyl-trimethylselenourea), selenoamides (such as selenoacetamide and N,N-diethylphenylselenoamide), phosphine selenides (such as triphenylphosphine selenide and pentafluorophenyltriphenylphosphine selenide), selenophosphates (such as tri-p-tolylselenophosphate and tri-n-butylselenophosphate), selenoketones (such as selenobenzophenone), isoselenocyanates, selenocarboxylic acids, seleno esters, and diacyl selenides. Moreover, non-unstable selenium compounds such as selenious acid, potassium selenocyanide, selenazoles, and selenides described in JP-B-46-4,553 and JP-B-52-34,492 may also be used.

In tellurium sensitization, unstable tellurium compounds may be used which include those described, for example, in Canada Patent No. 800,958, British Patent Nos. 1,295,462, 1,396,696, JP-A-4-204,640, JP-A-4-271,341, JP-A-4-33,043, and JP-A-5-303,157.

Specific examples of the unstable tellurium compounds include tellurourcas (such as tetramethyltellurourea, N,N'-dimethylethylene tellurourea, N,N'-diisopropylphosphine telluride, tributylphosphine telluride, tributoxyphosphine telluride, and ethoxy-diphenylphosphine telluride), diacyl(di)tellurides (such as bis(diphenylcarbamoyl)-ditelluride, bis(N-phenyl-N-methylcarbamoyl)ditelluride, bis(N-phenyl-N-methylcarbamoyl)telluride, bis(ethoxycarbonyl)telluride, isotellurocyanates, telluro amides, tellufo hydrazides, telluro esters (such as butylhexyl tellufo ester), tellufo ketones (such as telluroacetophenone), colloidal tellurium, (di)tellurides, and other tellurium compounds (such as potassium telluride and sodium telluropentathionate).

These chemical sensitizers may be used singly or in combinations of two or more. It is also preferable that they are used along with any agent for sulfur sensitization or reduction sensitization. In the present invention, it is preferred that gold sensitization be used.

The amount of a gold sensitizer used in the present invention is preferably in the order of $10^{-7}$ mol to $10^2$ mol per mol of silver halide. No particular limitation is imposed on the conditions of chemical sensitization which may be used in the present invention. pAg is generally from 5 to 9, and preferably from 6 to 8.5. pH is preferably from 4 to 10. Temperature is generally from 40° to 95° C., and preferably from 45° to 85° C.

The amount of the selenium sensitizer and tellurium sensitizer used in the present invention varies depending on the type of silver halide particles and chemical sensitizing conditions to be employed. It is generally from $10^{-8}$ mol to $10^{-2}$ mol, preferably from $10^{-7}$ mol to $10^{-3}$ mol, per mol of silver halide.

In the present invention, a thiosulfonic compound and a sulfinic compound may be added at any step of the manufacture process. Alternatively, they may be added independently at different steps. The manufacture process of silver halide particles includes steps of formation of particles, physical ripening, desalting, dispersing, chemical sensitization, and Preparation of final emulsion ready for being applied to a support. It is particularly preferred that both the two compounds are co-present during the step of forming silver halide particles or the step of chemical sensitization.

Next, thiosulfonic compounds represented by formula (X) and sulfinic compounds represented by formula (Y) will be described in detail.

In formulas (X) and (Y), aliphatic groups represented by $R^{21}$ and $R^{22}$ include linear, branched, or cyclic alkyl, alkenyl, or alkynyl. Although their carbon numbers are not particularly limited, preferred are the numbers of carbon atom(s) that permit the compounds to dissolve in water; organic solvents such as lower alcohols (such as methanol or ethanol) and ethyl acetate; or mixtures of these solvents.

Examples of the aromatic groups represented by $R^{21}$ and $R^{22}$ include phenyl and naphthyl. As for the heterocyclic groups represented by $R^{21}$ and $R^{22}$, 5- to 7- membered rings containing, as hetero atom(s), at least one atom selected from nitrogen, oxygen, and sulfur atoms are preferred. These rings may be saturated or unsaturated. Other ring such as a benzene ring may be condensed.

Substituents capable of being substituted in these aliphatic groups, aromatic groups, and heterocyclic groups are not particularly limited with respect to the number and kind thereof. However, it is preferred that the substituents be such ones as promote the dissolution of the compounds in water, organic solvents and solvent mixtures as mentioned above, or at least such ones as do not obstruct the dissolution.

Examples of the substituents include alkoxy, aryl, alkyl, halogen, amino, carboxyl, hydroxyl, and heterocyclic.

Examples of the cations represented by $M^{21}$ and $M^{22}$ include alkali metal ions (such as $Li^+$, $Na^+$, $K^+$) and ammonium ions ($NH_4^+$ and tetraethylammonium ion).

Specific examples of the thiosulfonic compounds and sulfinic compounds are shown below.

  $CH_3SO_2SNa$ (X-1)

  $C_2H_5SO_2SNa$ (X-2)

  $C_2H_5SO_2SK$ (X-3)

  $C_4H_9SO_2SLi$ (X-4)

  $C_6H_{13}SO_2SNa$ (X-5)

  $C_8H_{17}SO_2Na$ (X-6)

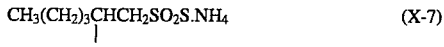  $CH_3(CH_2)_3\underset{|}{\overset{}{C}}HCH_2SO_2S\cdot NH_4$ (X-7)
  $\quad\quad\quad C_2H_5$

  $C_{10}H_{21}SO_2SNa$ (X-8)

  $C_{12}H_{25}SO_2SNa$ (X-9)

  $C_{16}H_{33}SO_2SNa$ (X-10)

 (X-11)

  $t\text{-}C_4H_9SO_2SNa$ (X-12)

  $CH_3OCH_2CH_2SO_2S\cdot Na$ (X-13)

 (X-14)

  $CH_2\!=\!CHCH_2SO_2SNa$ (X-15)

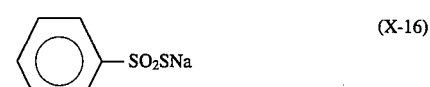 (X-16)

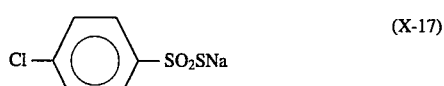 (X-17)

5

-continued

CH₃CONH—⟨phenyl⟩—SO₂SNa (X-18)

CH₃O—⟨phenyl⟩—SO₂SNa (X-19)

H₂N—⟨phenyl⟩—SO₂SNa (X-20)

CH₃—⟨phenyl⟩—SO₂SNa (X-21)

HO₂C—⟨phenyl⟩—SO₂SK (X-22)

⟨phenyl with COOH⟩—SO₂S⁻·(C₂H₅)₄N⁺ (X-23)

HO—⟨phenyl with CH₃⟩—SO₂SNa (X-24)

⟨benzothiazole⟩—SO₂SNa (X-25)

CH₃—⟨benzoxazole⟩—SO₂SNa (X-26)

⟨pyridine⟩—SO₂SK (X-27)

O⟨morpholine⟩N—(CH₂)₃SO₂SNa (X-28)

The amount of the thiosulfonic compound is generally from $1\times10^{-6}$ mol to $3\times10^{-4}$ mol, preferably from $3\times10^{-6}$ mol to $8\times10^{-5}$ mol per mol of silver halide.

CH₃SO₂.Na (Y-1)

C₂H₅SO₂.Na (Y-2)

C₂H₅SO₂.K (Y-3)

C₄H₉SO₂.Li (Y-4)

C₆H₁₃SO₂.Na (Y-5)

C₈H₁₇SO₂.Na (Y-6)

CH₃(CH₂)₃CHCH₂SO₂NH₄ (Y-7)
        |
        C₂H₅

C₁₀H₂₁SO₂.Na (Y-8)

6

-continued

C₁₂H₂₅SO₂.Na (Y-9)

C₁₆H₃₃SO₂.Na (Y-10)

(CH₃)₂CH—SO₂K (Y-11)

t-C₄H₉SO₂.Na (Y-12)

CH₃OCH₂CH₂SO₂.Na (Y-13)

⟨phenyl⟩—CH₂SO₂.K (Y-14)

CH₂=CHCH₂SO₂.Na (Y-15)

⟨phenyl⟩—SO₂.Na (Y-16)

Cl—⟨phenyl⟩—SO₂.Na (Y-17)

CH₃CONH—⟨phenyl⟩—SO₂.Na (Y-18)

CH₃O—⟨phenyl⟩—SO₂.Na (Y-19)

H₂N—⟨phenyl⟩—SO₂.Na (Y-20)

CH₃—⟨phenyl⟩—SO₂.Na (Y-21)

HO₂C—⟨phenyl⟩—SO₂.K (Y-22)

⟨phenyl with COOH⟩—SO₂⁻·(C₂H₅)₄N⁺ (Y-23)

HO—⟨phenyl with CH₃⟩—SO₂.Na (Y-24)

⟨benzothiazole⟩—SO₂.Na (Y-25)

CH₃—⟨benzoxazole⟩—SO₂.Na (Y-26)

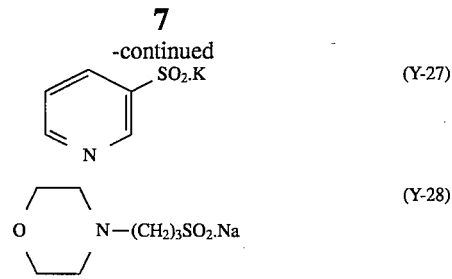

-continued (Y-27)

(Y-28)

The amount of the sulfinic compound is generally from $1\times10^{-6}$ mol to $3\times10^{-4}$ mol, preferably from $3\times10^{-6}$ mol to $8\times10^{-5}$ mol per mol of silver halide.

Next, the red-sensitive spectral sensitizing dye represented by formula (I) will be described in detail.

In formula (I), Q represents a group of non-metal atoms necessary for forming a 5- or 6- membered carbon ring or heterocyclic ring.

Preferably, Q is a propylene group substituted by a group $(R^1)_n$, in which $R^1$ is described below.

$R^1$ may be an alkyl group having 18 or less carbon atoms (e.g. methyl, ethyl, propyl, isopropyl, allyl, butyl, isobutyl, hexyl, octyl, dodecyl, and octadecyl), which may have a substituent such as carboxyl, sulfo, cyano, nitro, halogen, hydroxyl, C1–C8 alkoxy (e.g. methoxy, ethoxy, benzyloxy, phenethyloxy), C1–C15 aryloxy (e.g. phenoxy and 1-nephthyloxy), C1–C8 acyloxy (e.g. acetyloxy), C1–C8 acyl, sulfamoyl, carbamoyl, C1–C15 aryl (e.g. phenyl, 4-methylphenyl, 4-chlorophenyl, and 1-naphthyl). $R^1$ may also be C1–C18 aryl (e.g. phenyl, 2-naphthyl, and 1-naphthyl), which may have a substituent (e.g. carboxyl, sulfo, cyano, nitro, halogen, hydroxyl, C1–C8 alkyl e.g. methyl and ethyl, C1–C8 alkoxy such as methoxy and ethoxy, C1–C15 aryloxy such as phenoxy, C1–C8 acyloxy such as acetyloxy, C1–C8 acyl, sulfamoyl, carbamoyl, C1–C15 aryl such as phenyl. (The symbol "Cp-Cq" wherein p and q are numbers means the number of p-q carbon atoms.) $R^1$ may also be C1–C18 heterocyclic group such as 2-pyridyl, 2-thiazolyl, and 2-furyl, which may be substituted. $R^1$ may also be C1–C10 alkenyl group such as vinyl, which may have a substituent such as methyl and phenyl. $R^1$ may also be C1–C6 alkynyl group such as ethynyl, which may be substituted by a substituent such as methyl and phenyl.

Preferably, $R^1$ is unsubstituted alkyl (e.g. methyl, ethyl, propyl, and butyl), or unsubstituted aryl (e.g. phenyl and 1-naphthyl). Among them, methyl, ethyl, phenyl, naphthyl are particularly preferred.

n is an integer from 0 to 6. When $R^1$ is methyl, n is preferably 2. When $R^1$ is an aromatic group such as phenyl or naphthyl, n is preferably 1.

$R^2$ and $R^3$ each independently represents C1–C18 alkyl (e.g. methyl, ethyl, propyl, isopropyl, allyl, butyl, isobutyl, hexyl, octyl, dodecyl, and octadecyl), which may be substituted by a substituent listed for the alkyl group of $R^1$.

In $R^2$ and $R^3$, preferable examples of unsubstituted alkyl include methyl and ethyl, whereas preferable examples of substituted alkyl include phenoxyethyl, 1-naphthoxyethyl, 2-naphthoxyethyl, 4-phenylphenoxyethyl, and methoxyethyl.

In the present invention, it is necessary that at least one of $R^1$, $R^2$ and $R^3$ contains an aromatic group Preferably, the aromatic group is a carbon ring or a heterocyclic ring such as phenyl, naphthyl, pyridyl, thienyl, pyrrolyl, biphenyl, and phenoxyphenyl. These groups may further be substituted.

$R^4$ and $R^5$ each independently represents hydroxyl, cyano, halogen, sulfo, carboxyl, or nitro. They may also be, substituted or unsubstituted, alkyl, alkenyl, acyl, acyloxy, alkoxycarbonyl, carbamoyl, sulfamoyl, acylamino, alkoxy, aryloxy, alkylthio, arylthio, alkylsulfonamide, arylsulfonamide, ureido, alkylsulfonyl, arylsulfonyl, aryl, or heterocyclic.

$R^4$ and $R^5$ are usually C1–C18 alkyl (e.g. methyl, ethyl, propyl, and 2-methoxyethyl), C1–C18 alkenyl (e.g. vinyl and styryl), halogen (e.g. chlorine and bromine), C1–C8 acyl such as acetyl, C1–C8 acyloxy such as acetyloxy, C1–C8 alkoxycarbonyl such as methoxycarbonyl, C1–C8 carbamoyl such as N-methylcarbamoyl, C1–C8 sulfamoyl such as N-methylsulfamoyl, carboxyl, C1–C8 alkylsulfonamide such as methanesulfonamide, C1–C8 acylamino such as acetylamino, C1–C15 alkoxy (e.g. methoxy, ethoxy, benzyloxy, and phenethyloxy), C1–C15 aryloxy such as phenoxy, C1–C8 alkylthio (e.g. methylthio and ethylthio), C1–C15 arylthio such as phenylthio, C1–C12 arylsulfonamide such as benzenesulfonamide, ureido, C1–C8 alkylsulfonyl (e.g. methanesulfonyl and ethylsulfonyl), C1–C15 arylsulfonyl (e.g. benzenesulfonyl and p-toluenesulfonyl), C1–C15 aryl (e.g. phenyl, 4-methylphenyl, 4-chlorophenyl, and 2-naphthyl), nitro, sulfo, or C1–C15 heterocyclic (e.g. morpholino and 2-pyridyl. These substituents may further be substituted.

Preferably, $R^4$ and $R^5$ are methyl, ethyl, methoxy, and ethoxy. Among them methyl is particularly preferred.

The groups represented by $R^6$ to $R^{11}$ include hydrogen in addition to the exemplary groups of $R^4$ and $R^5$ described above.

$R^4$ may be linked with $R^6$ or $R^8$ whereas $R^5$ may be linked with $R^9$ or $R^{11}$ to respectively form a cyclohexene ring, an aromatic ring, or a heterocyclic ring.

Preferably, $R^6$ to $R^{11}$ are hydrogen, methyl, ethyl, methoxy, or ethoxy. Hydrogen is particularly preferred.

$L^1$, $L^2$, and $L^3$ each independently represents a methine group which may be substituted. Examples of the substituent include alkyl (e.g. methyl, ethyl, and 2-carboxyethyl), aryl such as phenyl, halogen such as chlorine, alkoxy such as methoxy and ethoxy, amino such as N,N-diphenylamino, N-methyl-N-phenylamino, and N-methylpiperadino. One methine group may be linked to other methine groups or atomic groups as in combinations of $L^1$ and $L^2$, $L^2$ and $L^3$, $L^1$ and Q, or $L^3$ and Q, to form a ring, or alternatively, may form a ring together with $R^2$ or $R^3$. Preferably, $L^1$, $L^2$, and $L^2$ are unsubstituted methine.

M and m are included in the formula when they are necessary to neutralize the ion charge of the dye in order to indicate the presence or absence of cations or anions. Whether a dye is cationic or anionic, or whether it has net ion charge(s) or not is determined depending on charge(s) of its auxochrome and substituents.

Typical examples of cations include an ammonium ion and alkali metal ion. Anions may be inorganic or organic ones. Examples of the anions include halogen anions (such as fluorine ion, chlorine ion, bromine ion, and iodine ion), substituted arylsulfonic ion (such as p-toluenesulfonic ion and p-chlorobenzenesulfonic ion), aryldisulfonic ion (such as 1,3-benzenesulfonic ion, 1,5-naphthalenedisulfonic ion, and 2,6-naphthalenedisulfonic ion), alkyl sulfuric ion(such as methyl sulfuric ion), sulfuric ion, thiocyanic ion, perchloric ion, tetrafluoroboric ion, picric ion, acetic ion, and trifluoromethanesulfonic ion. M may be two or more species of electron-neutralizing ions. When a part of $R^1$ to $R^{11}$ is substituted with a carboxyl group or a sulfonic group, the substituted moieties per se function as anion M. In this case, therefore, m may be 0.

Preferably, the anion is perchloric ion, iodine ion, bromine ion, or substituted arylsulfonic ion (such as p-toluenesulfonic ion).

Specific examples of the compounds of formula (I) according to the present invention will be given hereinbelow. However, the compounds of formula (I) in the present invention are not limited by the illustrated examples.

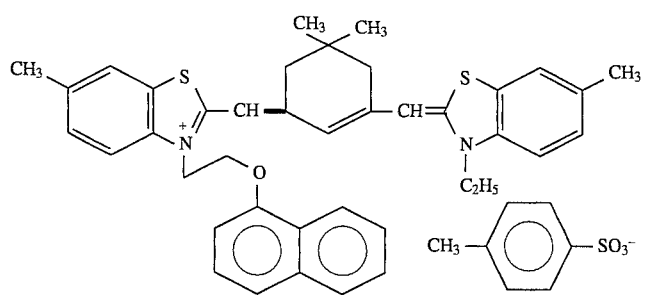
A-1
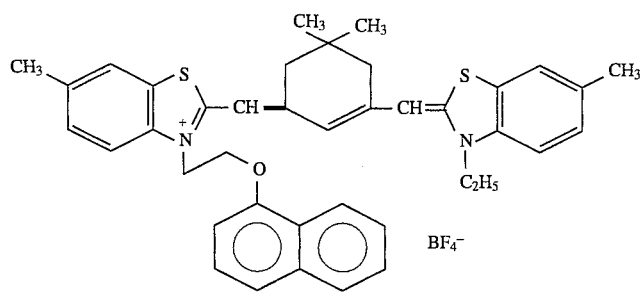
A-2
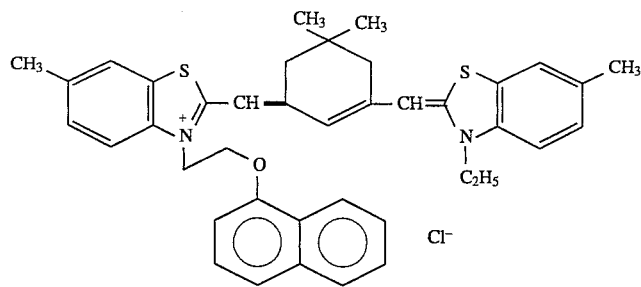
A-3
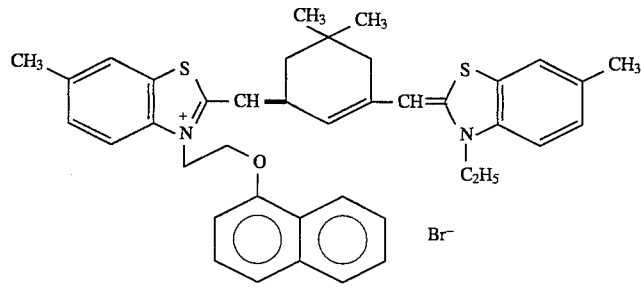
A-4
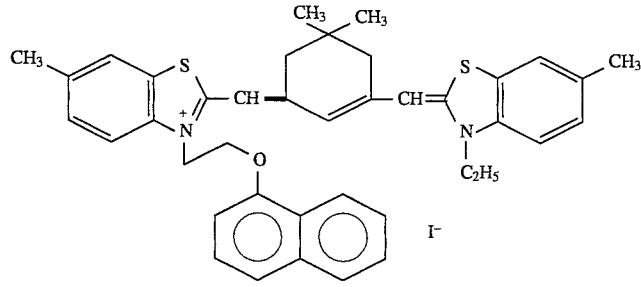
A-5

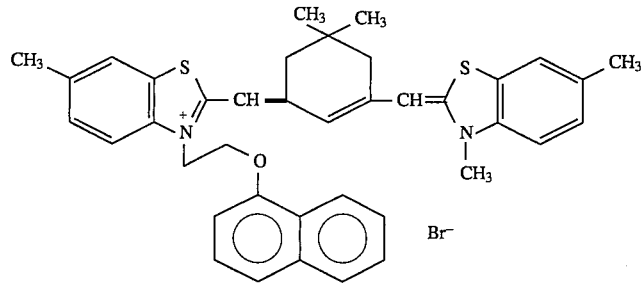
A-6
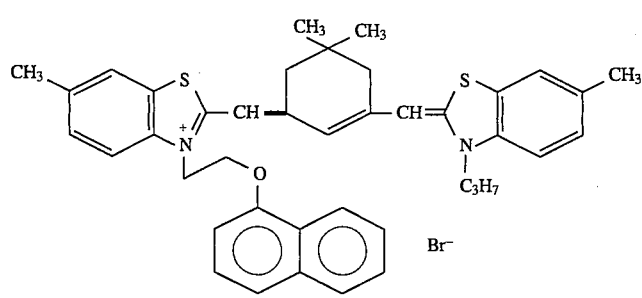
A-7
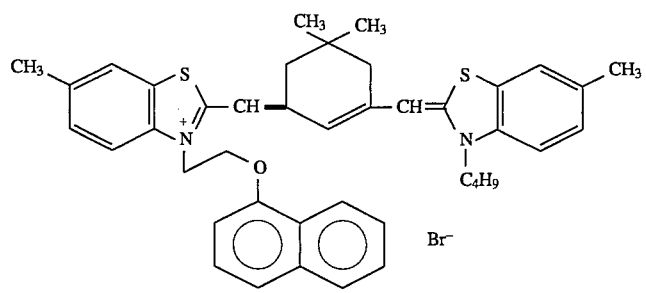
A-8
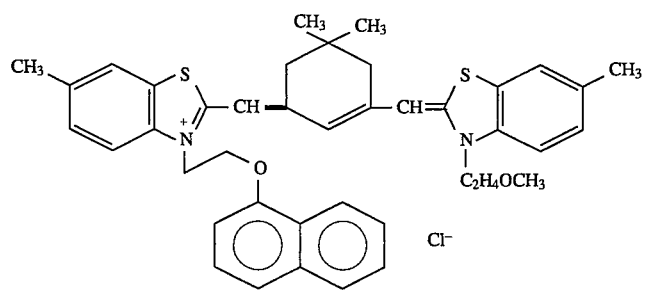
A-9
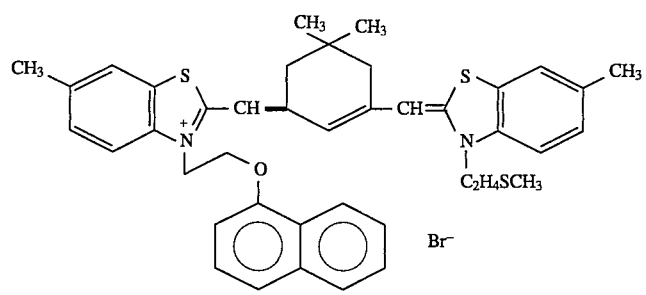
A-10

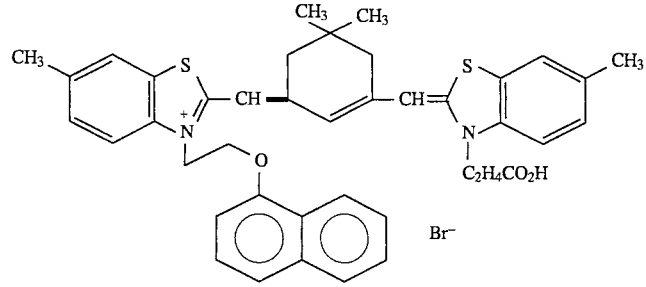
A-11
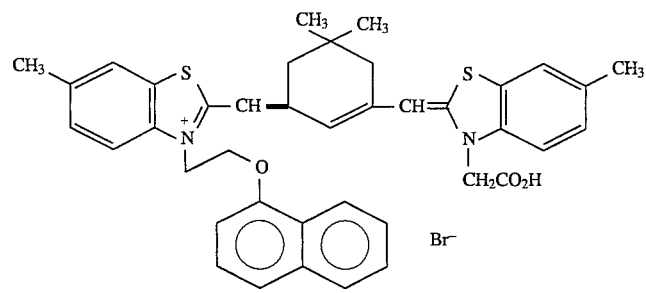
A-12
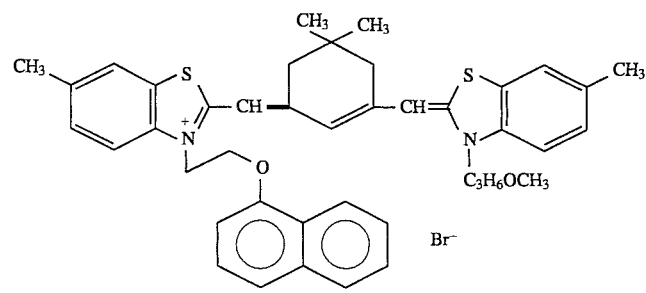
A-13
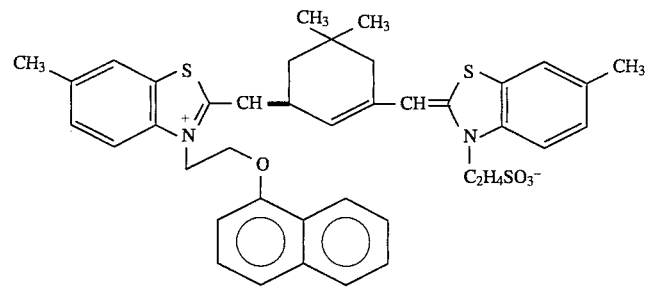
A-14
A-15

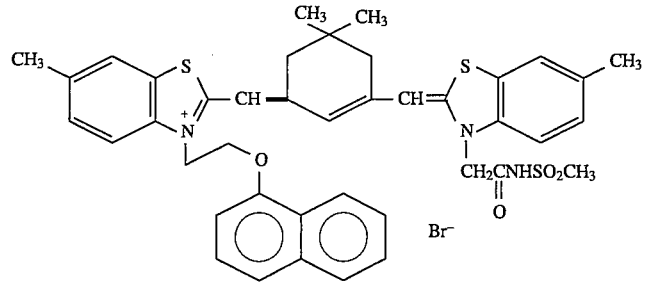
A-16
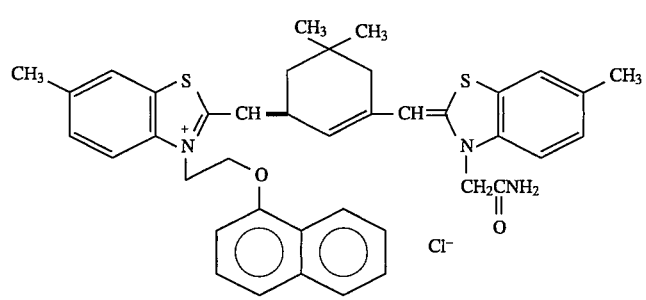
B-1
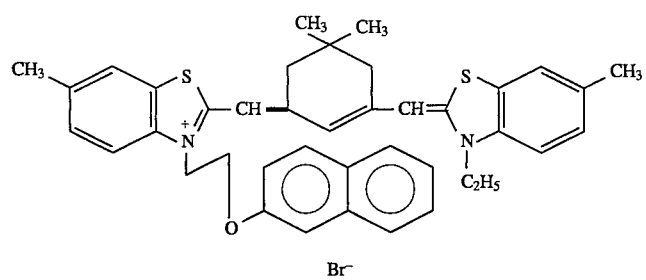
B-2
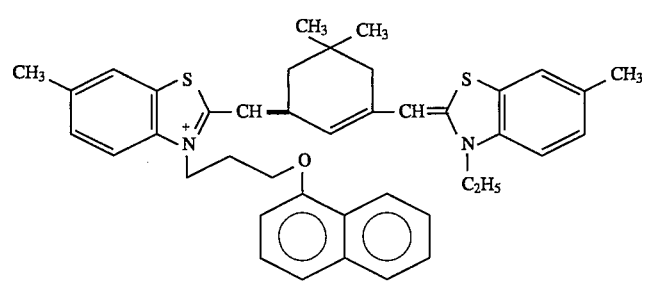
B-3
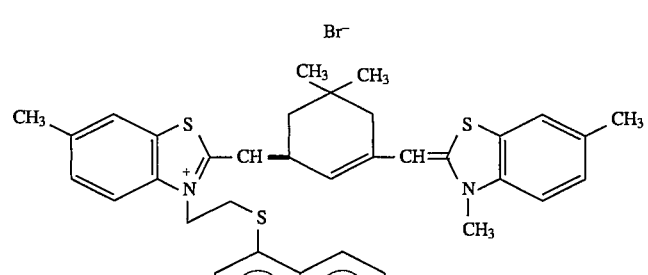
B-4

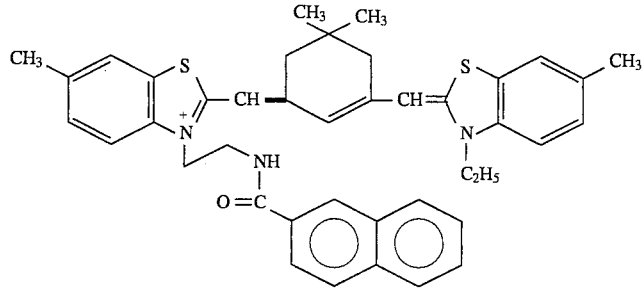
B-5
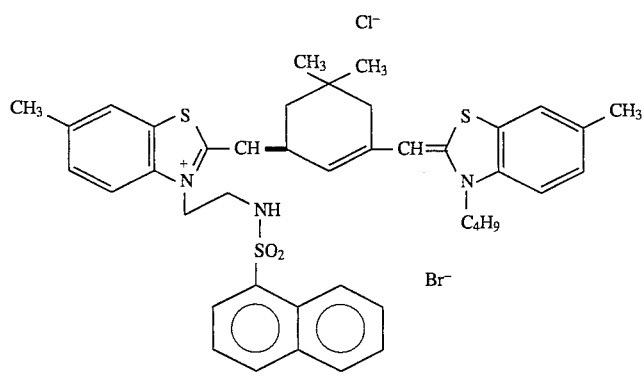
B-6
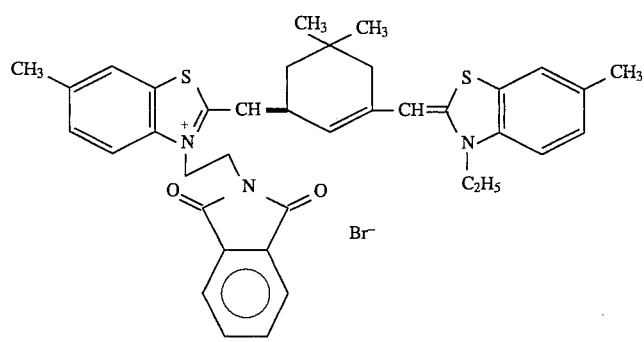
B-7
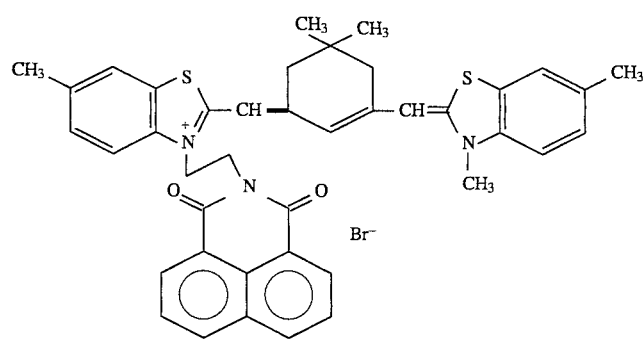
B-8
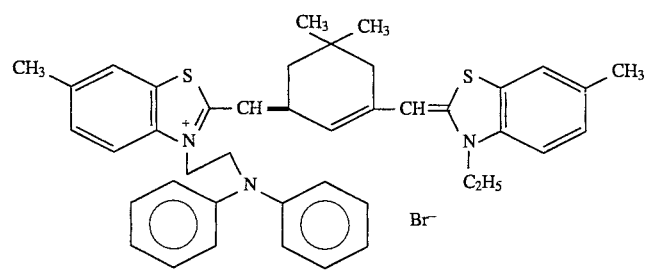
B-9

-continued
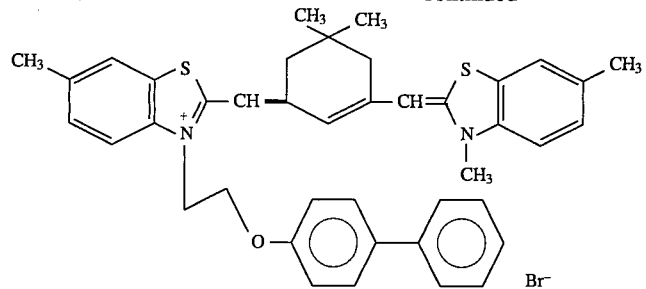
B-10
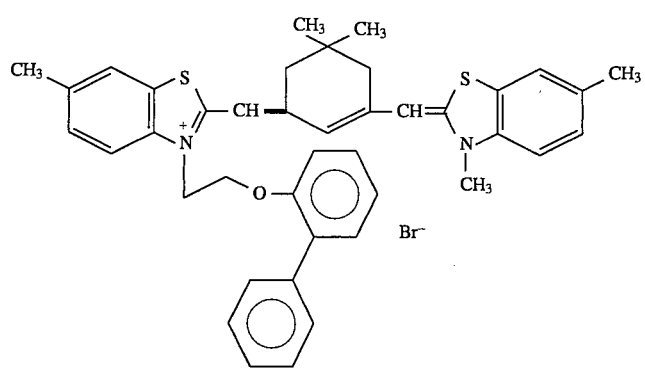
B-11
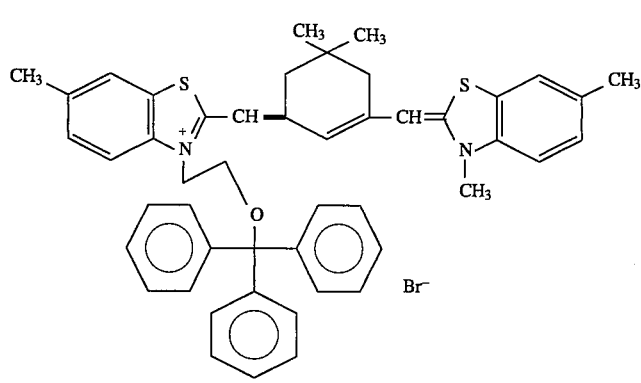
B-12
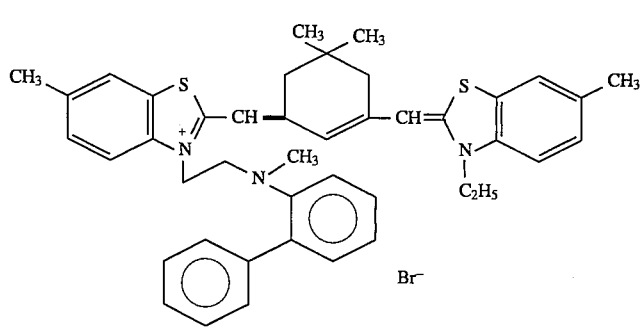
B-13
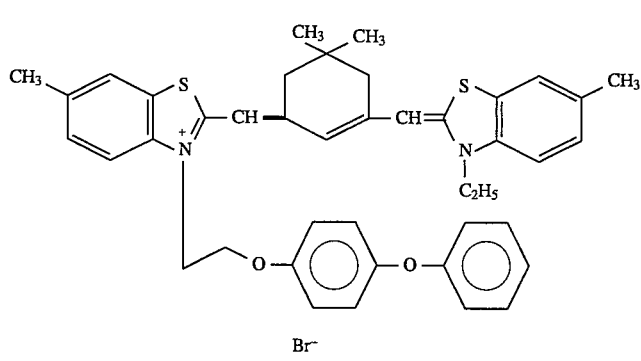
B-14

-continued
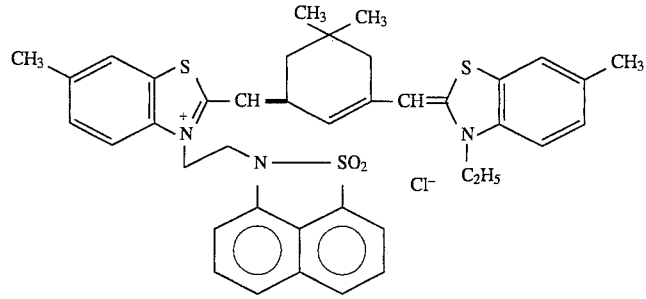
B-15
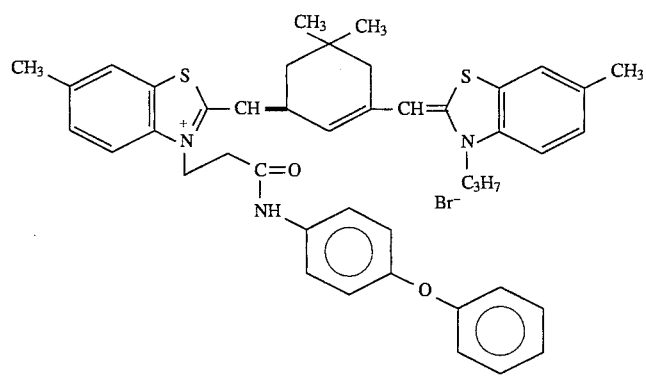
B-16
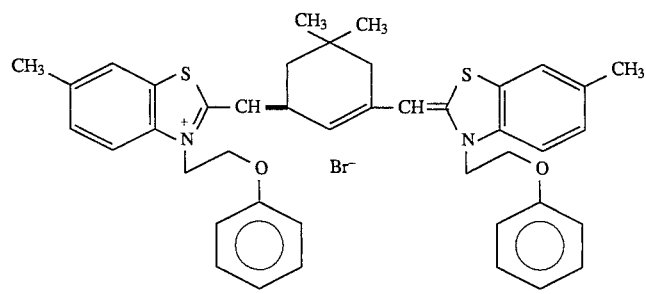
C-1
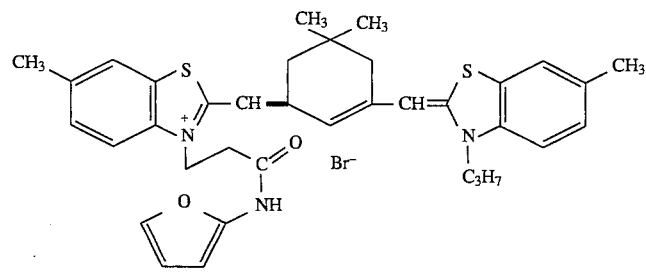
C-2
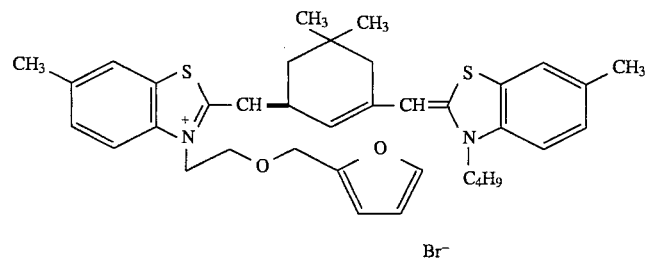
C-3

C-4
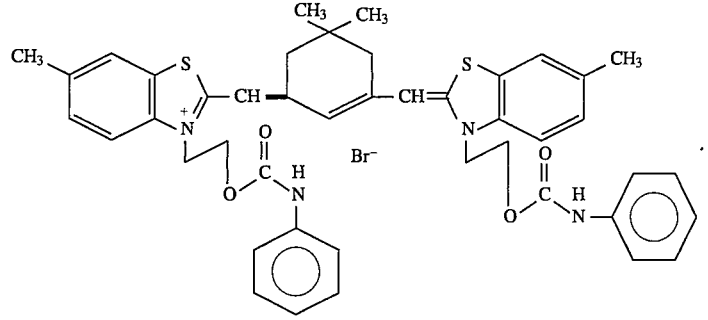
C-5
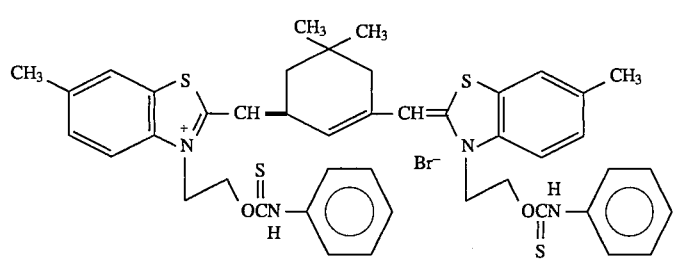
C-6
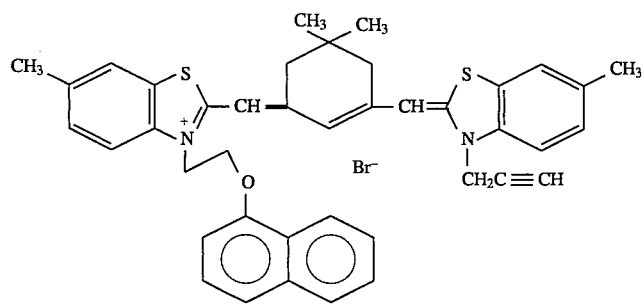
C-7
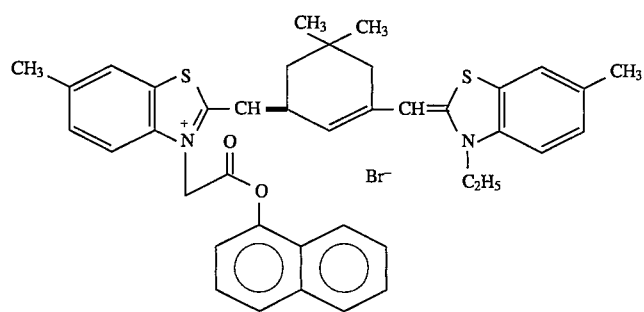
C-8
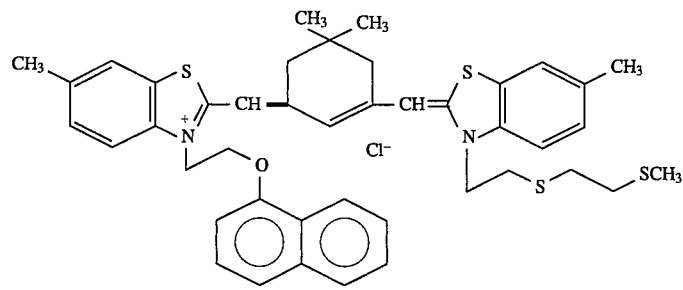

-continued
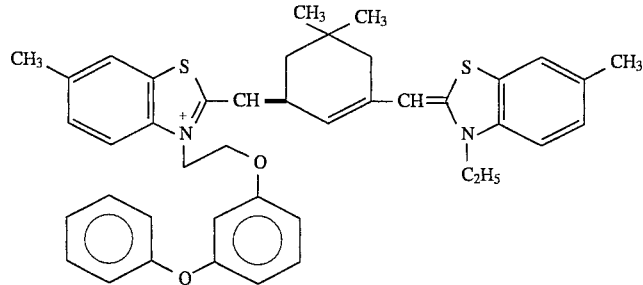
C-9
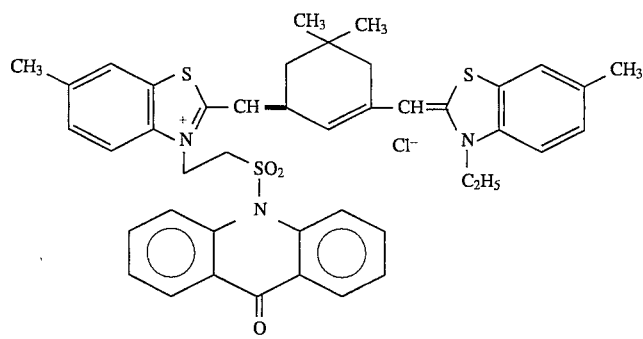
C-10
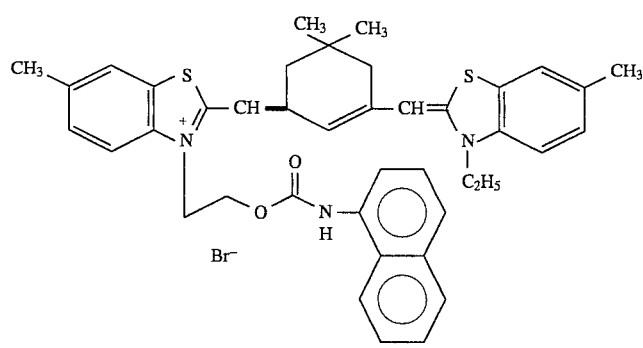
C-11
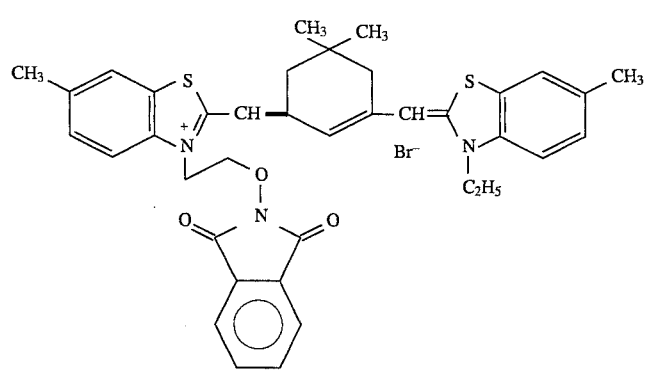
C-12
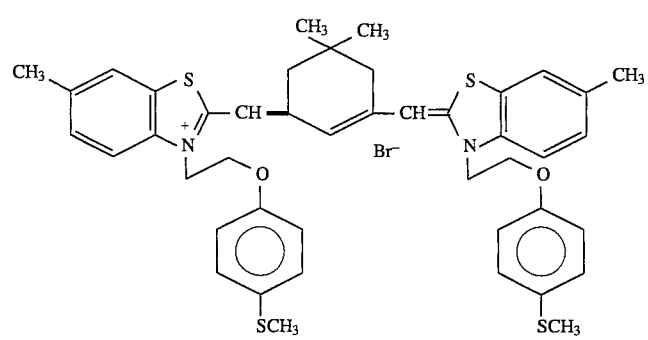
C-13

C-14
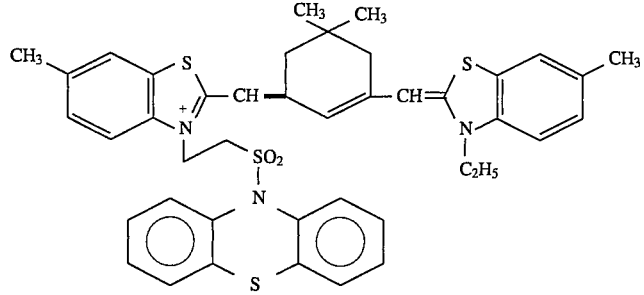
C-15
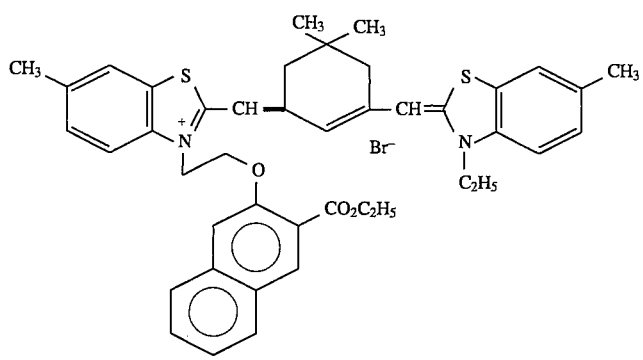
C-16
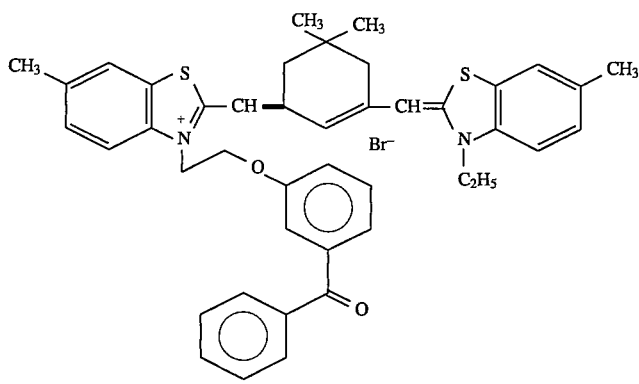
D-1
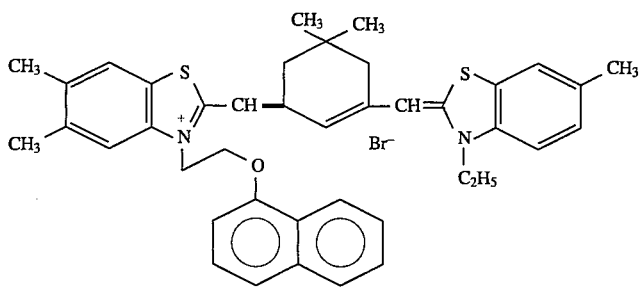
D-2
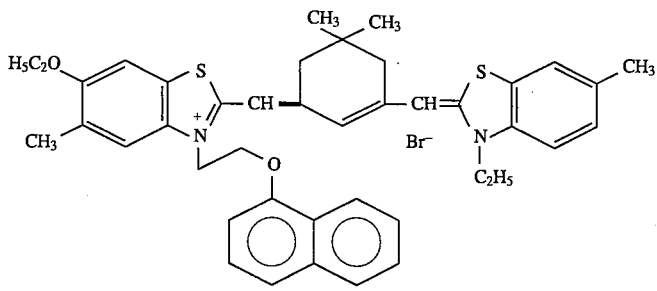

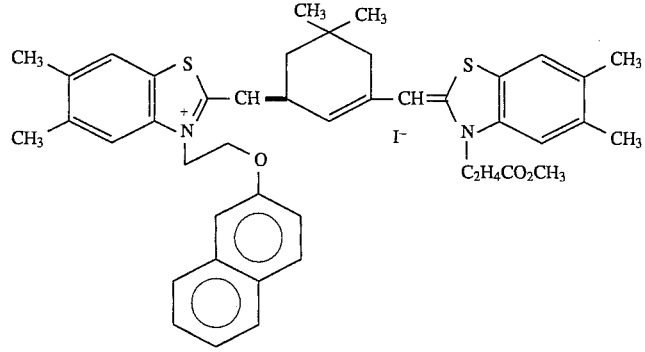
D-3
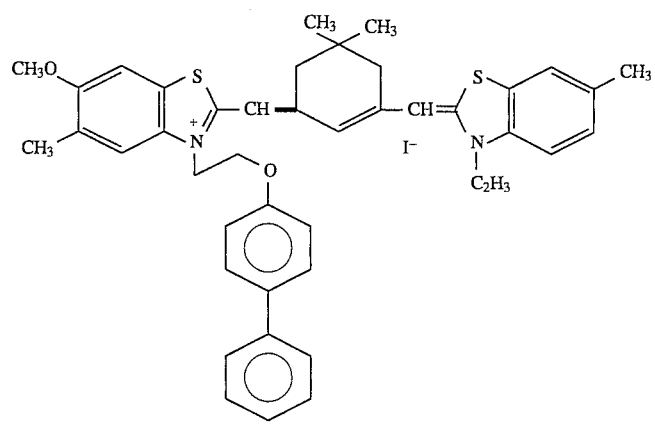
D-4
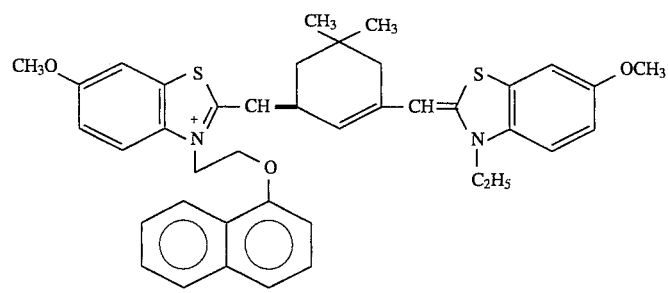
D-5
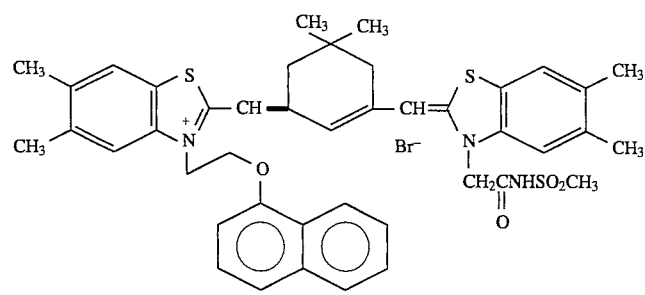
D-6
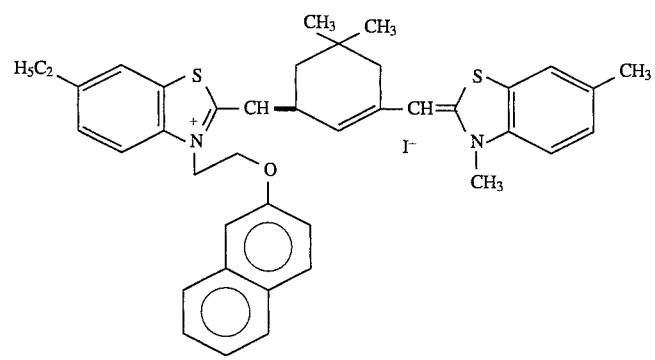
D-7

-continued
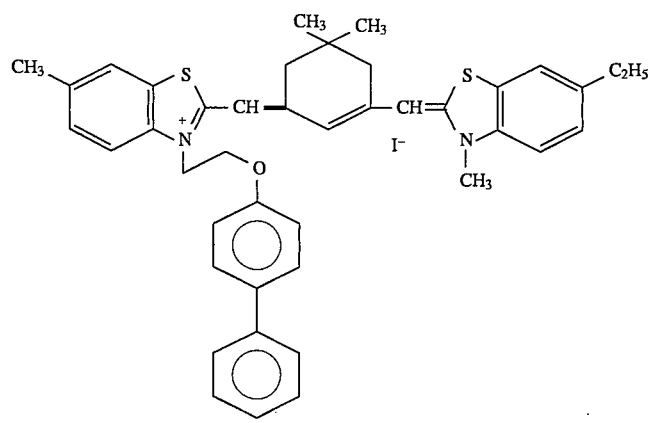
D-8
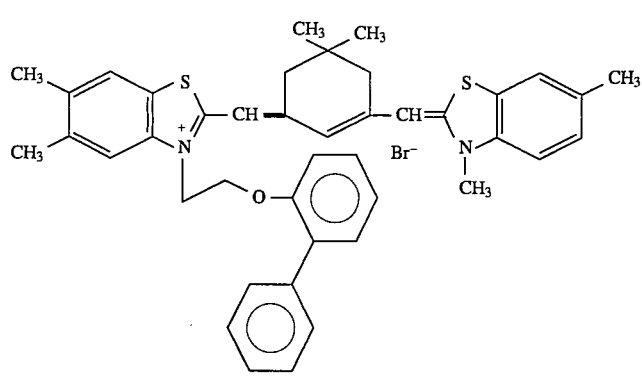
D-9
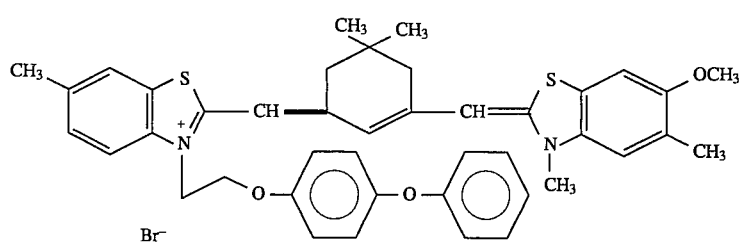
D-10
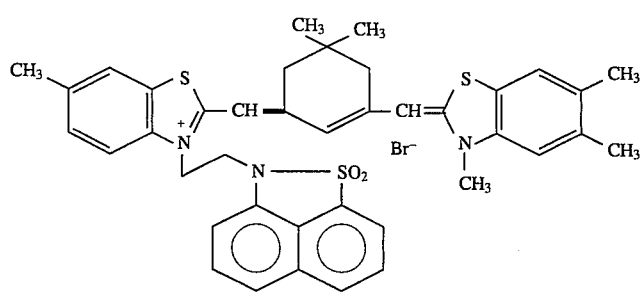
D-11
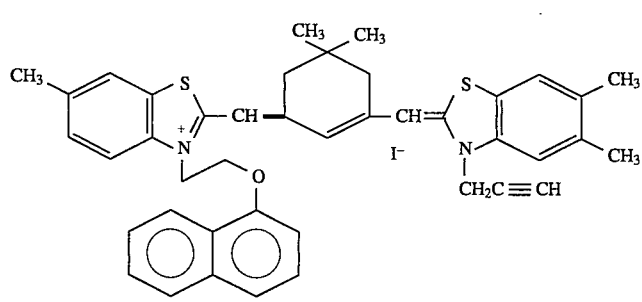
D-12

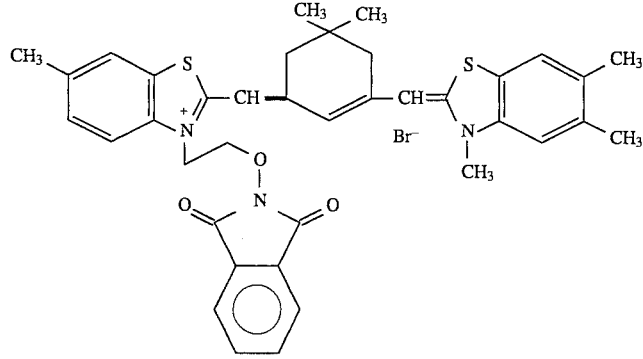
D-13
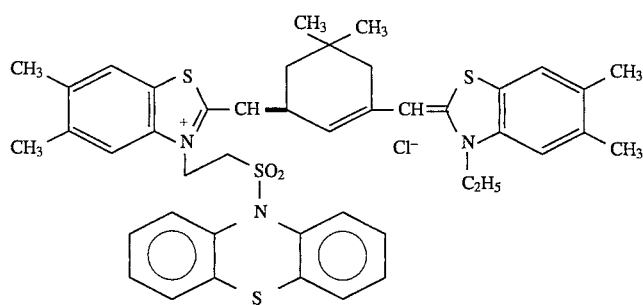
D-14
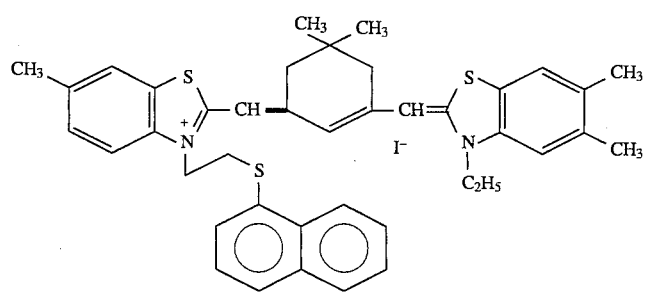
D-15
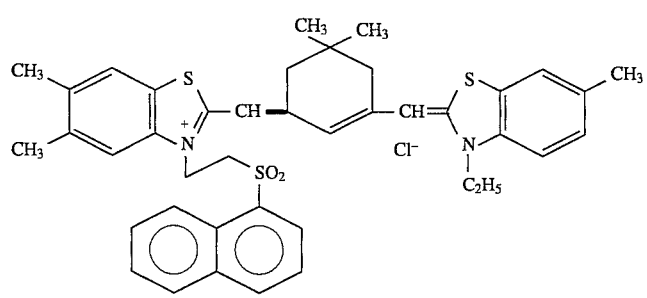
D-16
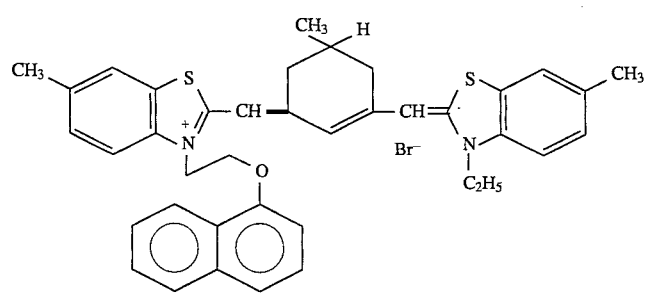
E-1

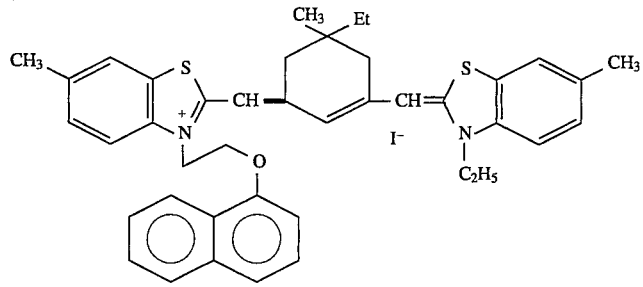
E-2
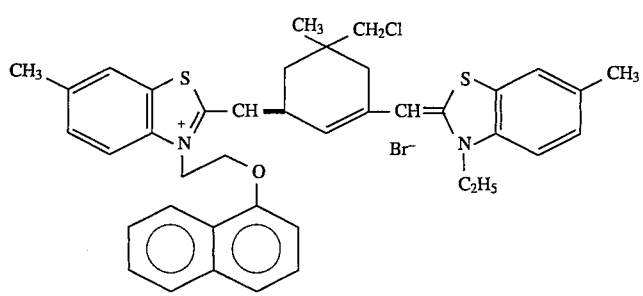
E-3
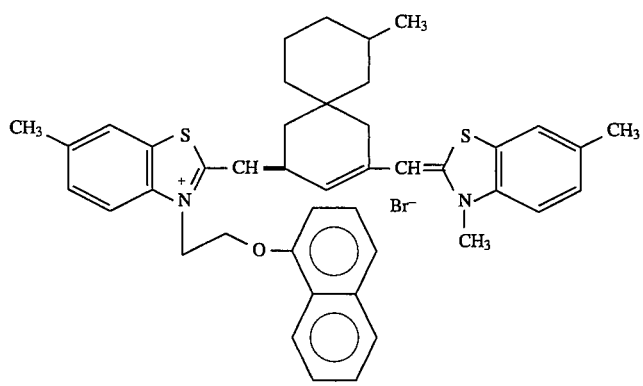
E-4
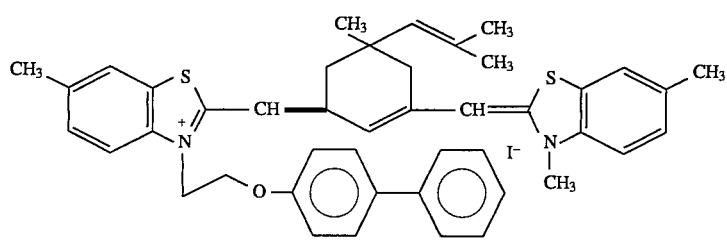
E-5
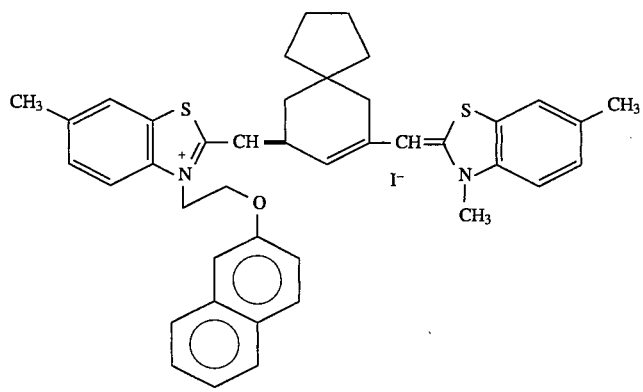
E-6

E-7
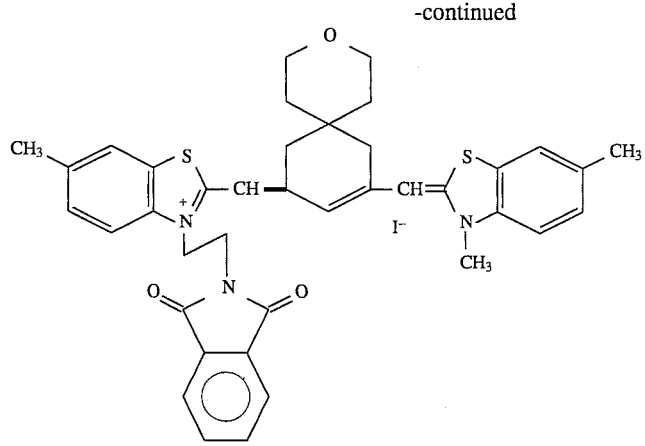
E-8
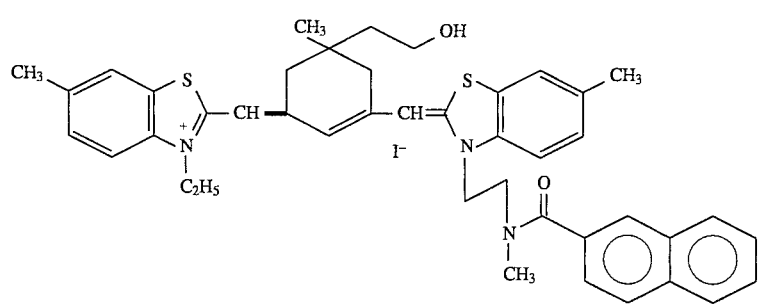
E-9
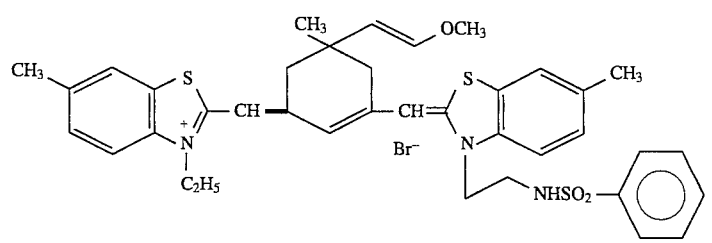
E-10
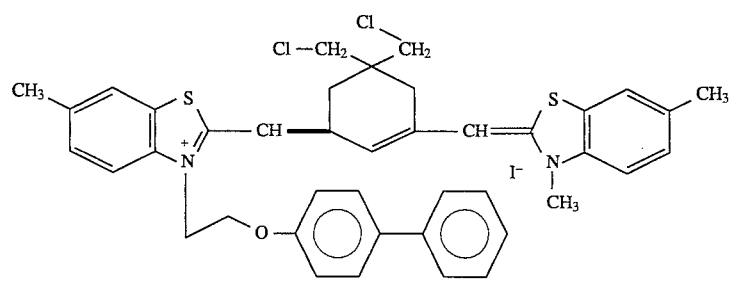
E-11
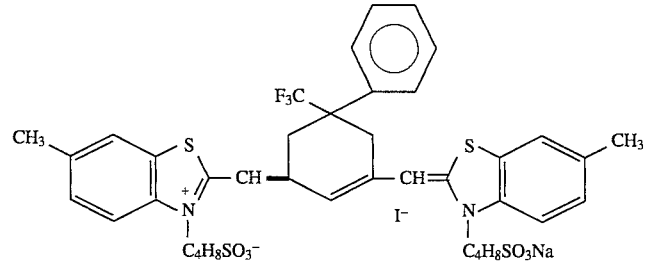

E-12
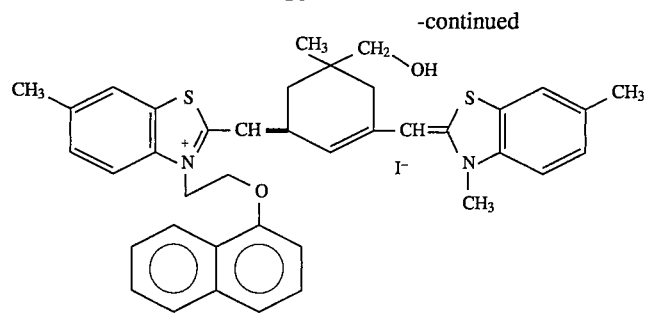
E-13
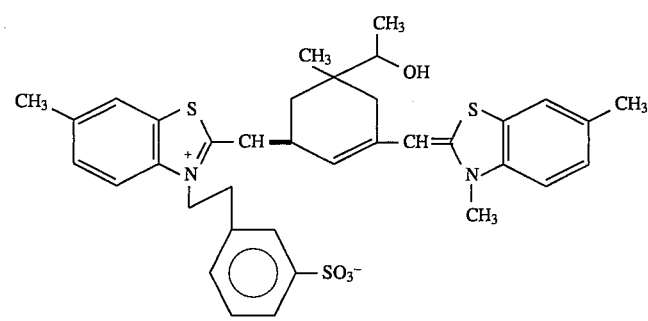
E-14
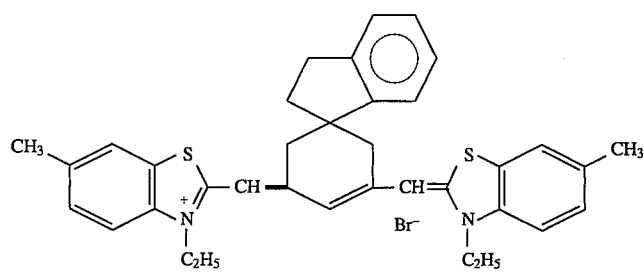
E-15
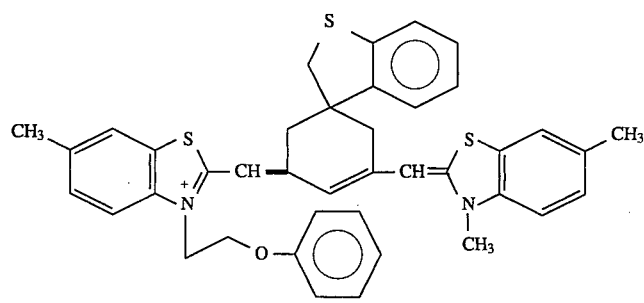
E-16
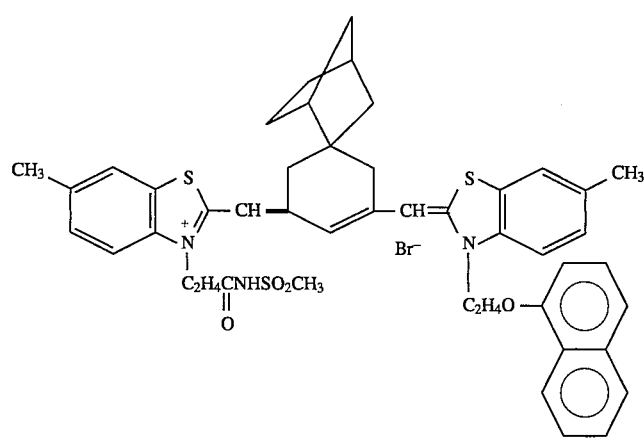

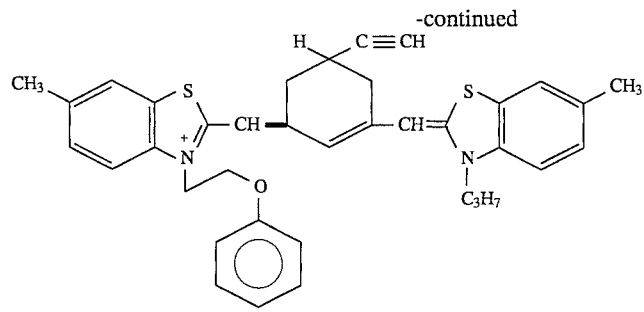
F-1
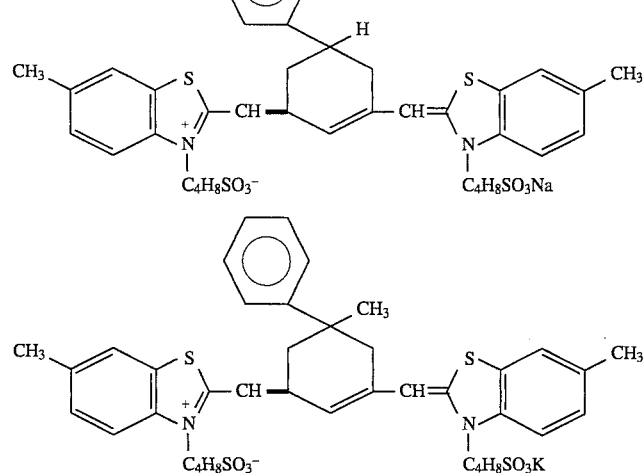
F-2
F-3
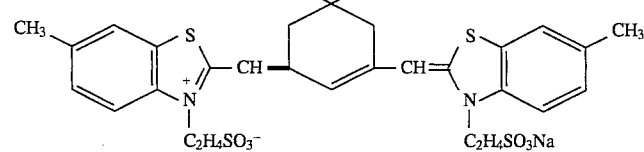
F-4
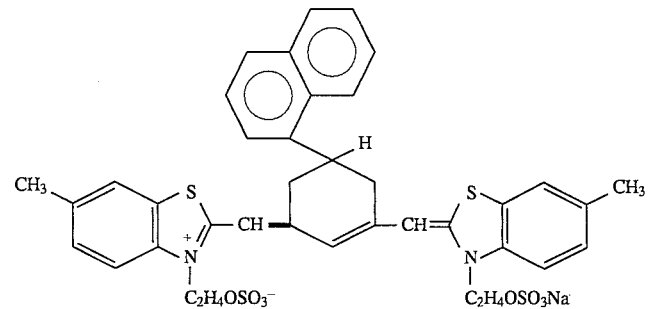
F-5

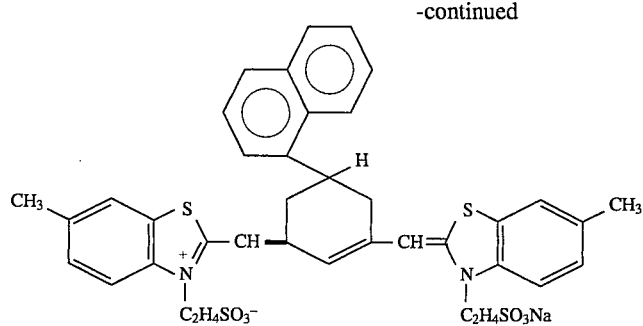
F-6
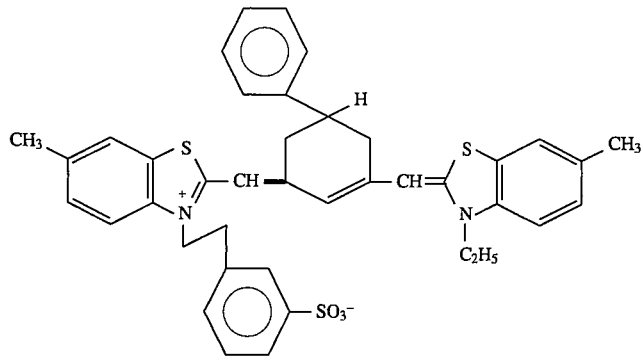
F-7
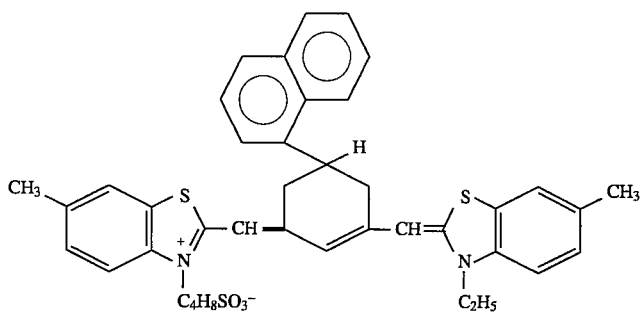
F-8
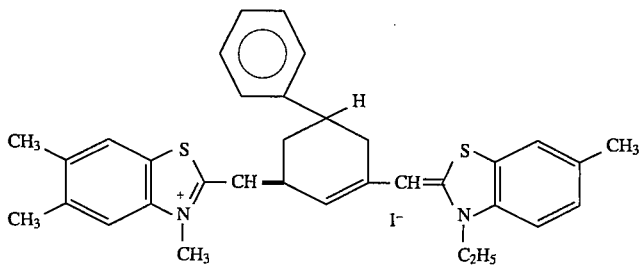
F-9
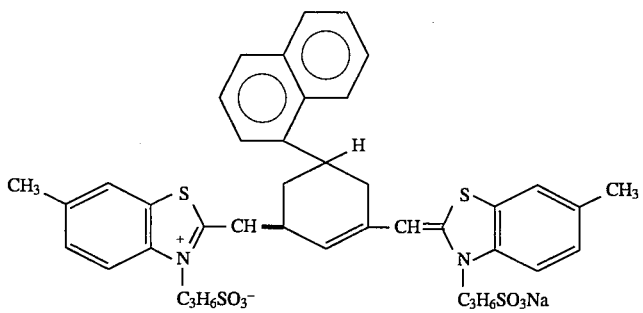
F-10

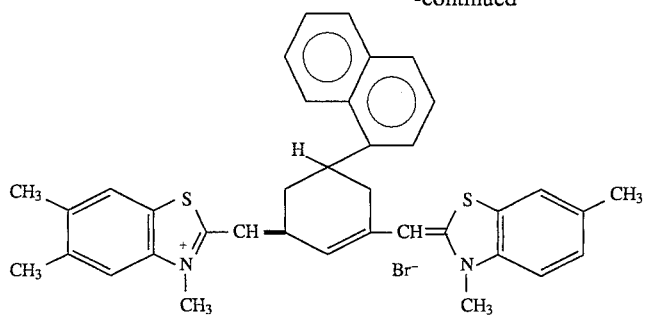
F-11
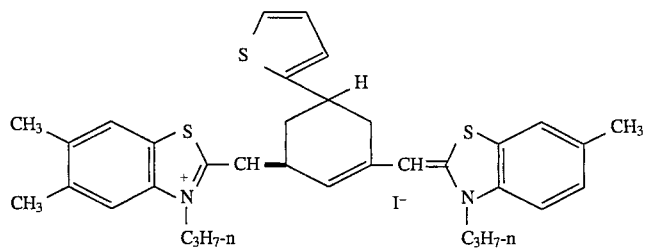
F-12
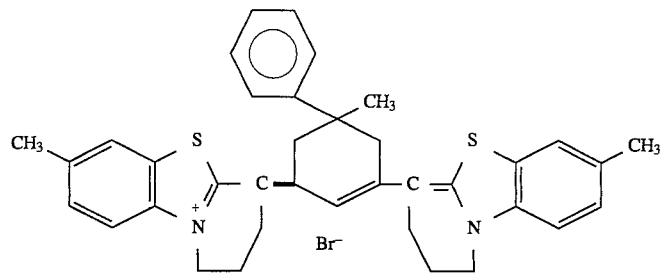
F-13
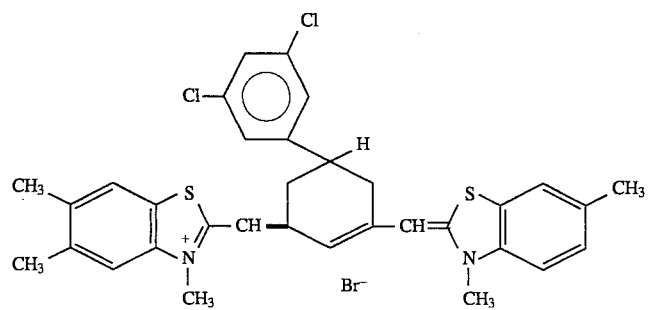
F-14
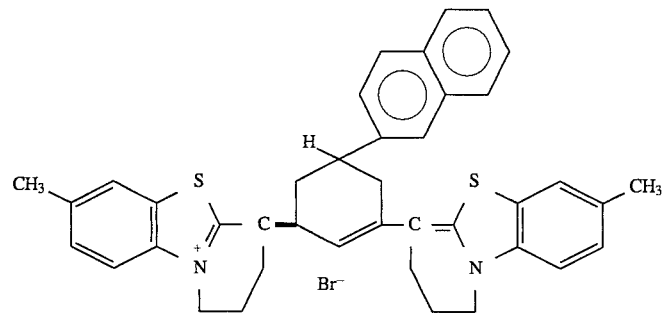
F-15

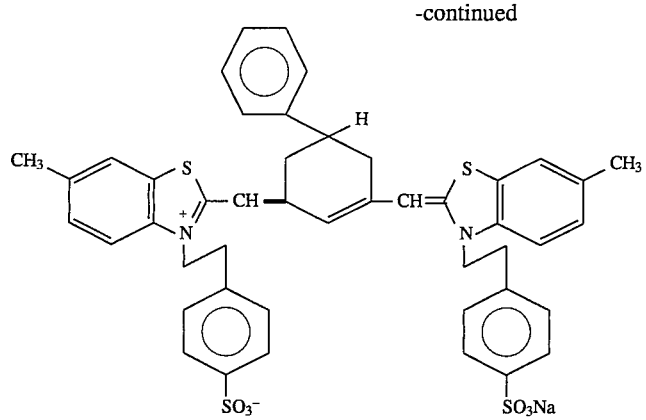
F-16
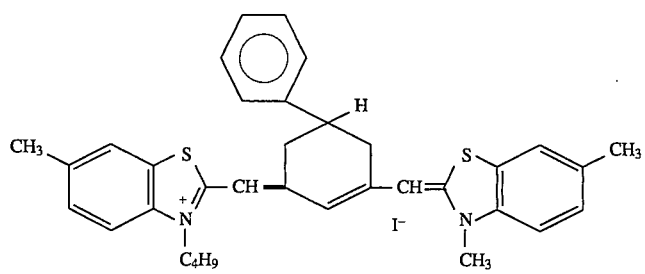
G-1
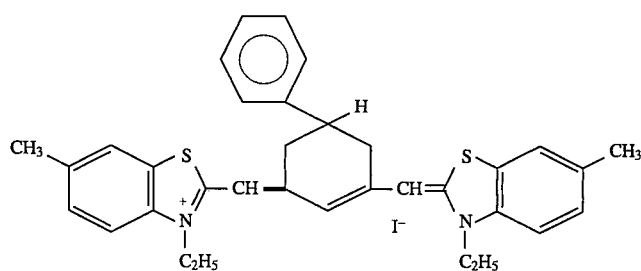
G-2
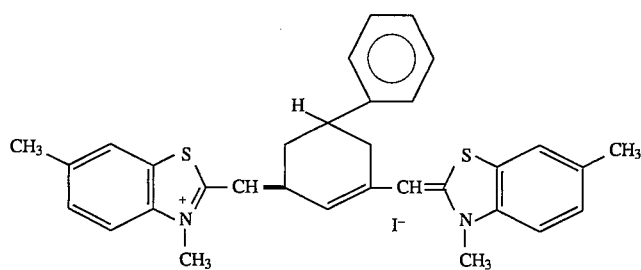
G-3
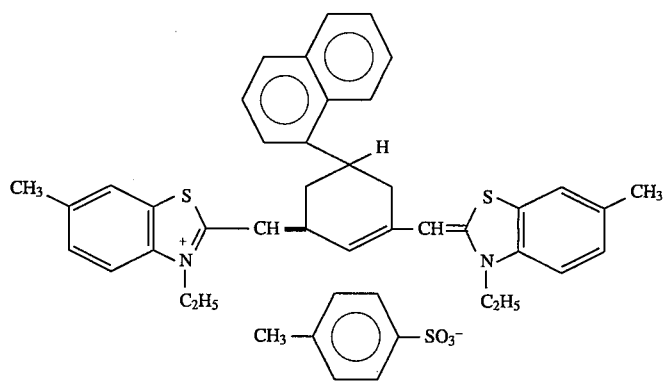
G-4

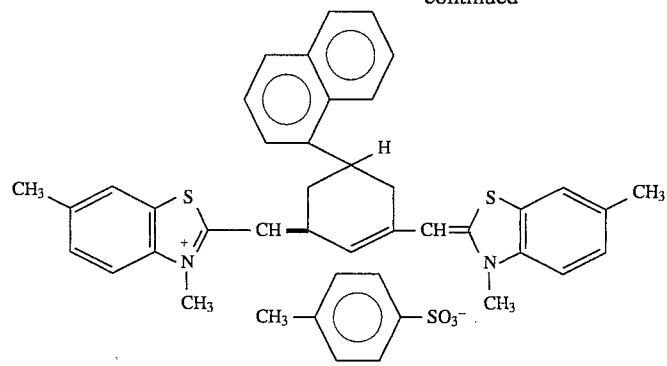
G-5
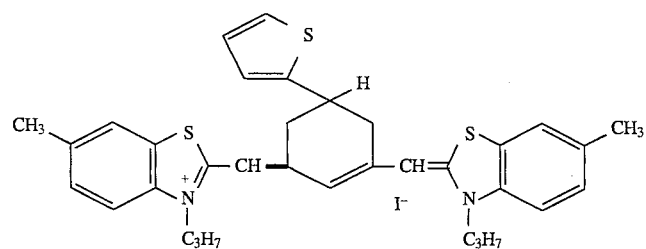
G-6
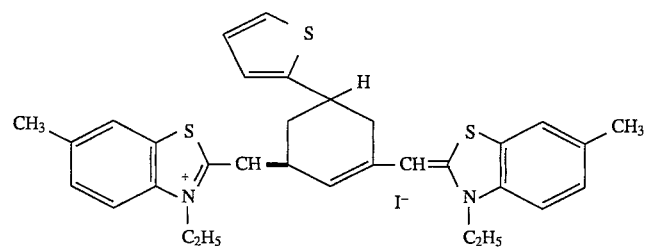
G-7
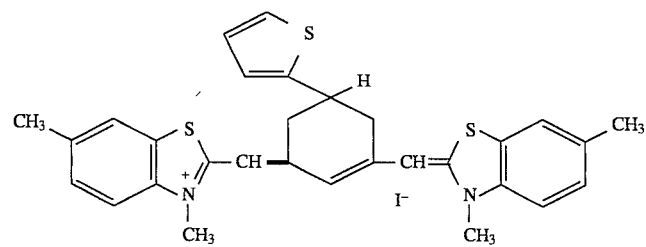
G-8
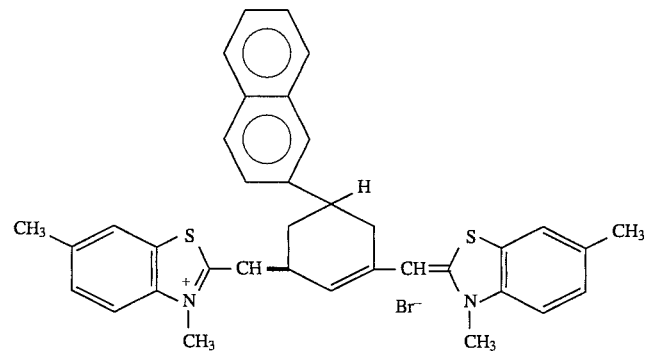
G-9

-continued
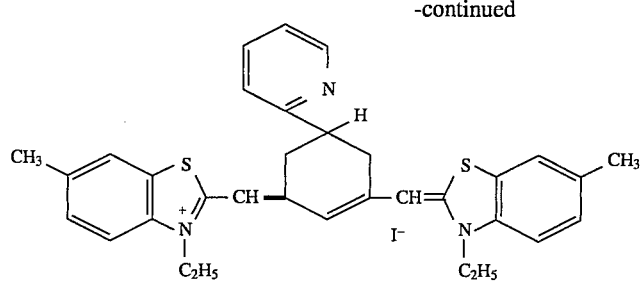
G-10
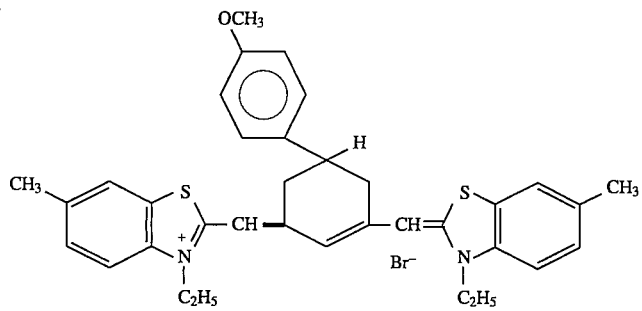
G-11
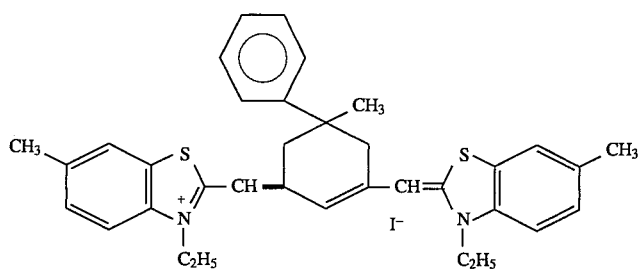
G-12
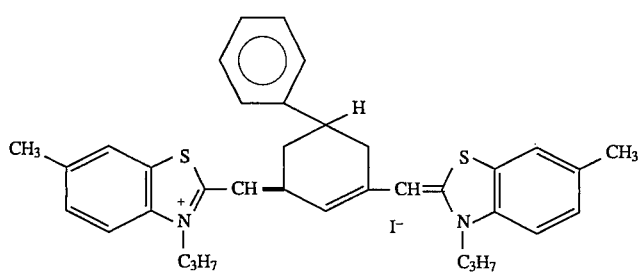
G-13
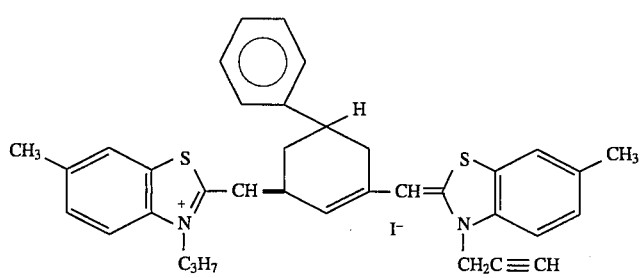
G-14
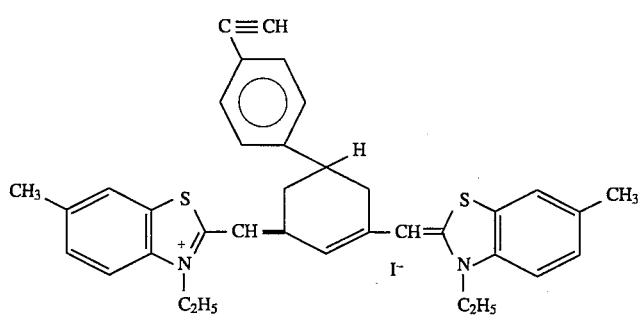
G-15

-continued
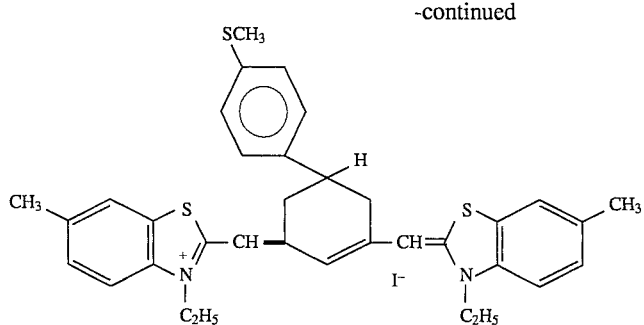
G-16
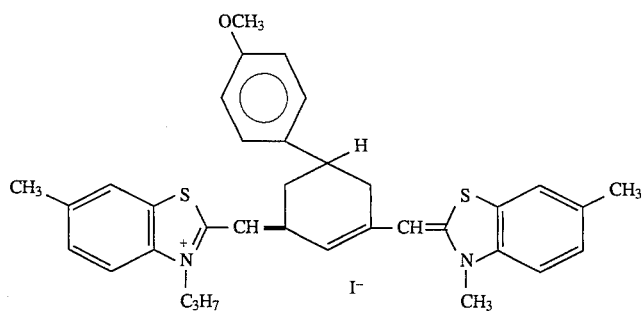
H-1
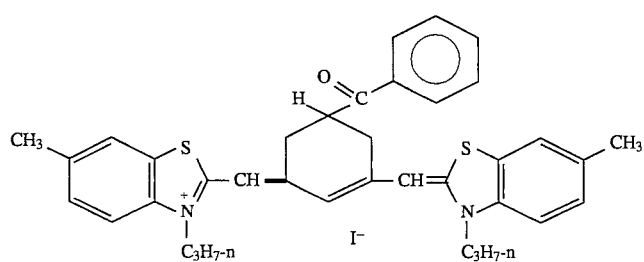
H-2
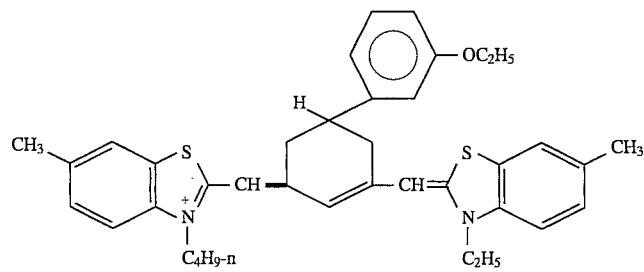
H-3
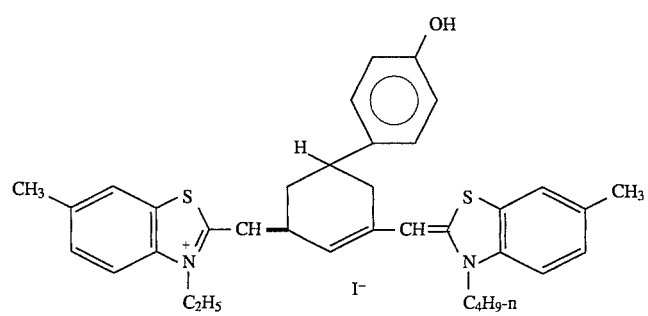
H-4

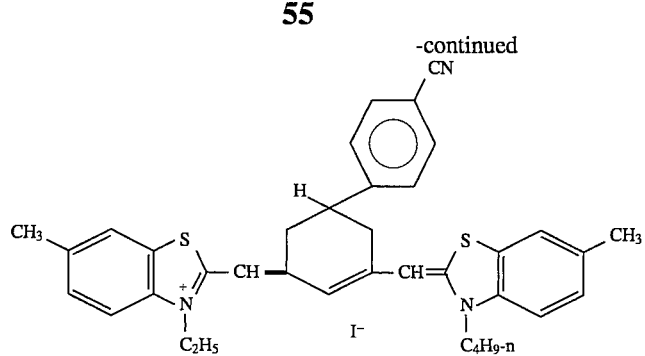
H-5
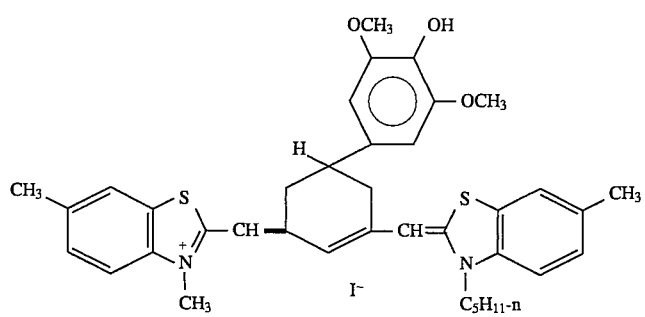
H-6
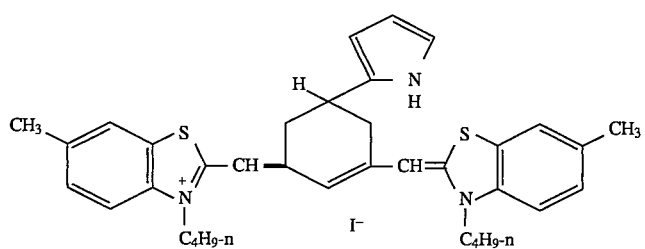
H-7
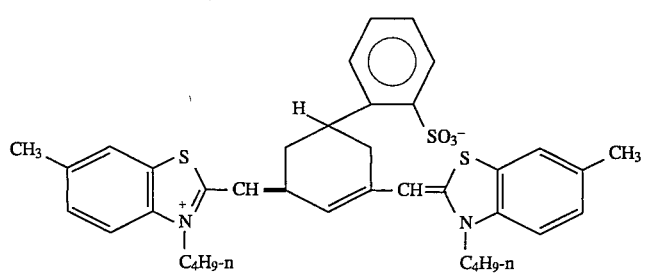
H-8
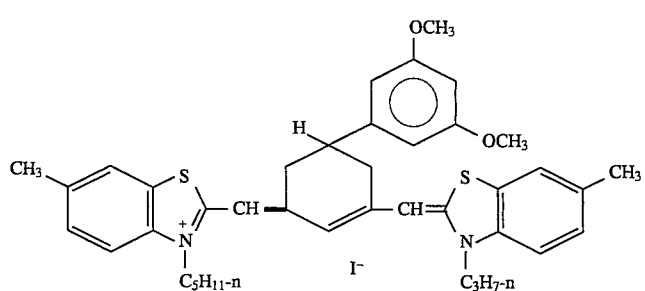
H-9
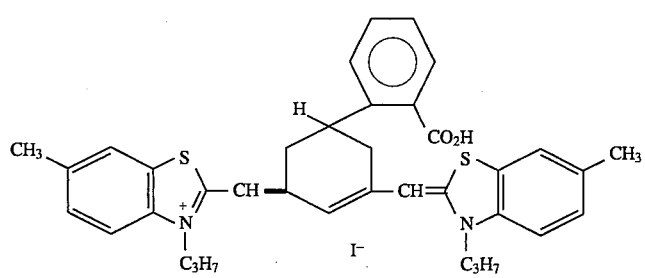
H-10

-continued
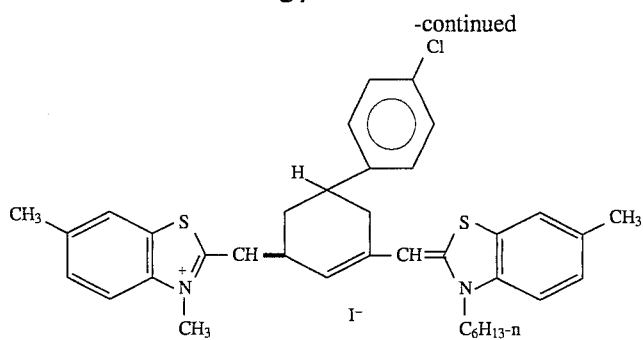 H-11
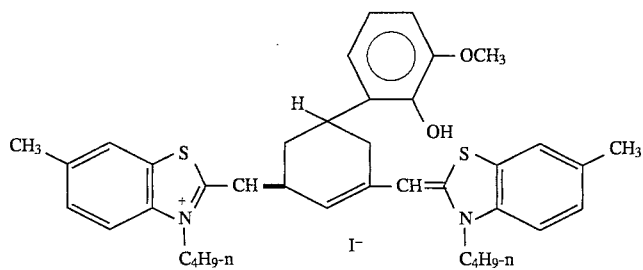 H-12
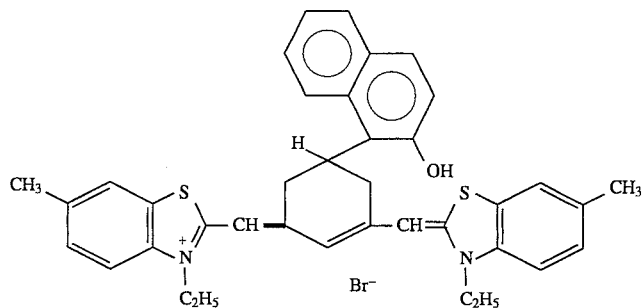 H-13
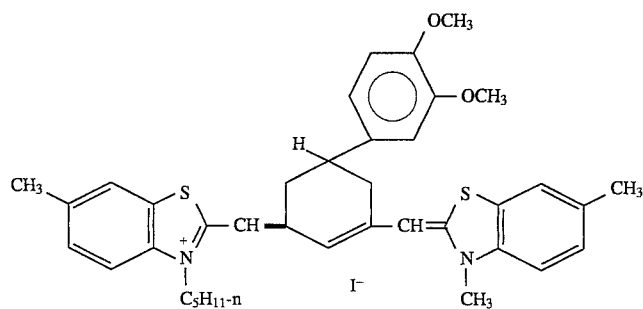 H-14
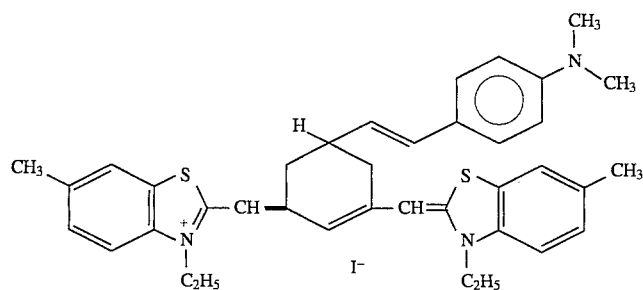 H-15

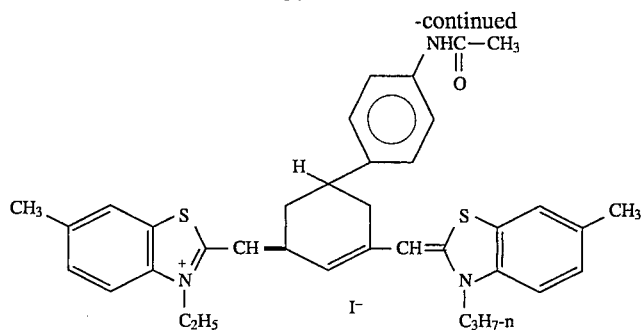 H-16
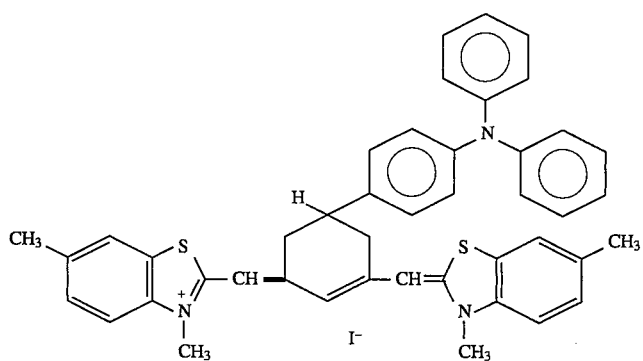 I-1
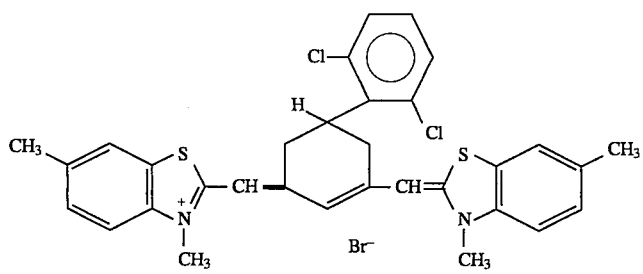 I-2
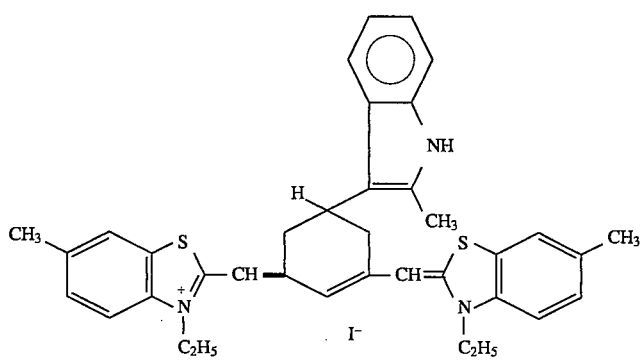 I-3
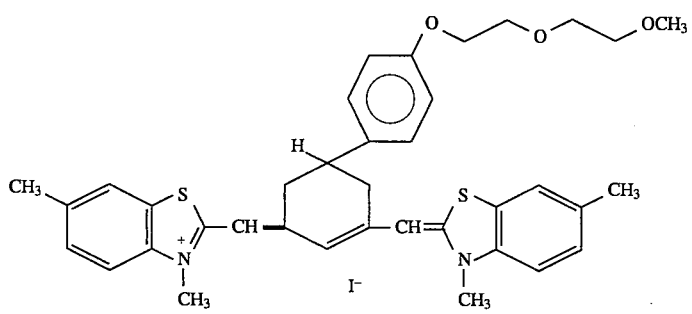 I-4

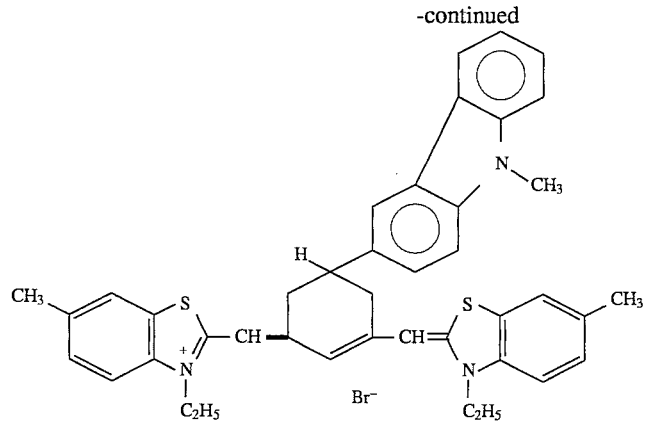
I-5
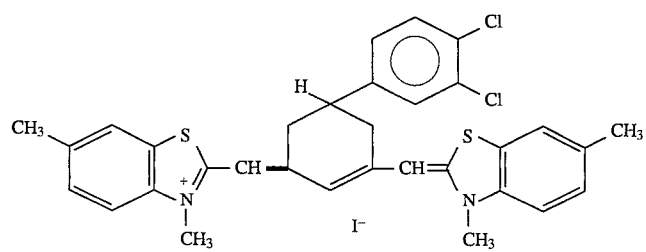
I-6
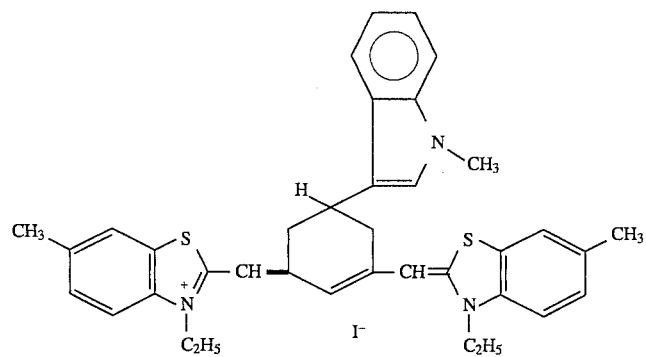
I-7
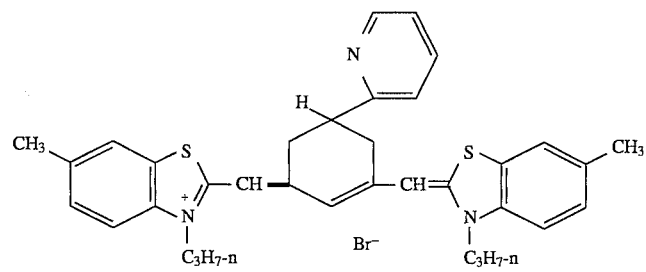
I-8
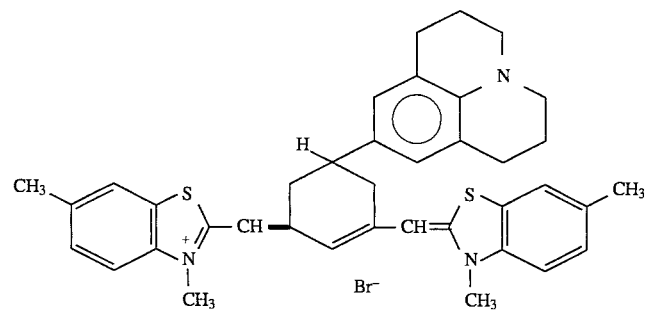
I-9

-continued
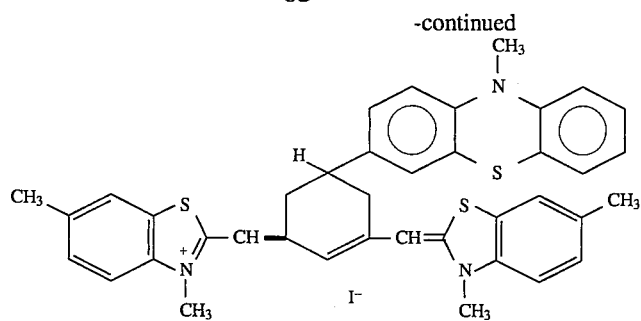
I-10
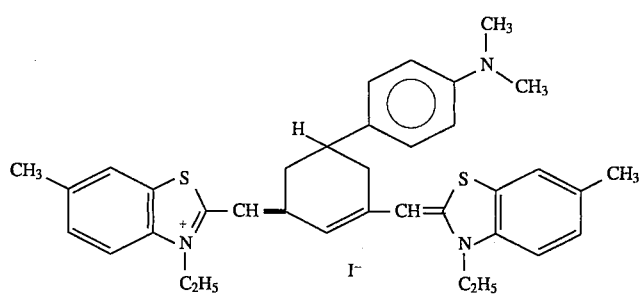
I-11
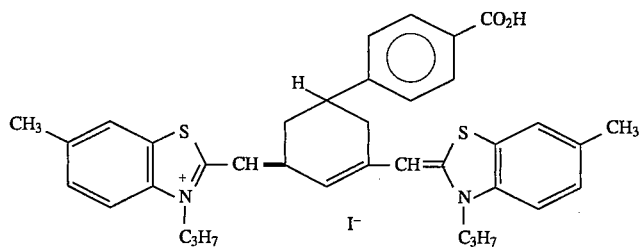
I-12
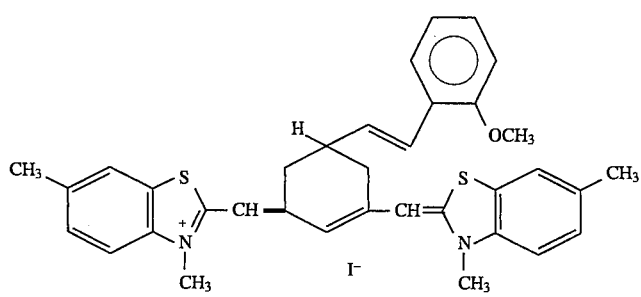
I-13
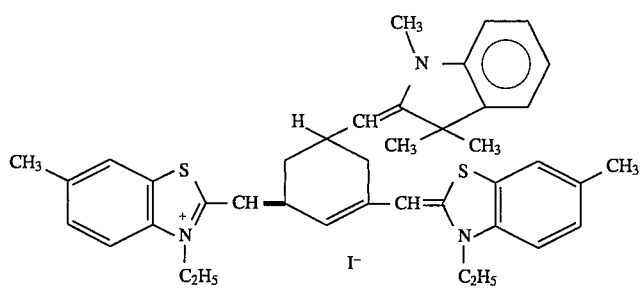
I-14
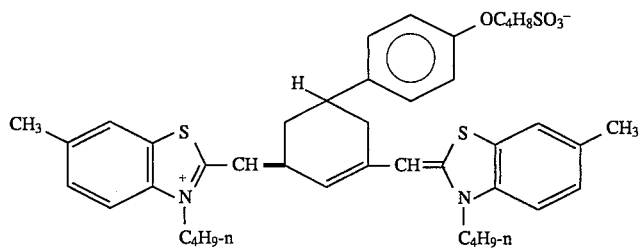
I-15

-continued
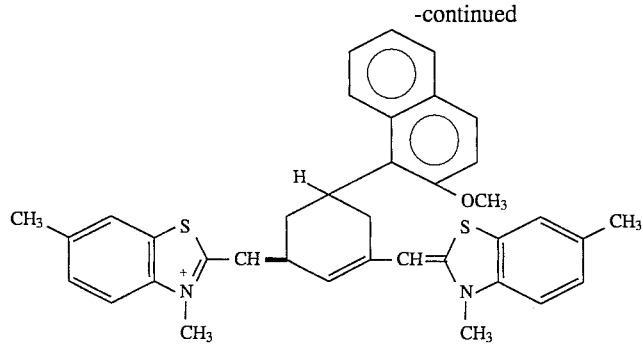
I-16
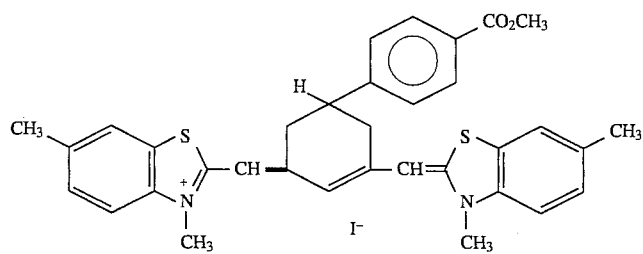
J-1
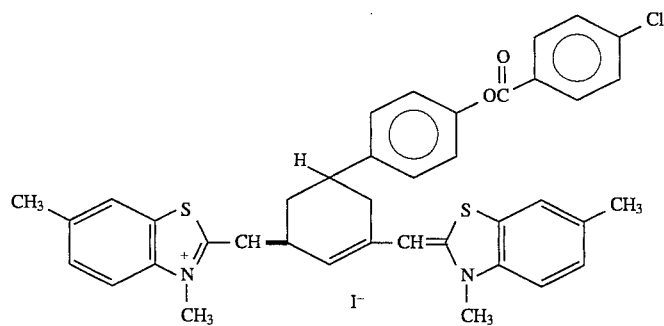
J-2
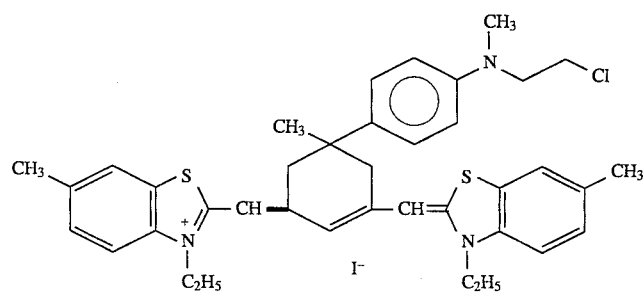
J-3
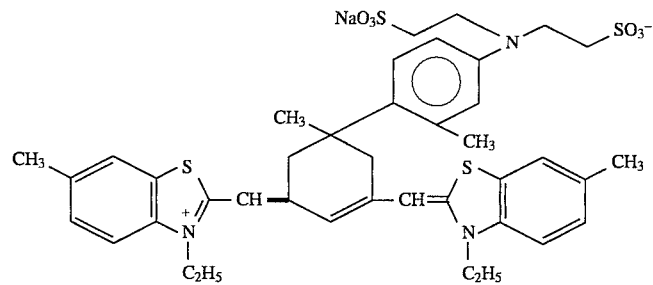
J-4

-continued
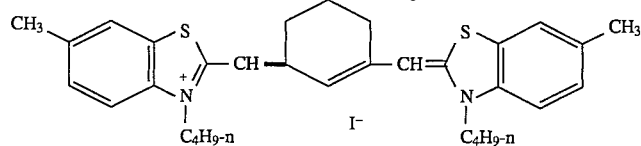
J-5
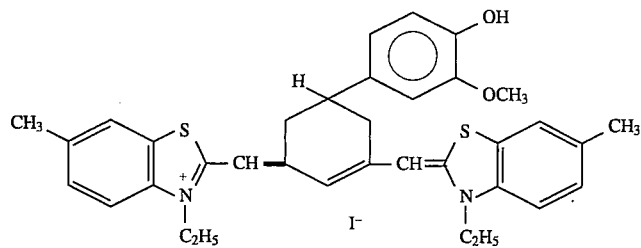
J-6
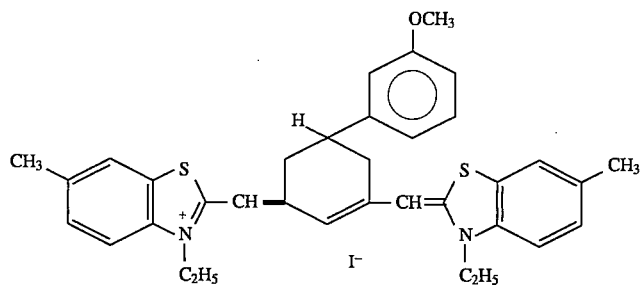
J-7
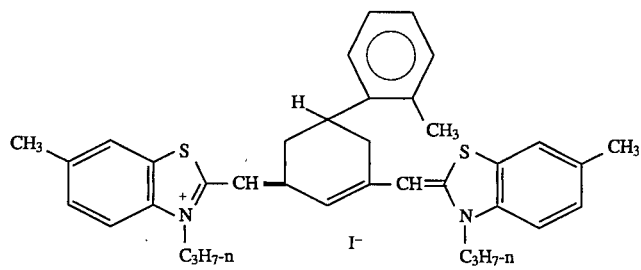
J-8
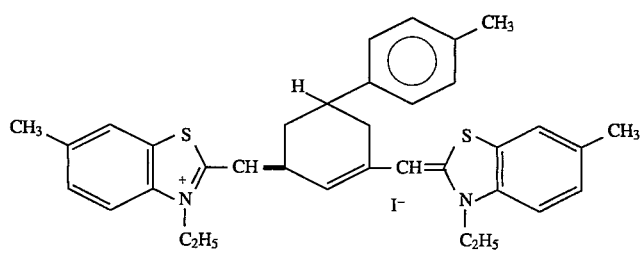
J-9
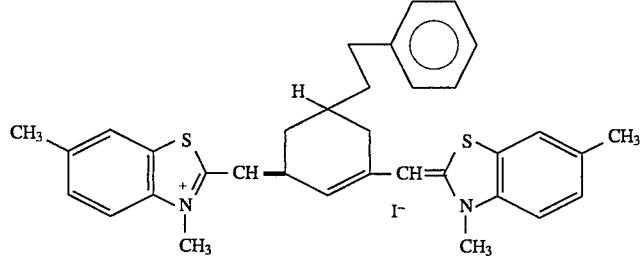
J-10

-continued
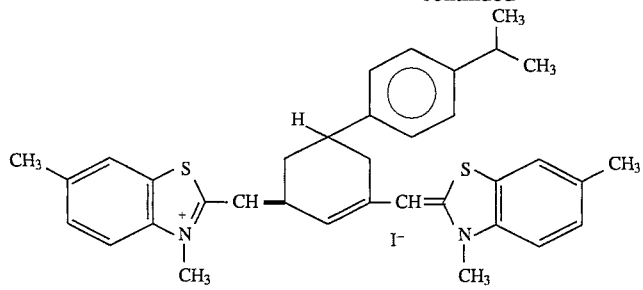
J-11
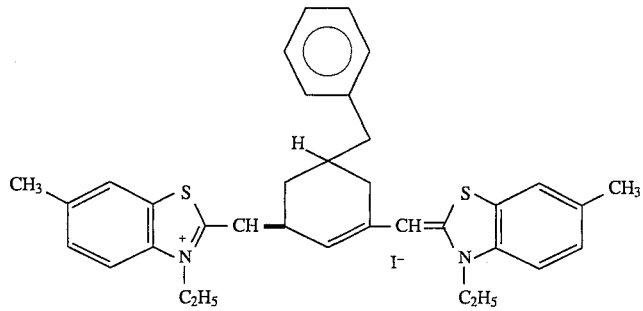
J-12
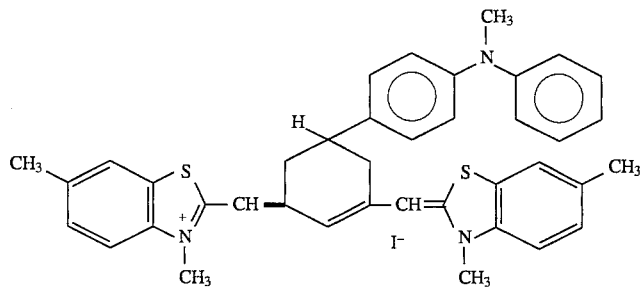
J-13
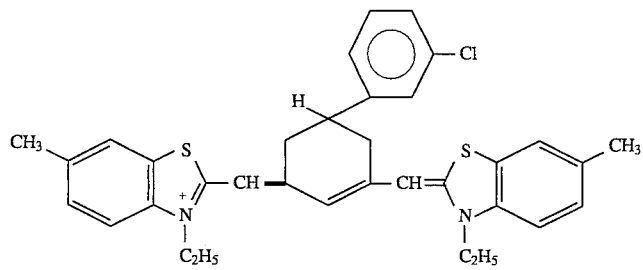
J-14
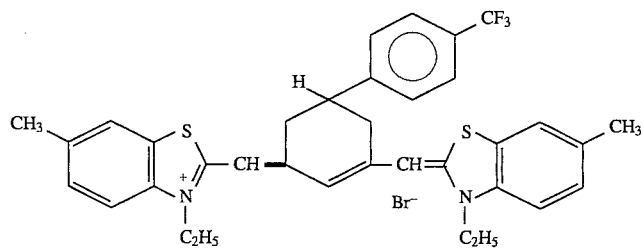
J-15
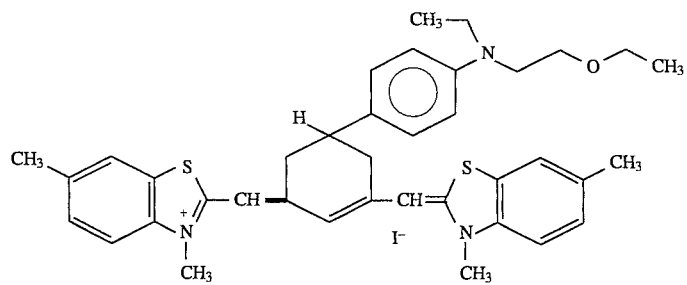
J-16

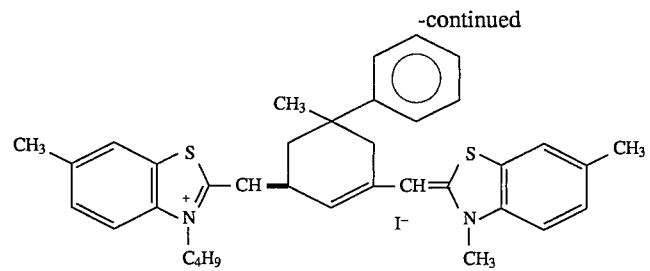
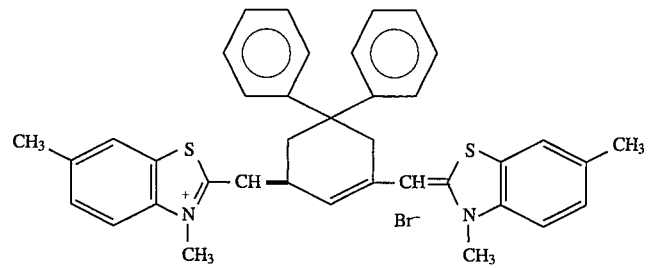
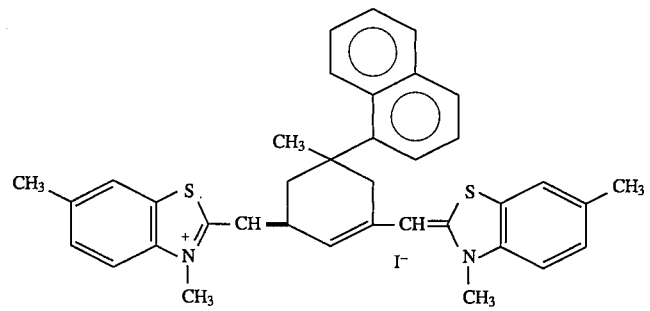
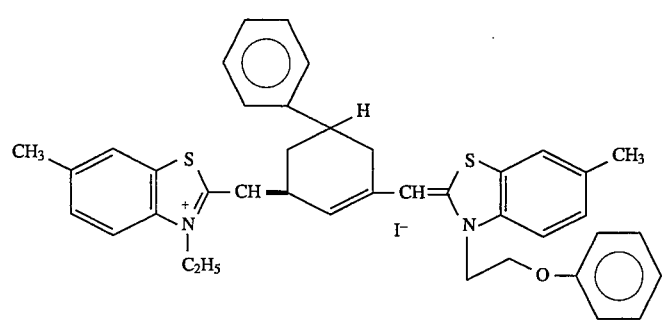
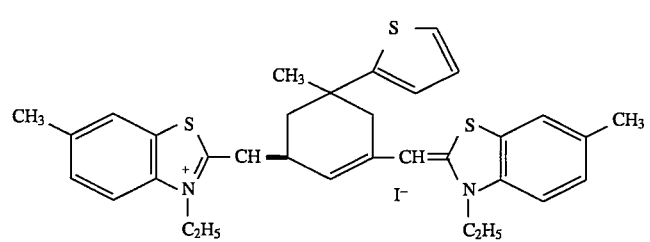

-continued
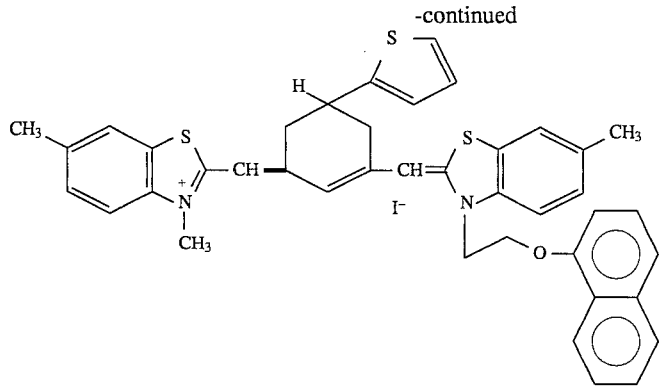 K-6
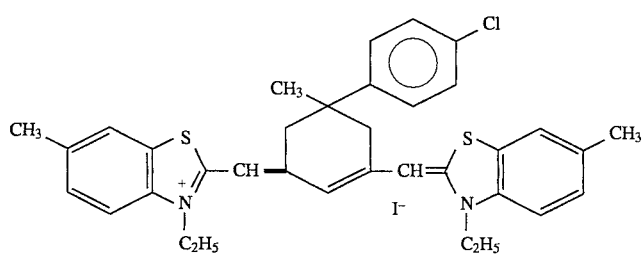 K-7
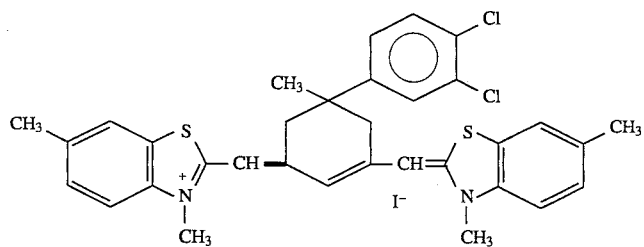 K-8
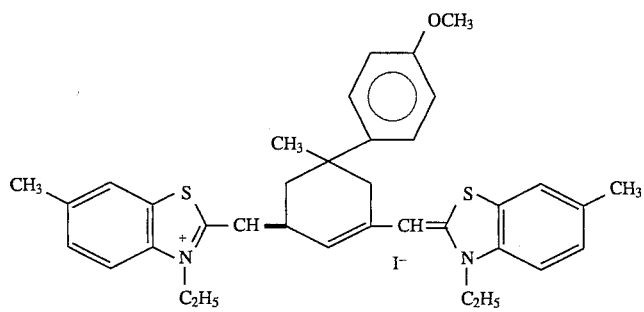 K-9
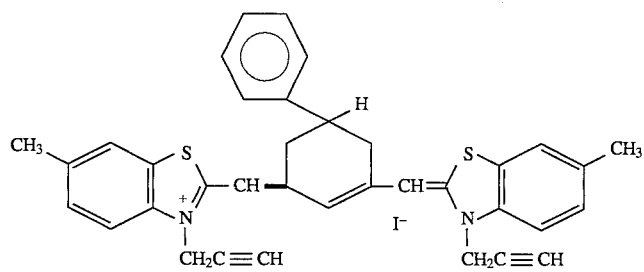 K-10

-continued
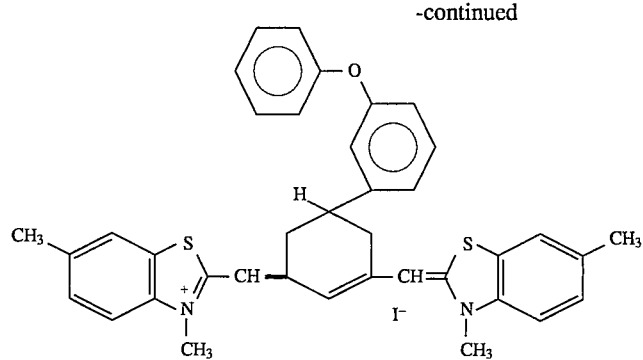 K-11
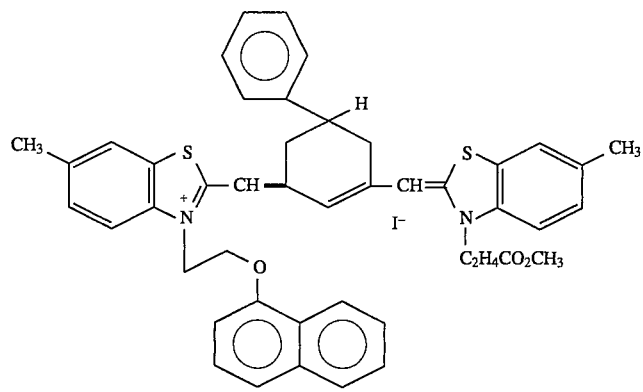 K-12
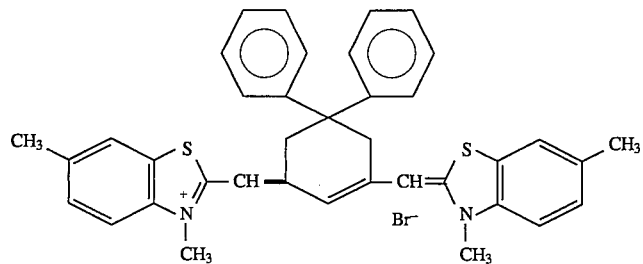 K-13
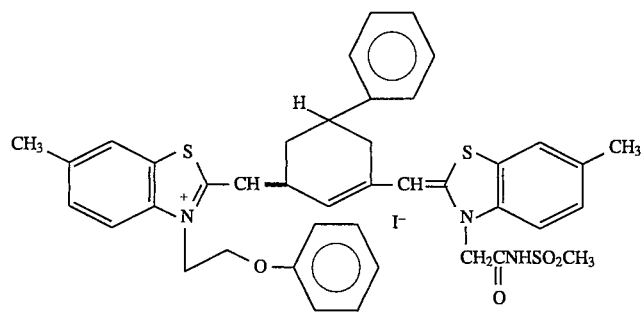 K-14
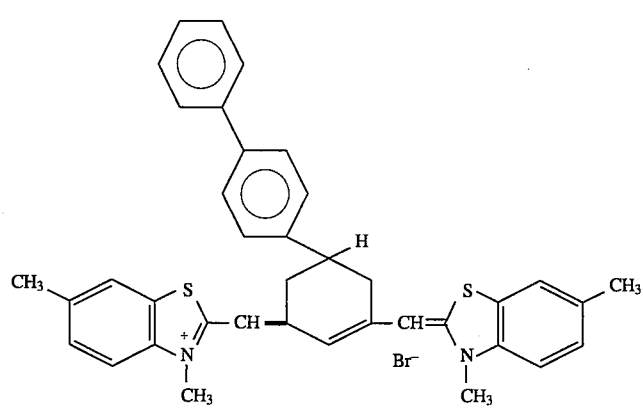 K-15

-continued
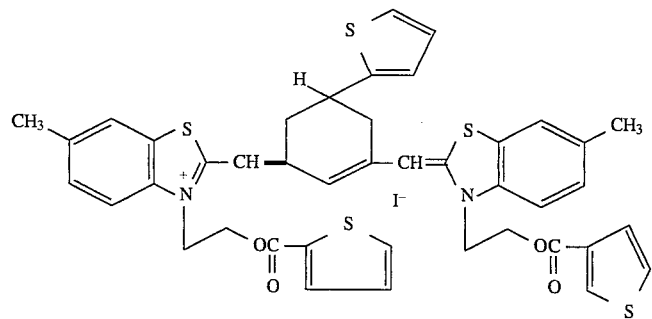
K-16
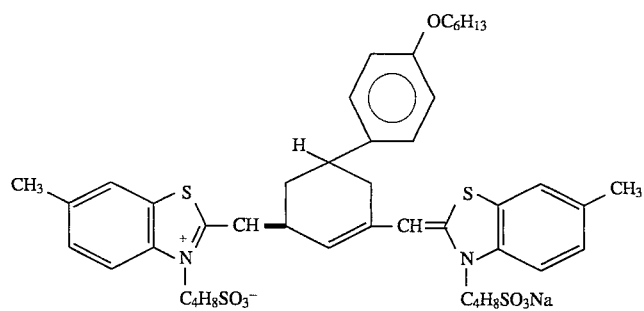
L-1
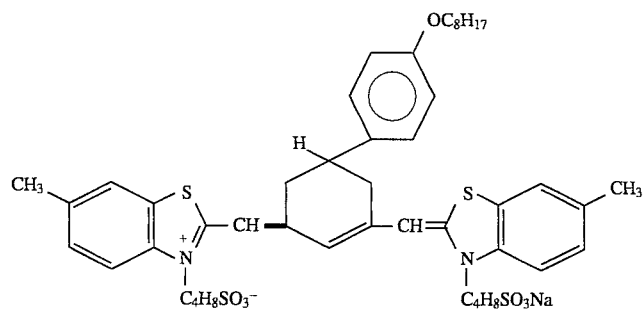
L-2
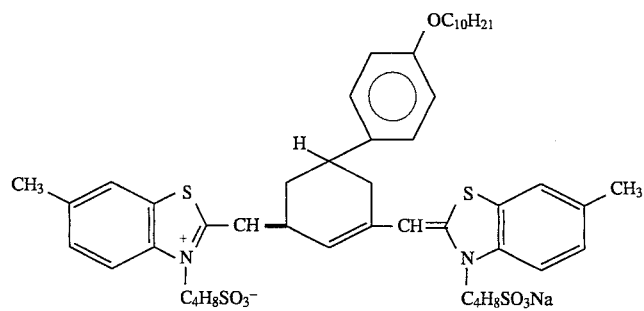
L-3
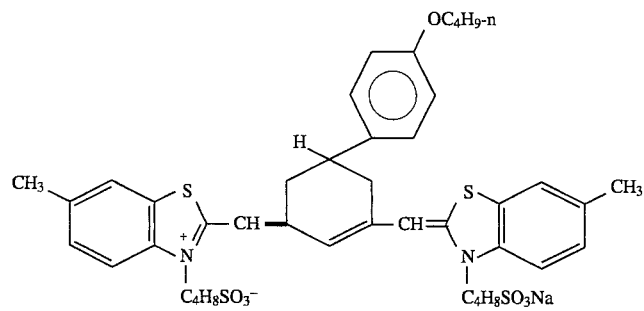
L-4

-continued
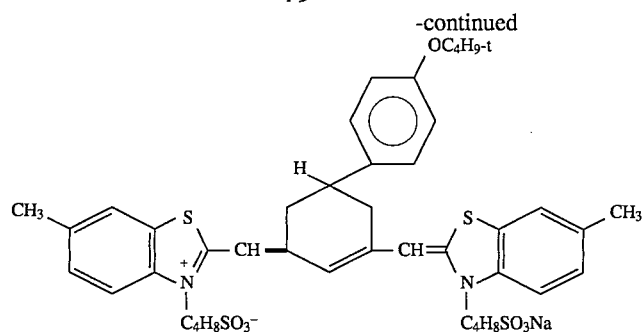
L-5
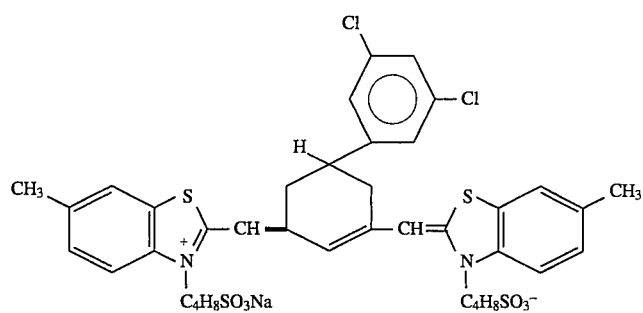
L-6
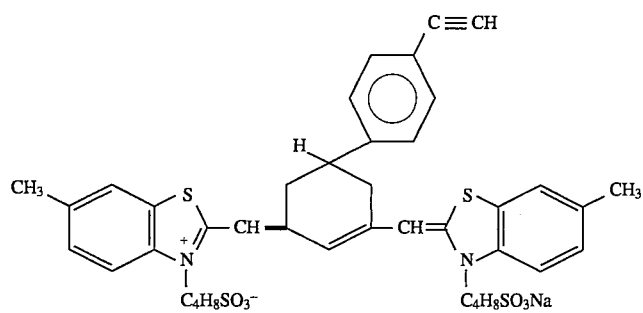
L-7
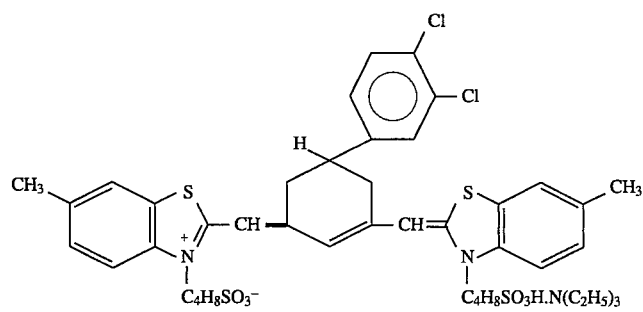
L-8
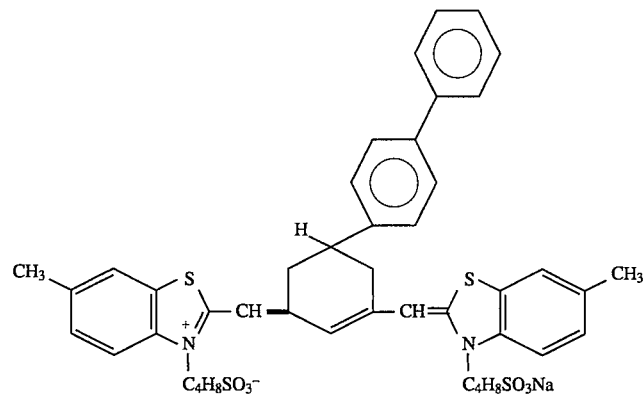
L-9

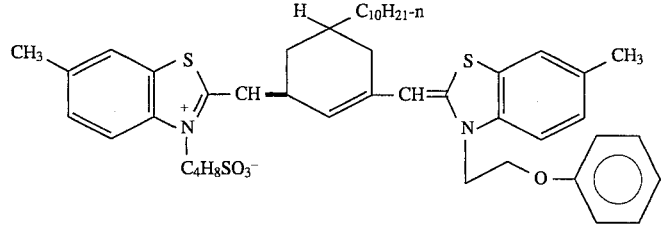
L-10
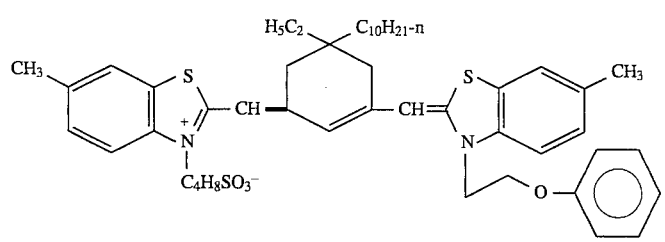
L-11
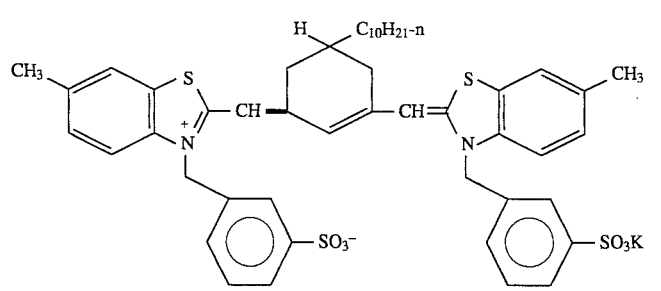
L-12
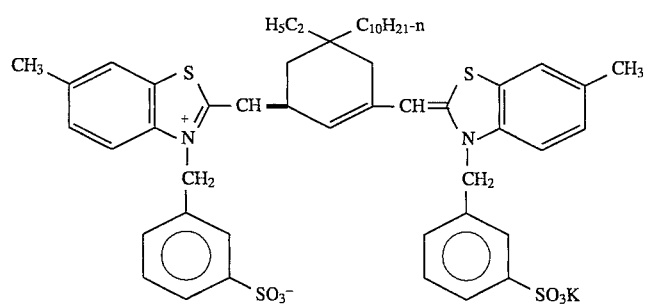
L-13
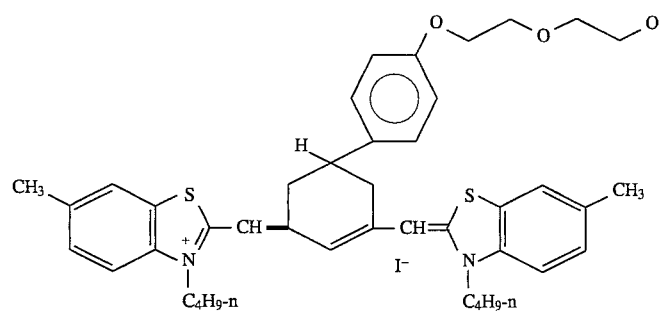
L-14
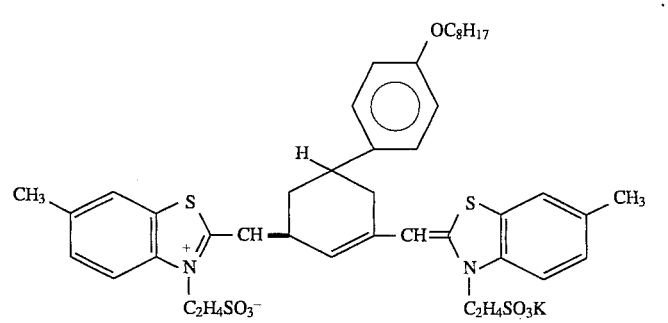
L-15

-continued

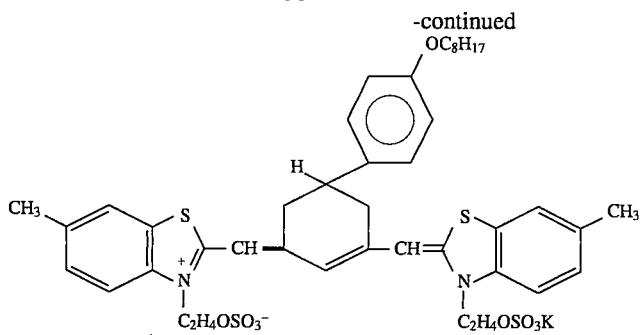

L-16

The polymethine dyes of formula (I) which are used in the present invention may be synthesized according to the methods described in the following publications.

a) F. M. Hamer, "Heterocyclic Compounds—Cyanine Dye and Related Compounds", John Wiley & Sons—New Yolk, London, published in 1964), b) D. M. Sturmer, "Heterocyclic Compounds—Special Topics in Heterocyclic Chemistry—", Chapter 8, Section 4, pp. 482–515, John Wiley & Sons—New Yolk, London, published in 1977), c) Zh. Org. Khim., Vol. 17, No. 1, pp. 167–169 (1981); ibid., Vol. 15, No. 2, pp. 400–407 (1979); ibid., Vol. 14, No. 10, pp. 2214–2221 (1978); ibid. Vol. 13, No. 11, pp. 2440–2443 (1977); ibid. Vol. 19, No. 10, pp. 2134–2142 (1983); Ukr. Khim. Zh., Vol. 40, No. 6, pp. 625–629 (1974); Khim. Geterotsikl. Soedin., Vol.2, pp. 175–178 (1976); Russian Patent Nos. 420,643 and 341,823, JP-A-59-217, 761, U.S. Pat. Nos. 4,334,000, 3,671,648, 3,623,881, and 3,573,921, EP-288,261 A1, EP-102,781 A2, and EP-102,781 A2 and JP-B-48-46,930.

d) The synthesis methods described in the Example of JP-A-3-243,944.

Synthesis Example 1

Synthesis of Compound (A-1):

Scheme 1

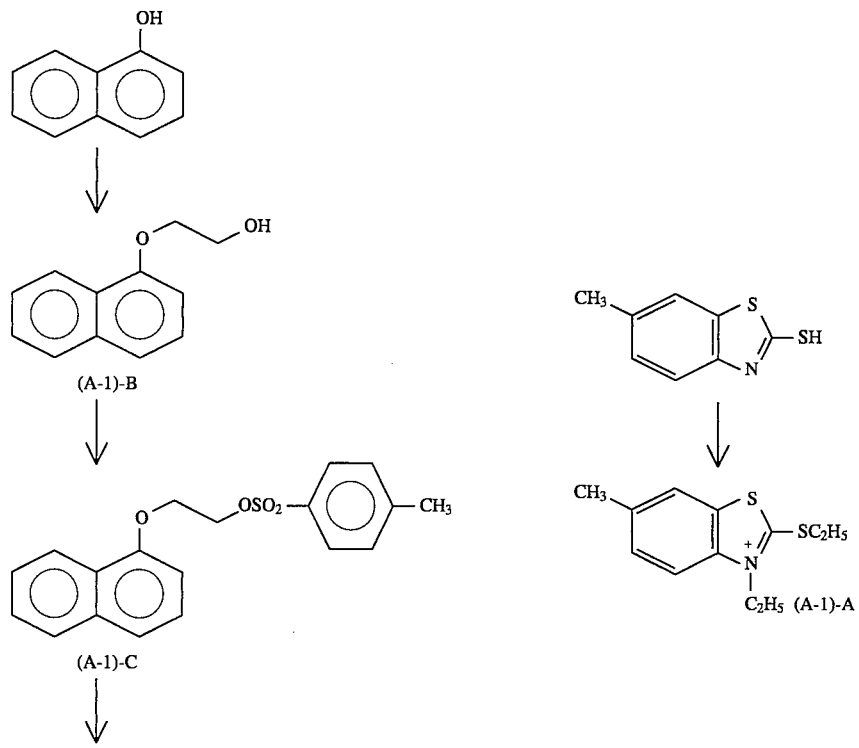

-continued
Scheme 1

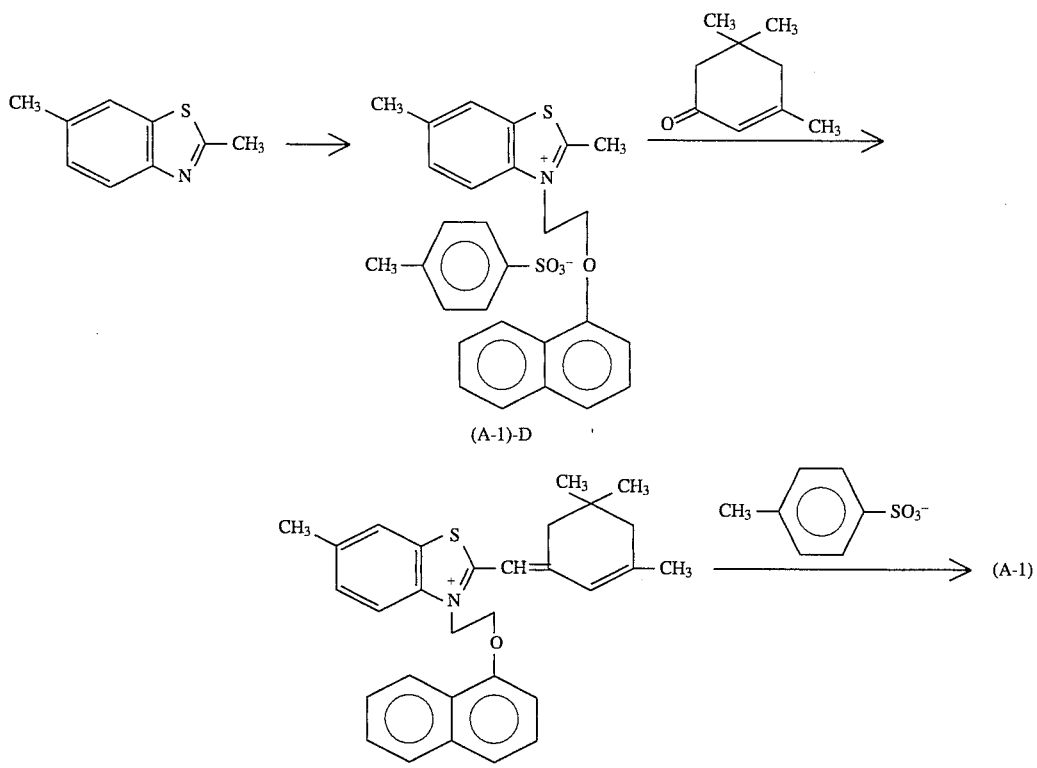

1) Synthesis of (A-1)-A:

2-Mercapto-6-methylbenzothiazole (18.1 g) and ethyl p-toluenesulfonate were heated to 140° C. and stirred for 3 hours. Then the temperature of the mixture was allowed to drop to 100° C. Dimethylformamide (30 ml) was added. The resulting mixture was gradually added to a solvent mixture of acetone (50 ml) and ethyl acetate (200 ml) while stirring. The crystals precipitated were collected by filtration and dried to obtain 25 g of the title compound (A-1)-A (yield: 66%).

2) Synthesis of (A-1)-B:

1-Naphthol (28.8 g), ethylene bromohydrin (40.0 g), and anhydrous potassium carbonate (120 g) were suspended in acetone (200 ml), and refluxed with heat while vigorously stirring for 5 hours. After cooling, the suspension was filtered using a glass filter. The filtrate was gradually poured into n-hexane (1 liter) while stirring. The crystals precipitated were collected by filtration and dried to obtain 21.0 g of the title compound (A-1)-B (yield: 56%).

3) Synthesis of (A-1)-C:

While cooling (A-1)-B (12.9 g), p-toluenesulfonic chloride (10.5 g), and dioxane (60 ml) on ice, triethylamine (9.6 ml) was added dropwise with stirring. The resulting mixture was further stirred at room temperature for 2 hours, after which it was poured into ice-water. The crystals precipitated were collected by filtration and dried to obtain 15.0 g of the title compound (A-1)-C (yield: 79%).

4) Synthesis of (A-1)-D:

While heating, with stirring, (A-1)-C (14.9 g) and 2,6-dimethylbenzothiazole (10 g) at 160° C. for 6 hours, the resulting mixture was cooled to 60° C., to which methanol (10 ml), acetonitrile (10 ml), and ethyl acetate (100 ml) were poured in this order. The crystals precipitated were collected by filtration and dried to obtain 18.7 g of the title compound (A-1)-D (yield: 78%).

5) Synthesis of (A-1):

A mixture of (A-1)-D (12.0 g), isophorone (4.6 g) ammonium acetate (2.4 g), acetic acid (8 ml), and toluene (80 ml) was refluxed with heat for 40 minutes. After cooling, the mixture was condensed to dryness under reduced pressure. Dichloromethane (100 ml) and water (100 ml) were added thereto, and the mixture was vigorously shaken. Subsequently, the organic layer was cocentrated to dryness under reduced pressure. (A-1)-A (7 g), acetonitrile (80 ml) and triethylamine (12 ml) were added and refluxed with heat for 2 hours. After cooling, crystals precipitated were collected by filtration and recrystallized from methanol to obtain 5.4 g of the title compound (A-1) (yield 28%).

$\lambda_{max}$ (methanol) 656 nm
$\varepsilon^{max}$ 1.60×10$^5$

Synthesis Example 2:

Synthesis of Compound (G-2):

Scheme 2

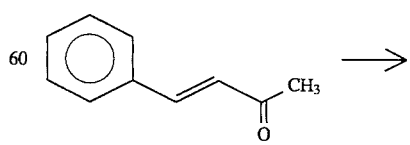

-continued
Scheme 2

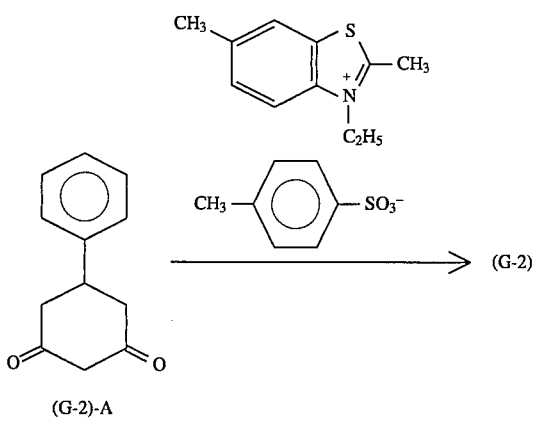

(G-2)-A

Synthesis of (G-2)-A:

To a mixture of methanol (10 ml) and 28% sodium methilate in methanol (11 ml), diethyl malonate (9.25 g) was gradually added. While the temperature of the mixture was maintained at 60° C., benzalacetophenone (8.2 g) was added to the mixture over 10 minutes, after which the mixture was refluxed with heat for 4 hours. The temperature was allowed to drop to 40° C. An aqueous solution (20 ml) in which sodium hydroxide (4.9 g) was dissolved was added dropwise thereinto. The resulting mixture was heated at 80° C. for 40 minutes. Concentrated HCl (19.3 ml) was added thereto while the mixture was cooled on ice and stirred. The crystals precipitated were collected by filtration and dried to obtain 10.0 g of the title compound (G-2)-A (yield: 94%).

2) Synthesis of (G-2):

A mixture of 3-ethyl-2,6-dimethylbenzothiazolium, p-toluenesulfonate (7.3 g), and (G-2)-A (1.9 g) was heated at 160° C. while stirring for 5 hours. Methanol (20 ml) and acetonitrile (20 ml) were added. Sodium iodide (1.5 g) was added while stirring. The crystals precipitated were collected by filtration. Recrystallization from ethanol yielded 1.5 g of the title compound (G-2) (yield: 23%).

$\lambda_{max}$ (methanol) 652 nm
$\epsilon^{max}$ 1.66×10$^5$

A color photographic light-sensitive materials according to the present invention can be made by applying onto a support a structure comprising at least one yellow color developing silver halide emulsion layer, at least one magenta color developing silver halide emulsion layer, and at least one cyan color developable silver halide emulsion layer. For popular color printing papers, colors can be reproduced by a subtractive color process, if incorporated are color couplers capable of forming dyes having the relation of a color complementary to light sensitive to the silver halide emulsion. In such color printing papers for popular use, silver halide emulsion particles may be spectrally sensitized by using blue sensitive, green sensitive, red sensitive spectral sensitizing dyes in order of the above-described color developable layers, and may be superposed on a support in the above-described order. However, the light-sensitive layers may be superposed in other order than the above. In other words, in a certain case, it is preferable for quick processing that a light-sensitive layer containing silver halide particles having a largest average particle size is used as a top layer. In another case, the lowermost layer is preferably a magenta color developable sensitive layer in view of the storability while being exposed to light.

Light-sensitive layers and color hues to be developed do not necessarily correspond to each other as described above. At least one infrared sensitive silver halide emulsion layer may also be used.

No limitation is imposed on the material of the support used in the present invention as long as a photographic emulsion layer can be applied thereon. Examples of the support include glass, papers, and plastic films. A reflective support is most preferred.

The term "reflective support" used herein means a support which enhances reflectivity, thereby sharpening die images formed on a silver halide emulsion layer. Examples of the reflective support include supports which are laminated with a hydrophobic resin in which a dispersion light reflective material such as titanium oxide, zinc oxide, calcium carbide, or calcium sulfate is dispersed; and supports made of a hydrophobic resin containing a light reflective material. Specific examples of the supports include a paper support laminated with polyethylene, a paper support laminated with polyethylene terephthalate, a synthetic paper support containing polypropylene, a transparent support having a reflective layer or containing a reflective material. Examples of the transparent support include glass plates, polyester films such as polyethylene terephthalate, cellulose triacetate, and cellulose nitrate films, polyamide films, polycarbonate films, polystyrene films, and vinyl chloride resins. Preferable examples of the reflective supports used in the present invention are paper supports, both sides of which are laminated with a layer of waterproof resin, with at least one of the resin layer containing fine particles of a white pigment. The white pigment particles are contained in an amount of preferably 12% by weight, more preferably 14% by weight. It is preferable to use, as light reflective white pigment particles, ones obtained by mixing white pigment particles intimately in the presence of a surfactant, as well as ones in which their surfaces are treated with an alcohol having 2–4 hydroxyl groups.

Fine particles of a white pigment are preferably dispersed in the reflective layer uniformly without forming clusters of particles. The degree of distribution of the particles can be determined by measuring the ratio (%) (Ri) of the area occupied by the particles of the white pigment within a unit area, wherein the area occupied by the particles is determined based on the projected areas of the particles on the unit area. The ratio Ri will be referred to as the area occupying ratio. The variation coefficient of the area occupying ratio (%) can be obtained as a ratio of the standard deviation (s) of the area occupying ratio Ri to the average value (R) of the area occupying ratio Ri, i.e., s/R. In the present invention, the variation coefficient of the area occupying ratio (%) is preferably not greater than 0.15, more preferably not greater than 0.12, and particularly preferably not greater than 0.08.

In the present invention, it is preferable to use a support with a surface providing a diffuse reflection of second kind. The diffuse reflection of second kind means diffuse reflection obtained by forming concave and convex portions in a mirror-like surface to divide the surface into a plurality of fine mirror surfaces facing toward different directions, thereby dispersing the directions of reflection of the finely divided surfaces (mirrors). In the surface having the diffusion reflection of second kind, concave and convex portions are formed so that its average three-dimensional roughness with respect to the central plane falls in the range of 0.1–2 μm, and preferably 0.1–1.2 μm. The frequency of the concave and convex portions preferably falls in the range of 0.1–2000 cycles/mm, more preferably in the range of 50–600 cycles/mm when the concave and convex portions having a roughness not less than 0.1 μm are measured. The detail of such a support is described in JP-A-2-239,244.

At least one silver halide emulsion layer in the present invention contains particles of silver chloride, or silver chlorobromide which contains 95% or more by mole of silver chloride. Silver chloroiodobromide which contains 95% or more by mole of silver chloride may be used. In the present invention, it is preferable to use silver chloride or silver chlorobromide which is virtually free from silver iodide in order to accelerate a development process. The term "virtually free from silver iodide" means that the silver iodide content is 1 mol % or less, and preferably 0.2 mol % or less. In some cases, silver halide-rich grains containing 0.01 to 3 mol % of silver iodide as disclosed in JP-A-3-84, 545 may be preferably used in the emulsion surface in order to enhance sensitivity at high intensity of illumination, sensitivity of spectral sensitization, or stability of light-sensitive materials over time. Although the halogen composition of the emulsion may differ from grain to grain, use of an emulsion having an identical composition for every grain will easily make the performance of each grain uniform. Particles of the silver halide emulsion may have a uniform structure in which all parts of the grain have the same composition; a multilayer structure in which the core part of the grain and one or more shells which embrace the core have different halogen compositions; or a structure in which non-lamellar phases, inside or near the surface of the grain, having halogen compositions different from the remaining part (in the case where such phases are near the surface of a grain, a phase having a different composition) are bound onto the edges, corners or other parts of the grain. In order to obtain high sensitivity, either of the above latter two grain-structures are more advantageous than the uniform structure. The two latter structures are also advisable in view of pressure resistivity. When a silver halide grain has either one of these hetero-structures, the boundary between the phases having different halogen-compositions may be a clear-cut border, or may be an unclear border as a result of formation of mixed crystals based on the difference in composition. Alternatively, the structure may intentionally be varied continuously.

A silver chloride-rich emulsion in the present invention has a structure in which silver bromide is localized in a lamellar, as described above, or in a non-lamellar manner inside the grain and/or on the surface of the grain. Preferably, the composition of the phase in which silver bromide is localized contains at least 10 mol % and preferably more than 20 mol % of silver bromide. The silver bromide content of the phase in which silver bromide is localized (which hereinafter may be referred to as a localized phase) can be determined by X-ray diffraction (see, for example, "Structural Analysis—New Experimental Chemistry vol. 6" edited by the Japanese Chemical Society, published by Maruzen). Such a phase may be present inside the grain, at an edge or corner of the grain, or on the surface of the grain. A preferable example of the structure is one in which silver bromide is epitaxially grown at a corner of the grain.

It is also effective to elevate the amount of silver chloride contained in a silver halide emulsion in an attempt for reducing the amount of a developer to be replenished. For this purpose, it is preferable to use emulsions of approximately pure silver chloride, such as those containing 98 to 100 mol % of silver chloride.

It is preferable that the average grain size (the arithmetic mean of the values of the diameter of a circle which has an area equivalent to the projected area of the grain) of silver halide grains contained in the silver halide emulsion of the present invention is from 0.1 µm to 2 µm.

The distribution of the size of the grains is preferably a so-called monodispersion, which has a variation coefficient (a factor obtained by dividing the standard deviation of the grain size distribution by the average grain size) of not more than 204, preferably not more than 15%, and particularly preferably not more than 10%. In order to obtain a wide latitude, it is preferable that emulsions of monodispersion as described above are blended in the same layer, or that they are applied as multi-layers.

Particles of the silver halides in the photographic emulsions may have various configurations including regular crystal forms such as cubic, tetradecahedral, and octahedral; irregular crystal forms such as spheres and plates; and composites of them. The grains may be a mixture of various crystal forms. In the present invention, it is preferable that not less than 50%, more preferably not less than 70%, and most preferably not less than 90% of the grains have a regular crystal form. Alternatively, preferred are emulsions which contain tabular silver halide grains having an average aspect ratio (diameter of a circle/thickness) of not less than 5 and preferably not less than 8, in an amount over 50% of the total grains when measured from the projected area, the tabular grains.

The silver chloride (bromide) emulsions used in the invention can be prepared by the methods described, for example, by "hemie et Physique Photographique" by P. Glafkides, published by Paul Montel, 1967; "Photographic Emulsion Chemistry", by G. F. Duffin, published by Focal Press, 1966; and "Making and Coating Photographic Emulsion" by V. L. Zelikman et al., Focal Press, 1964. That is, any of the acid method, neutral method, and the ammonia method may be used. A soluble silver salt and a soluble halogen salt may be reacted by a unilateral mixing method, simultaneously mixing method, or by a combination of these methods. A method of forming grains in a silver ion-rich atmosphere (a so-called reverse mixing method) may also be used. A so-called controlled double jet method, which is a variety of the simultaneously mixing method, may be used in which pAg in a liquid phase where silver halide is produced is maintained constant. By this method, it is possible to obtain an emulsion of silver halide grains having an approximately uniform grain size and a regular crystal form.

The localized phase of silver halide grains and the matrix of the phase in the present invention preferably contain different metal ions or their complex ions. Preferable metal ions or metal complexes are selected from ions and complexes of the metals of the groups VIII and IIb in the periodic table, lead ions, and thallium ions. The localized phases mainly contain ions or complex ions of iridium, rhodium, iron, etc., and the matrix contains ions or complex ions of osmium, iridium, rhodium, platinum, ruthenium, palladium, cobalt, nickel, and iron. The kinds of metal ions and their concentrations may be varied between localized phases and the matrix. Plural kinds of metals may be used. Preferably, iron and iridium compounds are incorporated in phases in which silver bromide is localized.

The compounds capable of donating these metal ions may be incorporated into localized phases of silver halide grains and/or the remaining phase of the grains (matrices), by dissolving them in a dispersing solution such as an aqueous gelatin solution, aqueous halide solution, aqueous silver salt solution, or other aqueous solutions; or alternatively by addition of silver halide fine grains in which the metal ions are incorporated beforehand, followed by dissolving the fine grains.

Metal ions which may be used in the present invention are incorporated into grains of the emulsion, before, during, or immediately after the formation of the grains. The timing of incorporation will be decided, depending on parts in which the metal ions are to be incorporated.

The silver halide emulsion used in the invention may optionally contain various compounds or precursors thereof in order to inhibit fogging during the manufacturing process, storage, or photographic treatment, or to stabilize the photographic performance. Specific examples of preferable compounds are those described in the above-mentioned JP-A-62-215,272, from page 39 to page 72. Moreover, 5-arylamino- 1,2,3,4-thiatriazole (the aryl residue has at least one electron withdrawing group) described in European Patent No. 0447647 is also preferably used.

Spectral sensitization is performed for the purpose of imparting, to each emulsion layer of the light-sensitive material, spectral sensitivity in a desired range of wave length of light.

Examples of spectral sensitizing dyes used in the light-sensitive material of the invention for effecting spectral sensitization of the blue and green regions include those described in "Heterocyclic Compounds—Cyanine Dyes and related Compounds" by F. M. Harmer (published by John Wiley & Sons (New York, London), 1964). Specific description of the preferred compounds and spectral sensitization is given in the above-mentioned JP-A-62-215,272, page 22, right upper column to page 38.

In the light-sensitive materials according to the present invention, in order to effectively carry out spectral sensitization in the infrared region, use may be made of sensitizing dyes described in JP-A-3-15,049, page 12, upper left column to page 21, lower left column; JP-A-3-20,730, page 4, lower left column to page 15, lower left column, European Patent No. 0,420,011, page 4, line 21 to page 6, line 54, European Patent No. 0,420,012, page 4, line 12 to page 10, line 33, European Patent No. 0,443,466, and U.S. Pat. No. 4,975, 362.

In order to incorporate the above-mentioned spectral sensitizing dye(s) as well as a red-sensitive sensitizing dye defined in the invention into a silver halide emulsion, they may be directly dispersed into an emulsion; or they may be first dissolved in a single solvent of water, methanol, ethanol, propanol, methyl cellosolve, 2,2,3,3-tetrafluoropropanol, etc. or in a mixture of two or Lore of them, and then the resultant solution may be added to an emulsion. Alternatively, the dyes may be added to ah aqueous solution in which an acid or a base co-exists as described in JP-B-44-23,389, JP-B-44-27,555, JP-B-57-22089, etc.; or may be added to an aqueous solution or a colloidal dispersion by incorporation of a surfactant as described in U.S. Pat. Nos. 3,822,135 and 4,006,025, and subsequently, the resultant aqueous solution or dispersion may be added to an emulsion. It is also possible to dissolve the dyes in a solvent which is substantially immiscible with water such as phenoxyethanol, disperse the resultant solution in water or hydrophilic colloid, and then add it to an emulsion. As described in JP-A-53-102,733 and JP-A-58-105,141, a dispersion obtained by directly dispersing the dyes in a hydrophilic colloid may be added to an emulsion. The dyes may be added to an emulsion at any stage during the preparation of the emulsion which is known to be an advantageous stage. Specifically, the dyes may be added to an emulsion before or during the formation of grains of silver halide emulsion, during a period from immediately after the formation of grains of silver halide emulsion to just before a washing step, before or during chemical sensitization, during a period from immediately after the chemical sensitization to just before the emulsion is solidified, of during the preparation of a coating liquid. Generally, the spectral sensitizing dyes are added to an emulsion after completion of chemical sensitization and before coating. However, it is possible to add them at the same time of addition of a chemical sensitizer as described in U. S. Pat. Nos. 3,628,969 and 4,225 666 to perform spectral sensitization and chemical sensitization simultaneously, or to add them prior to chemical sensitization as described in JP-A-58-113,928. Moreover, spectral sensitization may be initialed by adding the spectral sensitizing dyes before silver halide grains are completely precipitated. It is also possible to add a spectral sensitizing dye in divided amounts as described in U.S. Pat No. 4,225,666, i.e., to add a part of the dye prior to chemical sensitization and add the remainder after chemical sensitization. Thus, the spectral sensitizing dye can be added at any stage during the formation of silver halide grains as in a manner described in U.S. Pat. No. 4,183,756, etc. It is particularly preferable that the sensitizing dyes are added before the washing step for an emulsion or before chemical sensitization.

The amounts of spectral sensitizing yes to be added fall in a wide range depending on the case. Preferably, the amount of the dyes is $0.5 \times 10^{-6}$ mol to $1.0 \times 10^{-2}$ mol per mol of silver halide, and more preferably, $1.0 \times 10^{-6}$ mol to $5.0 \times 10^{-3}$ mol per mol of silver halide.

In the present invention, when a sensitizing dye having spectral sensitivity in a range from red to infrared is used, it is preferred that a compound described in JP-A-2-157,749, from page 13, lower right column to page 22 lower right column is additionally used. Use of such a compound specifically enhances storability of light-sensitive materials, stability in processing, and effects of color sensitization. Particularly, combination use of the compounds of formulas (IV), (V), and (VI) in the publication is preferred. They are used in amounts from $0.5 \times 10^{-5}$ mol to $5.0 \times 10^{-2}$ mol per mol of silver halide, and more preferably, $5.0 \times 10^{-5}$ mol to $5.0 \times 10^{-3}$ mol per mol of silver halide. Good results can be obtained when they are used from 0.1 to 10,000 fold, preferably from 0.5 to 5,000 fold, per mol of a sensitizing dye.

The light-sensitive materials of the invention may be used not only in a printing system using an ordinary negative film printer, but also in a digital scanning exposure system in which use is made of monochromatic high density light generated from a gas laser; semiconductor laser; or a second harmonics generator (SHG) using a combination of a semiconductor laser or a solid state laser using a semiconductor laser as a excitation light source and non-linear optical crystal. In order to make the system compact and inexpensive, it is preferable to use a s semiconductive laser; or a second harmonics generator (SHG) based on a combination of a semiconductor laser or a solid state laser with a nonlinear optical crystal. For designing a compact and inexpensive apparatus which has a long life and high stability, a semiconductor laser is preferably used. At least one light source for exposure is preferably semiconductor laser.

In an SHG light source in which a solid state laser using a semiconductor laser as an excitation light source or a semiconductor laser is used in combination with a non-linear optical crystal, the oscillation wave length of laser can be halved. Thus blue light and green light are obtained. Therefore, it is possible to obtain maximal spectral sensitivities of the light-sensitive materials in ordinary three regions of blue, green and red. When a semiconductor laser is used as a light source in an attempt to make an inexpensive, highly stable, and compact apparatus, it is preferred that at least two layers have their maximal spectral sensitivities in the range of not less than 670 nm. This is because inexpensive and stable semiconductor lasers of III–V group which are presently available have an oscillation wave range only in the range from red to infrared. However, in laboratories, oscillation of semiconductors of II—VI group in green and blue ranges has been confirmed. Therefore, it is foreseeable that the semiconductor laser could be supplied stably and used inexpensively if manufacturing technology for semiconductor laser advances. In such a case, requirements that at least two layers have maximal spectral sensitivities in the range of not less than 670 nm will have less significance.

In scanning exposure, the period during which silver halide contained in a light-sensitive material is exposed is a period required for exposing a certain very small area. The very small area is called a pixel, and is generally taken as a minimum unit in which the quantity of light can be controlled by digital data. Accordingly, the size of the pixel affects the period of exposure per pixel. The size of a pixel depends on the density of pixels which, realistically, is in the range from 50 to 2,000 dpi. When exposure time is defined as a period for exposing a pixel having a density of 400 dpi, the exposure time is preferably not more than $10^{-4}$ seconds, and more preferably not more than $10^{-6}$ seconds.

The light-sensitive materials of the invention may optionally contain, in hydrophilic colloidal layers, water-soluble dyes (particularly, oxonole and cyanine dyes) which can be discolored during processing and which are described in European Patent No. 0337490A2, page 27 to page 76, in order to prevent irradiation or halation or to enhance safelight immunity.

Among the water-soluble dyes, some cause color separation or deteriorate safelight immunity when used in an increased amount. Preferable examples of dyes which can be used and which do not aggravate color separation include water soluble dyes described in EP 0,539 978, JP-A-5-127325 and JP-A-5-127324.

In the present invention, it is possible to use a colored layer which can be discolored, during processing, instead of or in combination with the water-soluble dye. The colored layer to be used may contact an emulsion layer directly or indirectly through an intermediate layer containing color amalgamation preventing agents such as gelatin and hydroquinone. The colored layer is preferably provided as a lower layer (on the side of a support) with respect to the emulsion layer which develops the safe primary color as the color of the colored layer. It is possible to provide colored layers independently, each corresponding to respective primary colors. Alternatively, one layer selected from them may be provided. In addition, it is possible to provide a colored layer subjected to coloring so as to match a plurality of primary colors. About the optical reflection density of the colored layer it is prefer that at the wavelength which provides the highest optical density in a range of wave lengths used for exposure ( visible light region from 400 nm to 700 nm for an ordinary printer exposure, and the wavelength of the light generated from the light source in the case of scanning exposure) the optical density is within the range of 0.2 to 8.0 more preferably 0.5 to 2.5, and particularly preferably 0 8 to 2.0.

The colored layer described above may be formed by a known method. For example, there are mentioned a method in which dyes in a state of solid fine particle dispersion are incorporated into hydrophilic colloidal layer as described in JP-A-2-282,244, from page 3, upper right column to page 8, and JP-A-3-7931, page 3, upper right column to page 11, lower left column, a method in which anionic dyes are mordanted in a cationic polymer, a method in which dyes are adsorbed onto fine grains of silver halide or the like and fixed in the layer, and a method in which colloidal silver described in JP-A-1-239,544 is used. As a for dispersing fine dye particles in a solid state, JP-A-2-308244, pp. 4–13, discloses a method of incorporating fine dye particles which is substantially water-insoluble at a pH 6 or less and substantially water-soluble at pH 8 or more. The method of mordanting anionic dyes in a cationic polymer is described in JP-A-2-84,637, pages 18 to 26. U.S. Pat. Nos. 2,688,601 and 3,459,563 disclose a method of preparing a colloidal silver for use as a light absorber. Among them, preferred are the methods of incoporating fine particle dyes and of using colloidal silver.

A binder or protective colloid used in the light-sensitive material according to the invention is preferably gelatin. However, hydrophilic colloids other than gelatin may also be used solely or in combination with gelatin. Gelatin is preferably a low calcium gelatin, which contains not more than 800 ppm, more preferably not more than 200 ppm, of calcium. In order to prevent various fungi and microorganisms, which deteriorate picture images, from propagating in hydrophilic layers, it is preferred that mildewproof agents as described in JP-A-63-271,247 are added.

When the light-sensitive materials of the present invention are subjected to exposure with a printer, it is preferred that a band-stop filter described in U.S. Pat. No. 4,880,726 is used. With the filter, color or amalgamation of light is eliminated, thereby remarkably enhancing color reproduction.

The exposed light-sensitive materials can be developed by an ordinary color developing process. In order to achieve a rapid processing, the color photographic light-sensitive materials according to the present invention may be subjected to a bleaching-fixing process after a color-developing process has been completed. Especially in the case where a silver chloride-rich emulsion is used, the pH of a bleach-fix bath is preferably not m than about 6.5, and more preferably not more than about for accelerating desilvering.

The patent application publication listed in the tables 1–5 below disclose preferable examples of silver halide emulsions and other materials (such as additives) used in light-sensitive materials of the invention, structures of photographic layers (such as arrangement of layers), methods of processing the sensitive materials, additives used for processing. Among them, those described in European Patent Application No. 0,355,660 A2 ( A-2-139,544) are particularly preferred.

TABLE 1

| Photographic constituents, and the like | JP-A-62-215272 | JP-A-2-33144 | EPO No. 355,660A2 |
|---|---|---|---|
| Silver halide emulsions | Page 10, right upper column, line 6 to page 12, left lower | Page 28, right upper column, line 16 to page 29, right lower | Page 45, line 53 to page 47, line 3, and page 47, line |

TABLE 1-continued

| Photographic constituents, and the like | JP-A-62-215272 | JP-A-2-33144 | EPO No. 355,660A2 |
|---|---|---|---|
| | column, line 5, and page 12, right lower column, 4th line from the last line to page 13, left upper column, line 17 | column, line 11, and page 30, line 2 to line 5 | 20 to line 22 |
| Silver halide solvents | Page 12, left lower column, line 6 to line 14, and page 13, left upper column, 3rd line from the last line to page 18, left lower column, the last line | — | — |
| Chemical sensitizers | Page 12, left lower column, 3rd line from the last line to right lower column, 5th line from the last line, and page 18, right lower column, line 1 to page 22, right upper column, 9th line from the last line | Page 29, right lowe column, line 12 to the last line | Page 47, line 4 to line 9 |
| Spectral sensitizers (Spectral sensitizing methods) | Page 22, right upper column, 8th line from the last line to page 38, the last line | Page 30, left upper column, line 1 to line 13 | Page 47, line 10 to line 15 |
| Emulsion stabilizers | Page 39, left upper column, line 1 to page 72, right upper column, the last line | Page 30, left upper column, line 14 to right upper column, line 1 | Page 47, line 16 to line 19 |
| Development accelerators | Page 72, left lower column, line 1 to page 91, right upper column, line 3 | — | — |

TABLE 2

| Photographic constituents, and the like | JP-A-62-215272 | JP-A-2-33144 | EPO No. 355,660A2 |
|---|---|---|---|
| Color couplers (Cyan, magenta, yellow couplers) | Page 91, right upper column, line 4 to page 121, left upper column, line 6 | Page 3, right upper column, line 14 to page 18, left upper column, the last line, and page 30, right upper column, line 6 to page 35, right lower column, line 11 | Page 4, line 15 to line 27, page 5, line 30 to page 28, the last line, page 45, line 29 to line 31, and page 47, line 23 to page 63, line 50 |
| Color increasing agents | Page 121, left upper column, line 7 to page 125, right upper column, line 1 | — | — |
| UV absorbers | Page 125, right upper column, line 2 to page 127, left lower column, the last line | Page 37, right lower column, line 14 to page 38, left upper column, line 11 | Page 65, line 22 to line 31 |
| Anti-fading agents (Image stabilizers) | Page 127, right lower column, line 1 to page 137, left lower column, line 8 | Page 36, right upper column, line 12 to page 37, left upper column, line 19 | Page 4, line 30 to page 5, line 23, page 29, line 1 to page 45, line 25, page 45, line 33 to line 40, and |

TABLE 2-continued

| Photographic constituents, and the like | JP-A-62-215272 | JP-A-2-33144 | EPO No. 355,660A2 |
|---|---|---|---|
| | | | page 65, line 2 to line 21 |
| High B.P. and/or low B.P. organic solvents | Page 137, left lower column, line 9 to page 144, right upper column, the last line | Page 35, right lower column, line 14 to page 36, left upper column, 4th line from the last line | Page 64, line 1 to line 51 |
| Method of dispersing photographic additives | Page 144, left lower column, line 1 to page 146, right upper column, line 7 | Page 27, right lower column, line 10 to page 28, left upper column, the last line and page 35, right lower column, line 12, to page 36, right upper column, line 7 | Page 63, line 51 to page 64, line 56 |

TABLE 3

| Photographic constituents, and the like | JP-A-62-215272 | JP-A-2-33144 | EPO No. 355,660A2 |
|---|---|---|---|
| Hardening agents | Page 146, right upper column, line 8 to page 155, left lower column, line 4 | — | — |
| Developing agent precursors | Page 155, left lower column, line 5 to page 155, right lower column, line 2 | — | — |
| Development inhibitor releasing compounds | Page 155, right lower column, line 3 to line 9 | — | — |
| Supports | Page 155, right lower column, line 19 to page 156, left upper column, line 14 | Page 38, right upper column, line 18 to page 39, left upper column, line 3 | Page 66, line 29 to page 67, line 13 |
| Constitution of sensitive material layers | Page 156, left upper column, line 15 to page 156, right lower column, line 14 | Page 28, right upper column, line 1 to line 15 | Page 45, line 41 to line 52 |
| Dyes | Page 156, right lower column, line 15 to page 184, right lower column, the last line | Page 38, left upper column, line 12 to right upper column, line 7 | Page 66, line 18 to line 22 |
| Color mixing inhibitors | Page 185, left upper column, line 1 to page 188, right lower column, line 3 | Page 36, right upper column, line 8 to line 11 | Page 64, line 57 to line 65, line 1 |
| Gradation adjusting agents | Page 188, right lower column, line 4 to line 8 | — | — |

TABLE 4

| Photographic constituents, and the like | JP-A-62-215272 | JP-A-2-33144 | EPO No. 355,660A2 |
|---|---|---|---|
| Antistain agents | Page 188, right lower column, line 9 to page 193, right lower column, line 10 | Page 37, left upper column, the last line to right lower column, line 13 | Page 65, line 32 page 66, line 17 |
| Surfactants | Page 201, left lower column, line 1 to page 210, right upper column, the | Page 18, right upper column, line 1 to page 24, right lower column, the last | — |

TABLE 4-continued

| Photographic constituents, and the like | JP-A-62-215272 | JP-A-2-33144 | EPO No. 355,660A2 |
|---|---|---|---|
| | last line | line, and page 27, left lower column, 10th line from the last line to right lower column, line 9 | |
| Fluorine-containing compounds (For use as antistatic agents, coating aids, lubricants, antiadhesive agent, etc.) | Page 210, left lower column, line 1 to page 222, left lower column, line 5 | Page 25, left upper column, line 1 to page 27, right lower column, line 9 | — |
| Binders (Hydrophilic colloids) | Page 222, left lower column, line 6 to page 225, left upper column, the last line | Page 38, right upper column, line 8 to line 18 | Page 66, line 23 to line 28 |
| Thickeners | Page 225, right upper column, line 1 to page 227, right upper column, line 2 | — | — |
| Antistatic agents | Page 227, right upper column, line 3 to page 230, left upper column, line 1 | — | — |

TABLE 5

| Photographic constituents, and the like | JP-A-62-215272 | JP-A-2-33144 | EPO No. 355,660A2 |
|---|---|---|---|
| Polymer latex | Page 230, left upper column, line 2 to page 239, the last line | — | — |
| Matte agents | Page 240, left upper column, line 1 to page 240, right upper column, the last line | — | — |
| Photographic processing methods (processing steps, additives, etc) | Page 3, right upper column, line 7 to page 10, right upper column, line 5 | Page 39, left upper column, line 4 to page 42, left upper column, the last line | Page 67, line 14 to page 69, line 28 |

Note:
The cited portions of JP-A-62-215272 include portions which have been amended by an amendment dated March 16, 1987, which is appended to the end of the published specification. Further, it is preferable to use, as yellow couplers among the above mentioned color couplers, so-called yellow couplers of a short wavelength type, which are disclosed in JP-A-63-231451, JP-A-63-123047, JP-A-63-241547, JP-A-1-173499, JP-A-1-213648 and JP-A-1-250944.

It is preferred that cyan, magenta, and yellow couplers are emulsified and dispersed in an aqueous hydrophilic colloidal solution, after they are incorporated in loadable latex polymers (see, for example, U.S. Pat. No. 4,203,716) in the presence or absence of high boiling point organic solvents listed in the above tables, or after they are dissolved along with polymers which are insoluble in water but soluble n organic solvents.

Preferable examples of the polymers which are insoluble in water but soluble in organic solvents include homopolymers or copolymers described in U.S. Pat. No. 4,857,449, from column 7 to column 15, and WO88/0723, pages 12 to 30. Specifically, methacrylate or acrylamide polymers, particularly acrylamide polymers, are preferred stabilizing image.

It is preferred that the light-sensitive materials of the present invention contain compounds of improving color image storability as described in EP No. 0 277,589 A2 together with couplers. Particularly, use in combination with pyrazoloazole couplers, pyrrolotriazole couplers, or acylacetamide yellow couplers is preferred.

In other words, in order to prevent sub-effect such as generation of stains due to formation of color developing dyes by reaction, during storage after processing, of a primary developer remaining in a membrane or its oxidation product with a coupler, it is preferred that the compounds described in the above European Patent Application are used singly or in combination, the compounds being capable of chemically binding to a primary developer of aromatic amine remaining after the color developing process so as to produce chemically inert and substantially colorless compounds, or being capable of chemically binding to an oxidation product of a primary developer of aromatic amine remaining after the color developing process so as to produce chemically inert and substantially colorless compounds.

Examples of cyan couplers which can be additionally used in the present invention include phenol type couplers and naphthol type couplers described in the publications in the table above, diphenylimidazole type cyan couplers described in JP-A-2-33,144, 3-hydroxypyridine type cyan couplers described in EP-0,333,185 A2, cyclic active methylene type cyan couplers described in JP-A-64-32, 60, pyrrolopyrazole type cyan couplers described in EP No. 0,456,226 A1, pyrroloimidazole type cyan couplers described in EP-0,484,909, and pyrrolotriazole type cyan couplers described in EP-0,488,248 and EP-0,491,197 A1. Among them, pyrrolotriazole type cyan couplers are particularly preferred.

Examples of magenta couplers include 5-pyrazolone magenta couplers described in the publications in the table above. In view of picture image storability and less variation in image quality, preferred are the 5-pyrazolone type magenta couplers from which arylthio groups leave and which are described in WO92/18901, WO92/18902 and WO 92/18903.

Known pyrazoloazole couplers may be used. Among them preferred are pyrazoloazole couplers containing a sulfonamide group in the molecule and pyrazoloazole couplers in which a secondary or tertiary alkyl is directly bound to the pyrazoloazole ring at its 2, 3 or 6 position, as described in JP-A-61-65,246; pyrazoloazole couplers an alkoxyphenylsulfonamide ballast group, as described in JP-A-61-147, 254; and pyrazoloazole couplers having an alkoxy group or aryloxy group at the 6- position described in EP-226,849 A and EP-294,785 A, in the light of hue, image-stabilization, and color-developing property.

As for yellow couplers, known acylacetoanilide couplers are preferably used. Among them, preferred are pivaloyl acetoanilide type couplers having a halogen atom or an alkoxy group at the ortho- position of an anilide ring; acylacetanilide type couplers in which the acyl group is a cycloacyl carbonyl group substituted at the 1- position described in EP-0,447,969 A, JP-A-5-107,701, d JP-A-5-113,642; and malondianilide type couplers described in EP-0,482,552 A and EP-0,524,540 A.

The sensitive materials according to the present invention are preferably processed by the method listed in the above table, or by using the materials and methods described in JP-A-2-207250, from page 26, lower right column, line 1 to page 34, upper right column, line 9, and JP-A-4-97,355, from page 5, upper left column, line 17 to page 18 lower right column, line 20.

EXAMPLES

Hereinafter, the present invention be described by way of examples, which are not intended to 1 the invention thereto.

Example 1

(Preparation of silver chloride-rich emulsion C1)

Sodium chloride (3.3 g) was added to aqueous 3% solution of lime-processed gelatin. To the resulting solution, aqueous solution containing 0.5 mol of silver nitrate and aqueous solution containing 0.5 mol of sodium chloride were added under vigorous agitation for mixing. Subsequently, aqueous solution containing silver nitrate (0.45 mol) aqueous solution containing potassium hexacyanoferrate(II).$3H_2O$ (4 mg) and sodium chloride (0.45 mol) were added at 66° C. with vigorous stirring. The temperature of the resulting mixture was allowed to drop to 40° C. Desalting and washing were performed. Moreover, lime-processed gelatin (90.0 g) was added and thus the pH and pAg were adjusted to 6.5 and 7.2, respectively. A red-sensitive sensitizing dye (P1, $3\times10^{-4}$), emulsion containing very fine silver bromide particles (average grain size: 0.05 μm) in an amount equivalent to 1 mol % of silver halide, triethylthiourea were added. Then, optimal spectral sensitization and chemical sensitization were achieved to obtain emulsion (emulsion C1).

Electron microscopy was performed of the obtained silver chloride-rich emulsion C1 with respect to the shape of the particles, particles size, and the distribution of the particles. The silver halide particles were cubic with size of 0.55 μm. The variation coeffificient of the particle size distribution was 0.07. The particle size was represented by the mean value of the diameter of a circle which has an area equivalent to the projected area of the particle. The distribution of particle sizes was the value obtained by dividing the standard deviation of the particle sizes by the mean particle size (Preparation of silver chloride-rich emulsions C2 to C26)

In a manner similar to that described above, emulsions C2 to C26 were prepared using different kinds amounts of a red-sensitive spectral sensitizing dye, a chemical sensitiser, a thiosulfonic compound, and a sulfinic compound so that optimal effects could be obtained. The particulars are shown in Table 6. The red-sensitive spectral sensitizing, chemical sensitizers, thiosulfonic compounds and sulfinic compounds which were used in this Example are shown below.

TABLE 6

| Emulsion | Red-sensitive spectral sensitizing dye ($5 \times 10^{-5}$ mol/mol Ag) | Chemical sensitizer | Thiosulfonic compound (mol/mol Ag) | Sulfinic compound (mol/mol Ag) | Note |
|---|---|---|---|---|---|
| C1 | P1 | S (α) | — | — | Comparative examples |
| C2 | " | Au (β – 1) | — | — | |
| C3 | " | Se (γ – 1) | — | — | |
| C4 | " | Te (δ – 1) | — | — | |
| C5 | " | Au (β – 1) | X-16 ($5 \times 10^{-6}$) | — | |
| C6 | " | Au (β – 1) | X-16 ($5 \times 10^{-6}$) | Y-16 ($5 \times 10^{-6}$) | |
| C7 | " | Se (γ – 1) | X-16 ($5 \times 10^{-6}$) | Y-16 $5 \times 10^{-6}$) | |
| C8 | " | Te (δ – 1) | X-16 ($5 \times 10^{-6}$) | Y-16 $5 \times 10^{-6}$) | |
| C9 | " | S (α) | X-16 ($5 \times 10^{-6}$) | Y-16 ($5 \times 10^{-6}$) | |
| C10 | P2 | Au (β – 1) | — | — | |
| C11 | " | Au (β – 1) | X-16 ($5 \times 10^{-6}$) | — | |
| C12 | " | Au (β – 1) | — | Y-16 ($5 \times 10^{-6}$) | |
| C13 | " | Au (β – 1) | X-16 ($5 \times 10^{-6}$) | Y-16 ($5 \times 10^{-6}$) | Examples of the invention |
| C14 | " | Au (β – 2) | X-8 ($5 \times 10^{-6}$) | Y-8 ($5 \times 10^{-6}$) | |
| C15 | " | Au (β – 2) | X-27 ($5 \times 10^{-6}$) | Y-20 ($5 \times 10^{-6}$) | |

TABLE 6-continued

| Emulsion | Red-sensitive spectral sensitizing dye ($5 \times 10^{-5}$ mol/mol Ag) | Chemical sensitizer | Thiosulfonic compound (mol/mol Ag) | Sulfinic compound (mol/mol Ag) | Note |
|---|---|---|---|---|---|
| C16 | " | Se ($\gamma - 1$) | X-16 ($5 \times 10^{-6}$) | Y-16 ($5 \times 10^{-6}$) | |
| C17 | " | Se ($\gamma - 1$) | X-16 ($2 \times 10^{-6}$) | Y-16 ($1 \times 10^{-6}$) | |
| C18 | " | Te ($\delta - 1$) | X-8 ($5 \times 10^{-6}$) | Y-8 ($5 \times 10^{-6}$) | |
| C19 | " | Te ($\delta - 1$) | X-27 ($5 \times 10^{-6}$) | Y-20 ($2 \times 10^{-6}$) | |
| C20 | P3 | Au ($\beta - 1$) | X-8 ($5 \times 10^{-6}$) | Y-8 ($5 \times 10^{-6}$) | |
| C21 | " | Se ($\gamma - 2$) | X-27 ($5 \times 10^{-6}$) | Y-20 ($2 \times 10^{-6}$) | |
| C22 | " | Te ($\delta - 2$) | X-16 ($5 \times 10^{-6}$) | Y-16 ($5 \times 10^{-6}$) | |
| C23 | P4 | Au ($\beta - 2$) | X-8 ($5 \times 10^{-6}$) | Y-8 ($5 \times 10^{-6}$) | |
| C24 | " | Au + Se ($\beta - 1, \gamma - 1$) | X-16 ($2 \times 10^{-6}$) | Y-16 ($1 \times 10^{-6}$) | |
| C25 | " | Au + S ($\beta - 1, \alpha$) | X-16 ($2 \times 10^{-6}$) | Y-16 ($1 \times 10^{-6}$) | |
| C26 | " | Te ($\delta - 2$) | X-16 ($2 \times 10^{-6}$) | Y-16 ($1 \times 10^{-6}$) | |

Compounds P1 to P4 were used as the red-sensitive spectral sensitizing dye. Their amounts were as indicated in Table 6, and the compounds were added prior to chemical sensitization.

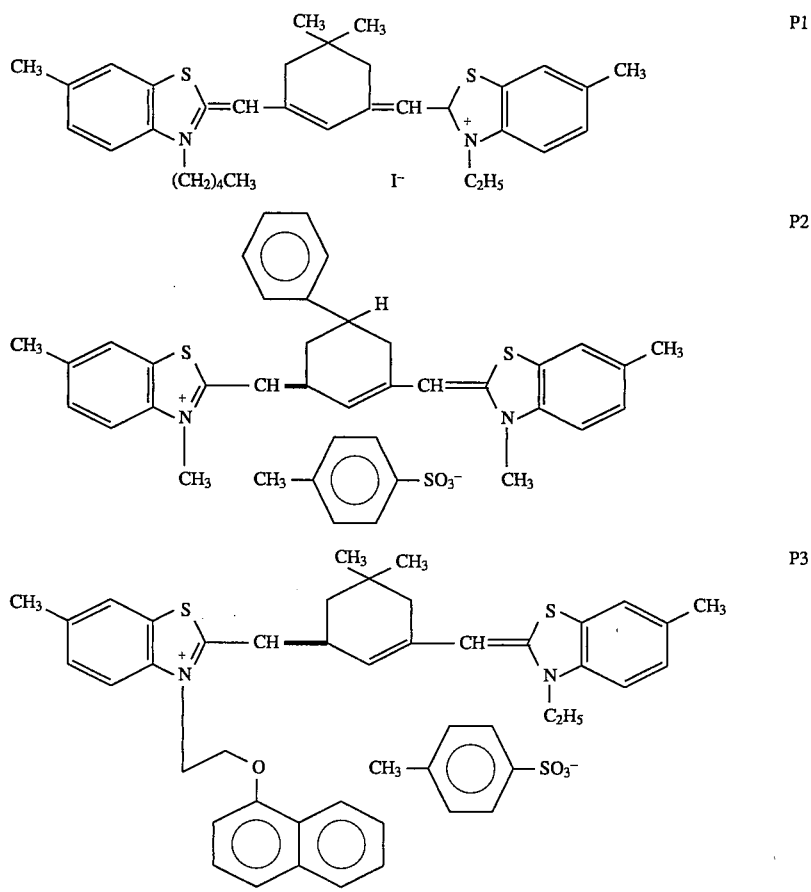

-continued

P4

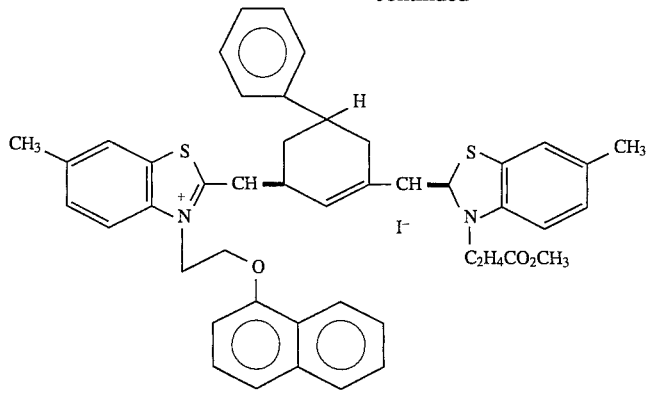

The following compounds were used as chemical sensitizers, and an optimal chemical sensitization was achieved.

Sulfur sensitizer

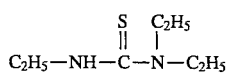 (α)

Gold sensitizer $KAuCl_4$ (β-1)

$Au_2S$ (β-2)

Solenium sensitizer

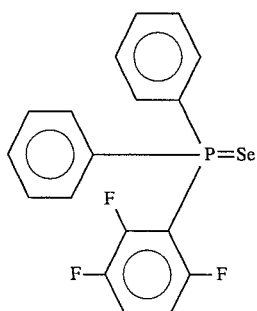 (γ-1)

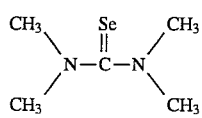 (γ-2)

Tellurium sensitizer

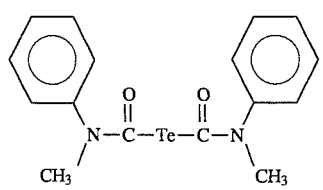 (δ-1)

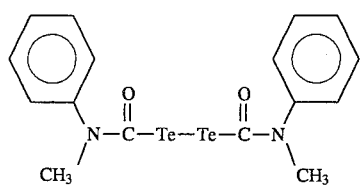 (δ-2)

The thiosulfonic compounds and the sulfinic compounds as well as their amounts of addition are as shown in Table 6. They were both added during the step of chemical sensitization.

A surface of a paper support, both surfaces of which were laminated with polyethylene, was subjected to a corona discharging treatment, and thereafter a gelatin undercoat layer containing sodium dodecylbenzenesulonate was provided thereon. Furthermore, various photographic constituent layers were formed thereon to prepare a multilayer color printing paper having the layer structure as described below. The coating solutions were prepared in the following manner.

Preparation of a coating solution for the fifth layer:

28.0 g of a cyan coupler (ExC), 19.0 g of a UV absorber (UV-2), 4.0 g of a color image stabilizer (Cpd-9), 1.0 g of a color image stabilizer (Cpd-10), 1.0 g of color image stabilizer (Cpd-8), 1.0 g of a color image stabilizer (Cpd-6), and 24.0 g of a color image stabilizer (Cpd-1) were dissolved in a mixture of a solvent (Solv-1, 1.0 g) and another solvent (Solv-6, 21.0 g), and ethyl acetate (33 ml). The result ng solution was added to aqueous 20% gelatin solution (270 ml) containing 7.0 g of sodium dodecylbenzenesulfonate, after which the mixture was emulsified and dispersed with a high-speed rotary emulsifier to prepare Emulsion C.

The thus-obtained emulsion C and the above-described silver chloride-rich emulsion C1 were combined and dissolved to prepare a coating solution for the fifth layer having the formulation shown below.

Coating solutions for the first to layers, the sixth layer, and the seventh layer were prepared in a manner similar to the above. A sodium salt of 1 oxy-3,5-dichloro -s-triazine was used as a gelatin setting agent in each layer.

Also, Cpd-12, Cpd-13, Cpd-14, and Cp 15 were added in each layer so that their total amounts would become 15.0 mg/m², 60.0 mg/m², 5.0 mg/m² and 10.0 mg/m², respect For the silver chloride-rich emulsion in each light-sensitive emulsion layer, the following spectral sensitizing dyes were used:

Blue sensitive emulsion layer:

Sensitizing Dye A

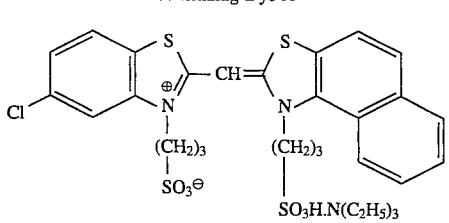

-continued

Sensitizing Dye B

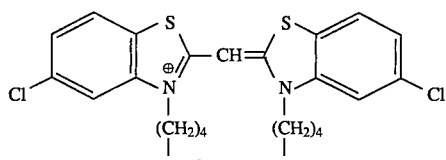

Sensitizing Dye C

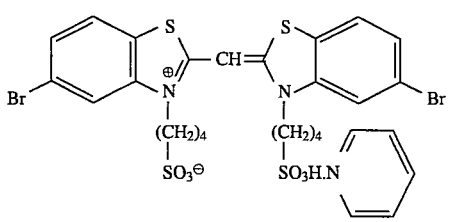

The above compound was added to emulsion of large grains in an amount of $1.4 \times 10^{-4}$ mol/mol silver halide, and to emulsion of small grains in an amount of $1.7 \times 10^{-4}$ mol/mol silver halide.
Green sensitive emulsion layer:

Sensitizing Dye D

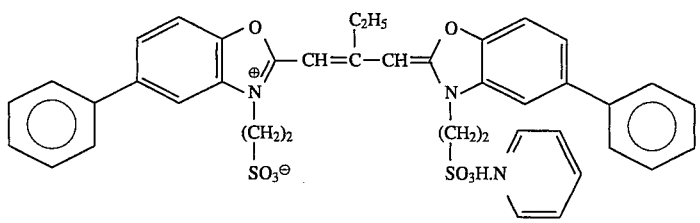

Sensitizing Dye E

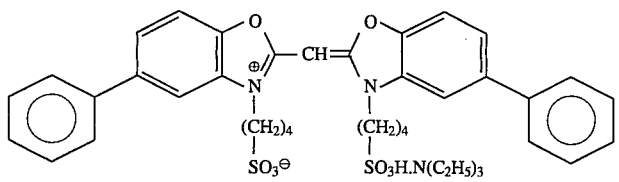

Sensitizing Dye F

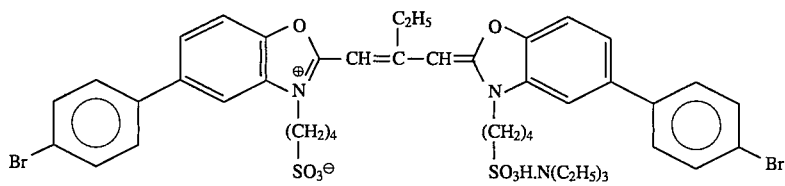

The sensitizing dye D was added to emulsion of large grains in an amount of $3.0 \times 10^{-4}$ mol/mol silver halide, and to emulsion of small grains in an amount of $3.6 \times 10^{-4}$ mol/mol silver halide. The sensitizing dye E was added to an emulsion of large grains in an amount of $4.0 \times 10^{-5}$ mol/mol silver halide, and to emulsion of small grains in an amount of $7.0 \times 10^{-5}$ mol/mol silver halide. The sensitizing dye F was added to emulsion of large grains in an amount of $2.0 \times 10^{-4}$ mol/mol silver halide, and to emulsion of small grains in an amount of $2.8 \times 10^{-4}$ mol/mol silver halide.
Red sensitive emulsion layer:

In addition to the red-sensitive spectral sensitizing dye, the following compound was further incorporated in an amount of $2.6 \times 10^{-3}$ per mol of silver halide.

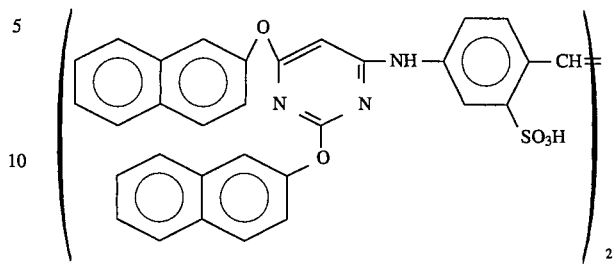

Also, 1-(5-methylureidophenyl)-5-mercaptotetrazole was added to the blue sensitive emulsion layer, the green sensitive emulsion layer, and red sensitive emulsion layer, in amounts of $3.5 \times 10^{-4}$ mol, $3.0 \times 10^{-3}$ mol and $2.5 \times 10^{-4}$ mol, respectively, per mol of silver halide.

Additionally, 4-hydroxy-6-methyl-1,3,3a,7-tetrazaindene was added to the blue sensitive emulsion layer and the green sensitive emulsion layer in amounts of $1 \times 10^{-4}$ mol and $2 \times 10^{-4}$ mol, respectively, per mol of silver halide.

The below-described dyes were further added to the emulsion layers for preventing irradiation (values in parentheses indicate the amount of dies applied).

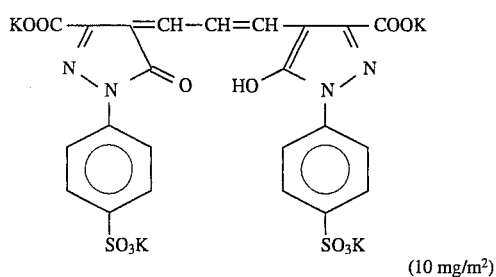

(10 mg/m²)

and

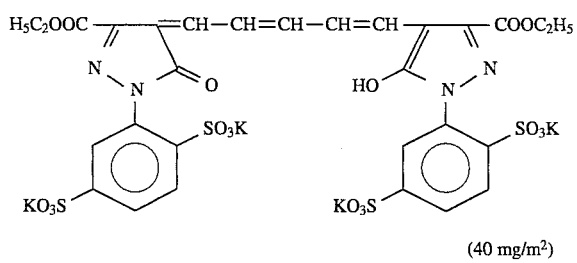

(40 mg/m²)

Structure of the layers

The composition of each layer is shown below, wherein the figures indicate the amounts of coating (g/m²). The amount of silver halide is shown by the amount of silver contained therein.

Support:

Polyethylene-laminated paper:

(The polyethylene film on the side of the first layer contained a white pigment (TiO₂) and a bluish dye (ultramarine).

| First layer (blue sensitive emulsion layer): | |
|---|---|
| Silver chlorobromide emulsion A: | 0.24 |
| (cubic, a mixture of large grain emulsion A having an average grain size of 0.88 μm and small grain emulsion A having an average grain size of 0.70 μm (3:7 in molar ratio of silver)). The variation coefficients of distribution of the grain sizes were 0.08 for the large grains and 0.10 for the small grains. In the grains of both sizes, 0.3 mol % of silver bromide was locally included into a part of the grain surface portions, and the remainder was silver chloride.) | |
| Gelatin | 1.33 |
| Yellow coupler (ExY) | 0.61 |
| Color image stabilizer (Cpd-1) | 0.08 |
| Color image stabilizer (Cpd-2) | 0.04 |
| Color image stabilizer (Cpd-3) | 0.08 |
| Solvent (Solv-1) | 0.22 |
| Second layer (color amalgamation inhibiting layer): | |
| Gelatin | 1.09 |
| Color amalgamation preventing agent (Cpd-4) | 0.11 |
| Solvent (Solv-1) | 0.07 |
| Solvent (Solv-2) | 0.25 |
| Solvent (Solv-3) | 0.25 |
| Solvent (Solv-7) | 0.09 |
| Third layer (green sensitive emulsion layer): | |
| Silver chlorobromide emulsion B: | 0.11 |
| (cubic, a mixture of large grain emulsion B having an average grain size of 0.55 μm and small grain emulsion B having an average grain size of 0.39 μm (1:3 in molar ratio of silver)). The variation coefficients of distribution of the grain sizes were 0.10 for the large grains and 0.08 for the small grains. In the grains of both sizes, 0.8 mol % of silver bromide was locally included into a part of the grain surface portions, and the remainder was silver chloride.) | |
| Gelatin | 1.19 |
| Magenta coupler (ExM) | 0.12 |
| Ultraviolet absorber (UV-1) | 0.12 |
| Color image stabilizer (Cpd-2) | 0.01 |
| Color image stabilizer (Cpd-5) | 0.01 |
| Color image stabilizer (Cpd-6) | 0.01 |
| Color image stabilizer (Cpd-7) | 0.08 |
| Color image stabilizer (Cpd-8) | 0.01 |
| Solvent (Solv-4) | 0.30 |
| Solvent (Solv-5) | 0.15 |
| Fourth layer (color amalgamation inhibiting layer): | |
| Gelatin | 0.77 |
| Color amalgamation preventing agent (Cpd-4) | 0.08 |
| Solvent (Solv-1) | 0.05 |
| Solvent (Solv-2) | 0.18 |
| Solvent (Solv-3) | 0.14 |
| Solvent (Solv-7) | 0.06 |
| Fifth layer (red sensitive emulsion layer): | |
| The above-described silver chloride-rich emulsion C1 | 0.18 |
| Gelatin | 0.80 |
| Cyan coupler (ExC) | 0.28 |
| Ultraviolet absorber (UV-3) | 0.19 |
| Color image stabilizer (Cpd-1) | 0.24 |
| Color image stabilizer (Cpd-6) | 0.01 |
| Color image stabilizer (Cpd-8) | 0.01 |
| Color image stabilizer (Cpd-9) | 0.04 |
| Color image stabilizer (Cpd-10) | 0.01 |
| Solvent (Solv-1) | 0.01 |
| Solvent (Solv-6) | 0.21 |
| Sixth layer (Ultraviolet absorbing layer): | |
| Gelatin | 0.64 |
| Ultraviolet absorber (UV-2) | 0.39 |
| Color image stabilizer (Cpd-7) | 0.05 |
| Solvent (Solv-8) | 0.05 |
| Seventh layer (Protective layer): | |
| Gelatin | 1.01 |
| Acrylic modified copolymer of polyvinylalcohol (rate of modification: 17%) | 0.04 |
| Liquid paraffin | 0.02 |
| Surfactant (Cpd-11) | 0.01 |

The compounds used in the above layers are listed below:

(ExY) Yellow Coupler

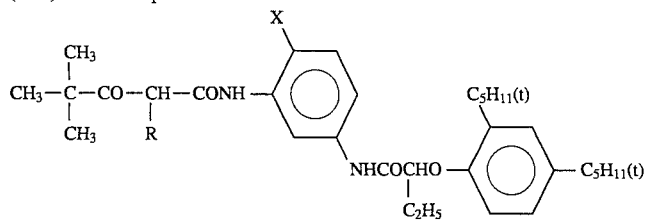

-continued
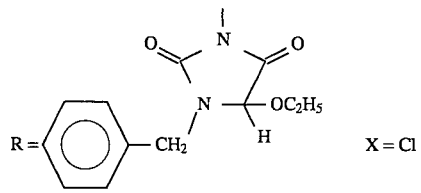   X = Cl
(ExM) Magenta Coupler
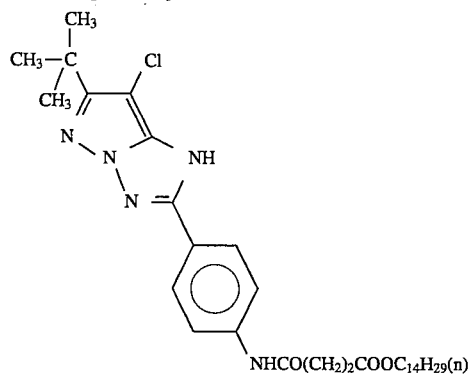
(ExC) Cyan Coupler
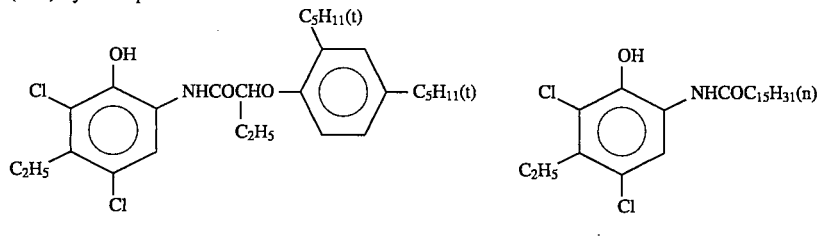
(Cpd-1) Color Image Stabilizer
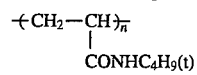
Numerical average molecular weight: 60,000
(Cpd-2) Color Image Stabilizer
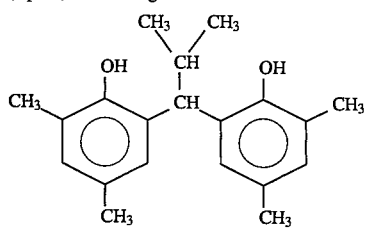
(Cpd-3) Color Image Stabilizer
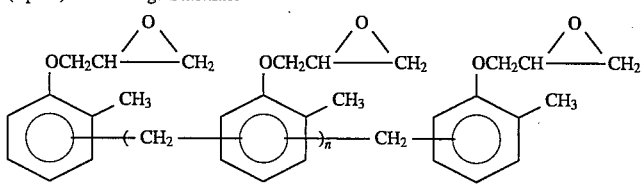
n = 7~8 (average)
(Cpd-4) Color amalgamation preventing Agent
Mixture of
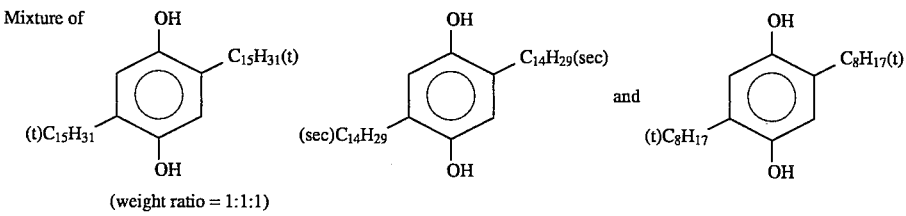
and
(weight ratio = 1:1:1)

(Cpd-5) Color Image Stabilizer

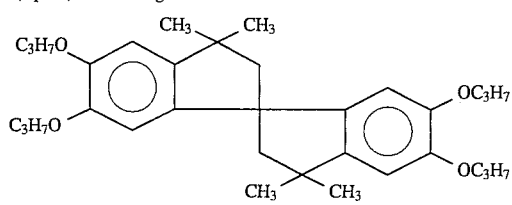

(Cpd-6) Color Image Stabilizer

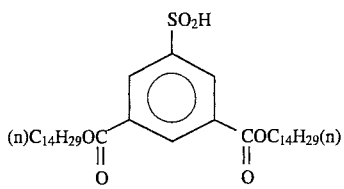

(Cpd-7) Color Image Stabilizer

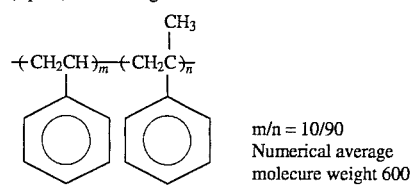

m/n = 10/90
Numerical average
molecure weight 600

(Cpd-8) Color Image Stabilizer

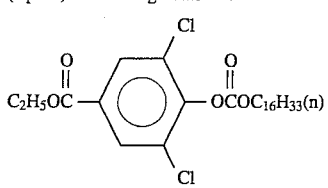

(Cpd-9) Color Image Stabilizer

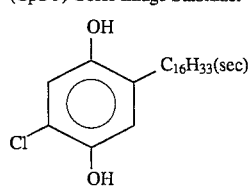

(Cpd-10) Color Image Stabilizer

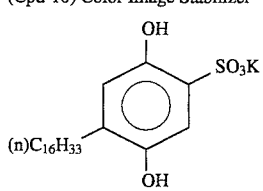

(Cpd-11) Surfactant
Mixture of

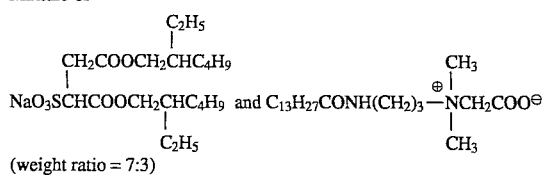

(weight ratio = 7:3)

(Cpd-12) Preservative

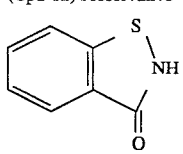

(Cpd-13) Preservative

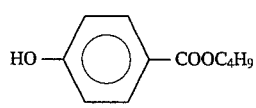

(Cpd-14) Preservative

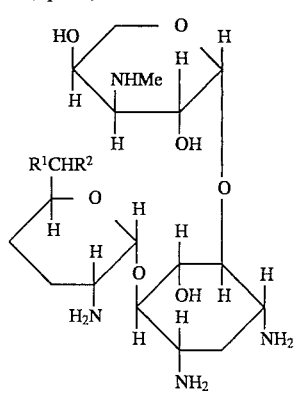

|   | $R^1$ | $R^2$ |
|---|---|---|
| a | —Me | —NHMe |
| b | —Me | —$NH_2$ |
| c | —H | —$NH_2$ |
| d | —H | —NHMe |

Mixture of a, b, c and d (weight ratio = 1:1:1:1)

(Cpd-15) Preservative

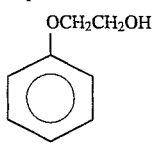

-continued
(UV-1) UV-Absorber
(1) 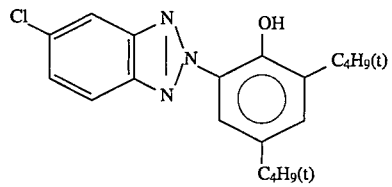
(2) 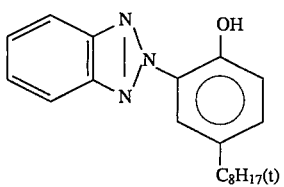
(3) 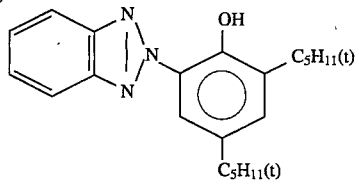
Mixture of (1), (2) and (3) (weight ratio = 1:3:4)
(UV-2) UV-Absorber
(1) 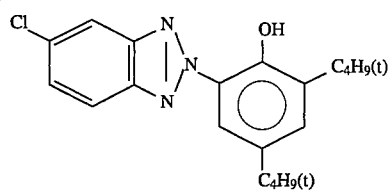
(2) 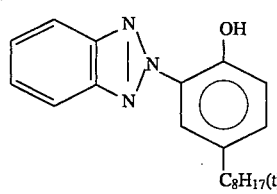
(3) 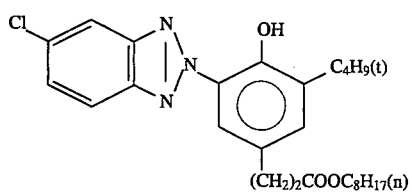
(4) 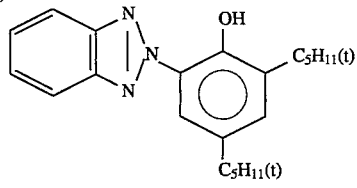
(5) 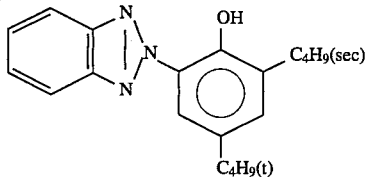
Mixture of (1), (2), (3), (4) and (5)
(weight ratio = 1:2:2:3:1)
(UV-3) UV-Absorber
(1) 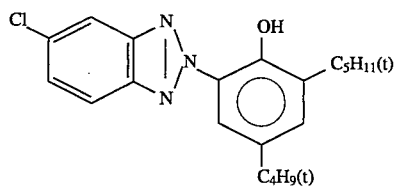
(2) 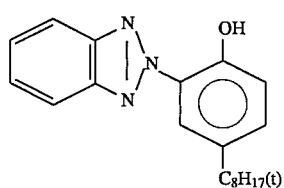

(3) 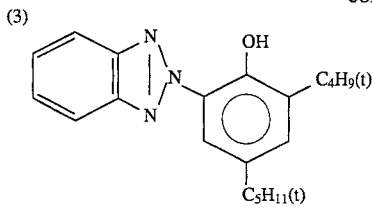

(4) 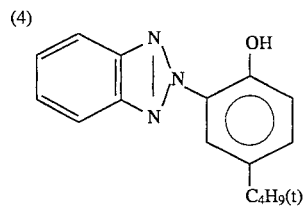

Mixture of (1), (2), (3) and (4)
(weight ratio = 1:3:2:1)

(Solv-1) Solvent

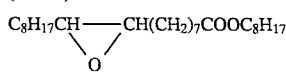

(Solv-2) Solvent

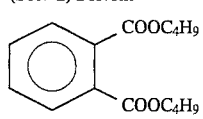

(Solv-3) Solvent

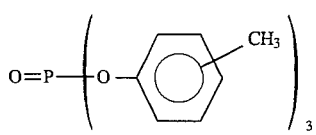

(Solv-3) Solvent $O=P(-O-C_6H_{13}(n))_3$ (Solv-5) Solvent

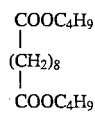
COOC$_4$H$_9$
|
(CH$_2$)$_8$
|
COOC$_4$H$_9$ (Solv-6) Solvent

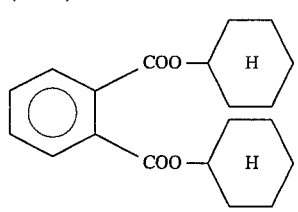

(Solv-7) Solvent

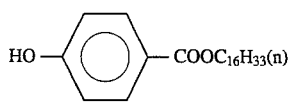

(Solv-8) Solvent

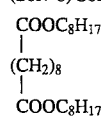
COOC$_8$H$_{17}$
|
(CH$_2$)$_8$
|
COOC$_8$H$_{17}$

A light-sensitive material with the above structure was prepared (Sample 1). By substituting C2 to C26 for the silver chloride-rich emulsion contained in the red-sensitive emulsion layer, coating solution sample Nos. 2 to 6 were prepared.

In order to investigate sensitivity and fogging of the thus-obtained coating solution sample Nos. 1 to 26, the following test was conducted.

The samples were first subjected to gradation exposure for sensitometry using a sensitometer (made by Fuji Photo Film Co, Ltd., model FWH, color temperature of s light source: 3200K) through a red filter. The exposure time 1/10 seconds and the level of exposure was 200 CMS.

After 10 seconds and 1 hour of exposure, the following color developing treatment was effected.

| Color Developing Treatment: | | |
|---|---|---|
| Process step | Temperature | Time |
| Color development | 35° C. | 45 sec. |
| Bleaching/fixing | 35° C. | 45 sec. |
| Rinsing (1) | 28–35° C. | 30 sec. |
| Rinsing (2) | 28–35° C. | 30 sec. |
| Rinsing (3) | 28–35° C. | 30 sec. |
| Drying | 70–80° C. | 60 sec. |

| -continued | |
|---|---|
| Color developing solution: | |
| Triethanolamine | 8.12 g |
| N,N-Diethylhydroxylamine | 4.93 g |
| Brightening agent (UVIT EX CK, product of Chiba Geigy) | 2.80 g |
| 4-Amino-3-methyl-N-ethyl-N-[β-(methanesulfonamide)ethyl]-p-phenylenediamine sulfate | 4.96 g |
| Sodium sulfite | 0.13 g |
| Potassium carbonate | 18.40 g |
| Potassium hydrogenearbonate | 4.85 g |
| EDTA.2Na.2H$_2$O | 2.20 g |
| Sodium chloride | 1.36 g |
| Water | to 1,000 ml |
| pH | 10.05 |
| Bleaching/fixing solution: | |
| Ammonium thiosulfate (54% by weight) | 103.0 ml |
| NH$_4$[EDTA.Fe] | 54.10 mg |
| Ammonium sulfite | 16.71 g |
| Glacial acetic acid | 8.61 g |
| Water | to 1,000 ml |
| pH | 5.44 |

Using the sample Nos. 1 to 26 which exposure and color development, reflection density of cyan was measured to obtained a characteristic curve. The sensitivity is expressed by the reciprocal of the amount of exposure (E) required for providing a density 0.5 higher than a fogging density (minimal color developing density). In this test, the sensitivity was represented in a relative value based on the sensitivity of Sample 1 (=100).

The latent image storability was evaluated by measuring the density difference of the samples processed after 10 seconds of exposure and 1 hour of exposure. The density difference is a difference between a density of the sample (A) processed after 10 seconds of exposure and a density of the sample (B) processed after 1 hour of in the amount of exposure required for providing a density 0.5 higher than the fogging density of the sample (A).

Positive values indicate latent sensitization, whereas negative values indicate regression of latent image. The results are shown in Table 7.

TABLE 7

| Sample Nos. | Fogging density | Sensitivity | Latent image storability | Notes |
| --- | --- | --- | --- | --- |
| 1 | 0.150 | 100 | +0.10 | Comparative examples |
| 2 | 0.200 | 200 | +0.08 | |
| 3 | 0.300 | 180 | +0.09 | |
| 4 | 0.200 | 190 | +0.08 | |
| 5 | 0.195 | 200 | +0.09 | |
| 6 | 0.120 | 200 | +0.12 | |
| 7 | 0.120 | 180 | +0.12 | |
| 8 | 0.110 | 190 | +0.12 | |
| 9 | 0.120 | 130 | +0.06 | |
| 10 | 0.200 | 260 | +0.04 | |
| 11 | 0.205 | 260 | +0.05 | |
| 12 | 0.210 | 260 | +0.05 | |
| 13 | 0.100 | 260 | +0.02 | Examples of the invention |
| 14 | 0.100 | 250 | +0.03 | |
| 15 | 0.105 | 255 | +0.02 | |
| 16 | 0.110 | 240 | +0.02 | |
| 17 | 0.110 | 240 | +0.02 | |
| 18 | 0.100 | 250 | +0.02 | |
| 19 | 0.100 | 250 | +0.03 | |
| 20 | 0.110 | 250 | +0.02 | |
| 21 | 0.110 | 230 | +0.02 | |
| 22 | 0.105 | 240 | +0.02 | |
| 23 | 0.100 | 255 | +0.02 | |
| 24 | 0.130 | 240 | +0.03 | |
| 25 | 0.120 | 260 | +0.02 | |
| 26 | 0.100 | 245 | +0.02 | |

From Table 7, the following are understood.

Different from Sample 1, Samples 2, 3, and 4 all contained a red-sensitive spectral sensitizing dye P1 which is not one defined in the present invention. Compared to sulfur sensitization, gold, selenium or sensitization provided enhanced sensitivity and slightly improved latent image storability with increased fogging density. Sample 5 was a combination of Sample 2 and only a thiosulfonic compound. Sample 5 exhibited almost the same effects as Sample 2. Samples 6, 7, 8, and 9 were directed to a co-use of a thiosulfonic compound and a sulfinic compound. Samples 6, 7, and 8 exhibited a high sensitivity and remarkably reduced fogging with worsened latent image storability. Sample 9 exhibited reduced fogging and good latent image storability, but sensitivity was lowered By contrast, Samples 10, 11, and 12 contained red-sensitive spectral sensitizing dyes defined in the present invention. From the obtained results, it is understood that latent image storability and sensitivity were improved with increased fogging density. In these cases, use of only one of either thiosulfonic compound or sulfinic compound was not successful in reducing fogging density.

By contrast, Samples 13 to 26, which contained P2, P3, or P4 defined in the present invention instead of red-sensitive spectral sensitizing dye P1, which underwent gold sensitization, selenium sensitization, or tellurium sensitization, and which contained both a thiosulfonic compound sulfinic compound, surprisingly satisfied the intended objects of high sensitivity, reduced fogging, and good latent image storability.

According to the present invention, even when silver chloride-rich emulsions are used, silver halide photographic light-sensitive materials can be obtained which exhibit high sensitivity and reduced variation in sensitivity during the period from exposure to development.

What is claimed is:

1. A silver halide photographic light-sensitive material comprising a support and at least one silver halide emulsion layer thereon, wherein at least one silver halide emulsion layer comprises silver chlorobromide emulsion particles containing 95 mol % or more of silver chloride, or silver chloride emulsion particles, said at least one silver halide emulsion layer further comprising at least one thiosulfonic compound of formula (X) and at least one sulfinic compound of formula (Y), and wherein the particles contained in the silver halide emulsion layer are sensitized by gold, selenium, or tellurium, and are spectrally sensitized by a red-sensitive methine dye represented by the following formula (I):

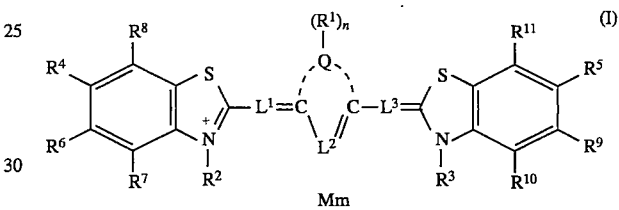

wherein Q represents a group of non-metal atoms necessary for forming a 5- or 6-membered ring, $R^1$, $R^2$, $R^3$, $R^4$, $R^5$, $R^6$, $R^7$, $R^8$, $R^9$, $R^{10}$, and $R^{11}$ each independently represents hydrogen atom or a substituent, provided that at least one of $R^1$, $R^2$ and $R^3$ is a group containing an aromatic group and that both $R^4$ and $R^5$ are not hydrogen atoms, $L^1$, $L^2$, and $L^3$ each independently represents a methine group, n is an integer from 0 to 6, M is a counter ion which neutralizes an electric charge, and m is 0 or 1, $$R^{21}-SO_2 S-M^{21} \qquad (X)$$

$$R^{22}-SO_2-M^{22} \qquad (Y)$$

wherein $R^{21}$ and $R^{22}$ each independently represents an aliphatic group, an aromatic group, or a heterocyclic group, and $M^{21}$ and $M^{22}$ each independently represents a cation.

2. A silver halide photographic light-sensitive material according to claim 1, wherein $R^{21}$ and $R^{22}$ are independently selected from linear, branched, a cyclic alkyl, alkenyl and alkynyl groups; a phenyl group; a naphthyl group; and 5- to 7-membered rings containing, as hereto atom(s), at least one atom selected from nitrogen, oxygen and sulfur atoms.

3. A silver halide photographic light sensitive material according to claim 1, wherein the aliphatic group, the aromatic group and the heterocyclic group of $R^{21}$ and $R^{22}$ are respectively substituted by at least one of alkoxy, aryl, alkyl, halogen, amino, carboxyl, hydroxyl and heterocyclic groups.

4. A silver halide photographic light-sensitive material comprising a support and at least one silver halide emulsion layer thereon, wherein at least one silver halide emulsion layer comprises silver chlorobromide emulsion particles containing 95 mol % or more of silver chloride, or silver chloride emulsion particles, said at least one silver halide emulsion layer further comprising at least one thiosulfonic compound of formula (X) and at least one sulfinic compound of formula (Y), and wherein the particles contained in the silver halide emulsion layer are sensitized by gold, selenium, or tellurium, and are spectrally sensitized by a red-sensitive methine dye represented by the following formula (I):

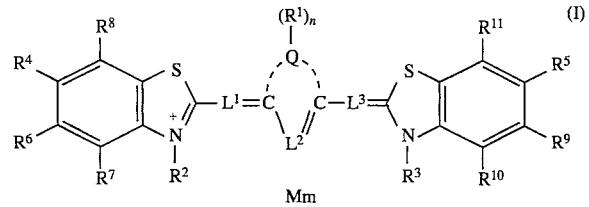

wherein Q represents a group of non-metal atoms necessary for forming a 5- or 6-membered ring, $R^1$ represents an alkyl group having 18 or less carbon atoms, an aryl group having 18 or less carbon atoms, a heterocyclic group having 18 or less carbon atoms, an alkenyl group having 10 or less carbon atoms, an alkynyl group having 6 or less carbon atoms; $R^2$ and $R^3$ each independently represents an alkyl group having 18 or less carbon atoms; $R^4$ and $R^5$ each independently represents a halogen atom, a hydroxyl, cyano, sulfo, carboxyl, nitro, alkyl, alkenyl, acyl, acyloxy, alkoxycarbonyl, carbamoyl, sulfamoyl, acylamino, alkoxy, aryloxy, alkylthio, arylthio, alkylsulfonamide, arylsulfonamide, ureido, alkylsulfonyl, arylsulfonyl, aryl, or heterocyclic group; $R^6$ to $R^{11}$ each independently represents a hydrogen or halogen atom, or a hydroxyl, cyano, sulfo, carboxyl, nitro, alkyl, alkenyl, acyl, acyloxy, alkoxycarbonyl, carbamoyl, sulfamoyl, acylamino, alkoxy, aryloxy, alkylthio, arylthio, alkylsufonamide, arylsulfonamide, ureido, alkylsulfonyl, arylsulfonyl, aryl, or heterocyclic group;

or $R^4$ may be linked with $R^6$ or $R^8$ to form a cyclohexene, aromatic, or heterocyclic ring and $R^5$ may be linked with $R^9$ or $R^{11}$ to form a cyclohexene, aromatic, or heterocyclic ring, provided that at least one of $R^1$, $R^2$ and $R^3$ is a group containing an aromatic group; and $L^1$, $L^2$ and $L^3$ each independently represents a methine group, n is an integer from 0 to 6, M is a counter ion which neutralizes an electric charge, and m is 0 or 1, $$R^{21}-SO_2 S-M^{21} \quad (X)$$

$$R^{22}-SO_2-M^{22} \quad (Y)$$

wherein $R^{21}$ and $R^{22}$ each independently represents an aliphatic group, an aromatic group, or a heterocyclic group, and $M^{21}$ and $M^{22}$ each independently represents a cation.

5. A silver halide photographic light-sensitive material according to claim 4, wherein $R^1$ is an unsubstituted alkyl, or aryl group.

6. A silver halide photographic light-sensitive material according to claim 4, wherein $R^2$ and $R^3$ each independently represents a methyl, ethyl, phenoxyethyl, 1-naphthoxyethyl, 2-naphthoxyethyl, 4-phenylphenoxyethyl, or methoxyethyl group.

7. A silver halide photographic light-sensitive material according to claim 4, wherein $R^4$ and $R^5$ each independently represents an alkyl group having 18 or less carbon atoms, an alkenyl group having 18 or less carbon atoms, a halogen atom, an acyl group having 8 or less carbon atoms, an acyloxy group having 8 or less carbon atoms, an alkoxycarbonyl group having 8 or less carbon atoms, a carbamoyl group having 8 or less carbon atoms, a sulfamoyl group having 8 or less carbon atoms, a carboxyl group, an alkylsulfonamide group having 8 or less carbon atoms, an acylamino group having 8 or less carbon atoms, an alkoxy group having 15 or less carbon atoms, an aryloxy group having 15 or less carbon atoms, an alkylthio group having 8 or less carbon atoms, an arylthio group having 15 or less carbon atoms, an arylsulfonamide group having 12 or less carbon atoms, a ureido group, an alkylsulfonyl group having 8 or less carbon atoms, an arylsulfonyl group having 15 or less carbon atom, an aryl group having 15 or less carbon atoms, a nitro group, a sulfo group, or a heterocyclic group having 15 or less carbon atoms.

8. A silver halide photographic light-sensitive material according to claim 4, wherein $R^4$ and $R^5$ each independently represents a methyl, ethyl, methoxy, or ethoxy group.

9. A silver halide photographic light-sensitive material according to claim 4, wherein $R^6$ to $R^{11}$ each independently represents a hydrogen atom, a methyl, ethyl, methoxy, or ethoxy group.

10. A silver halide photographic light-sensitive material according to claim 9, wherein $R^6$ to $R^{11}$ each independently represents a hydrogen atom.

11. A silver halide photographic light-sensitive material according to claim 4, wherein $R^{21}$ and $R^{22}$ are independently selected from linear, branched, and cyclic alkyl, alkenyl and alkynyl groups; a phenyl group; a naphthyl group; and 5- to 7-membered rings containing, as hetero atom(s), at least one atom selected from nitrogen, oxygen and sulfur atoms.

12. A silver halide photographic light-sensitive material according to claim 4, wherein the aliphatic group, the aromatic group and the heterocyclic group of $R^{21}$ and $R^{22}$ each has a substituent selected from alkoxy, aryl, alkyl, halogen, amino, carboxyl, hydroxyl, and heterocyclic groups.

13. A silver halide photographic light-sensitive material according to claim 4, wherein the thiosulphonic compound is selected from $$C_2H_5SO_2SNa \quad (X-2)$$

$$C_8H_{17}SO_2SNa \quad (X-6)$$

$$C_{16}H_{33}SO_2SNa \quad (X-10)$$

(X-16)

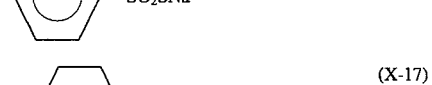
(X-17)

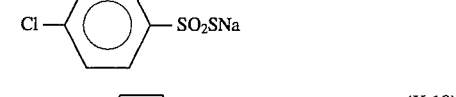
(X-18)

and

(X-20)

14. A silver halide photographic light-sensitive material according to claim 4, wherein the sulfinic compound is selected from $$C_2H_5SO_2.Na \quad (Y-2)$$

$$C_8H_{17}SO_2.Na \quad (Y-6)$$

-continued
C₁₆H₃₃SO₂·Na (Y-10)
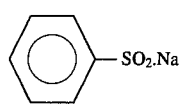 (Y-16)
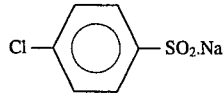 (Y-17)
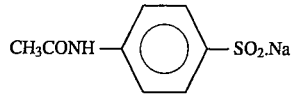 (Y-18)
and
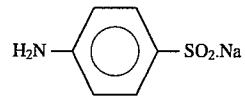 (Y-20)
15. A silver halide photographic light-sensitive material according to claim 4, wherein the methine dye represented by formula (I) is selected from
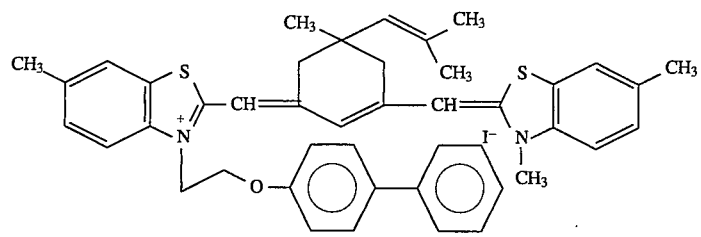 E-5
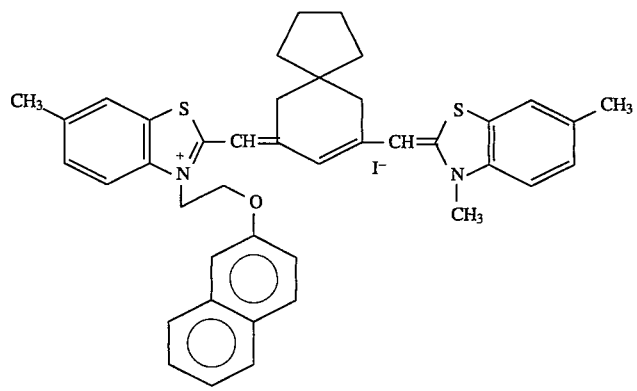 E-6
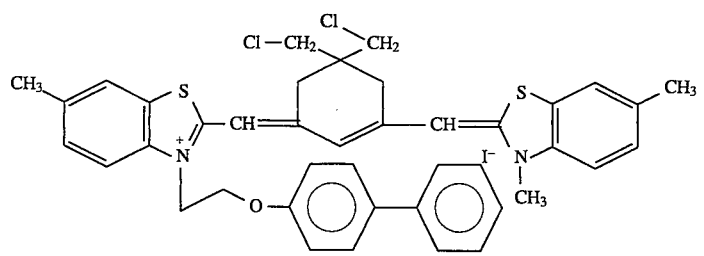 E-10
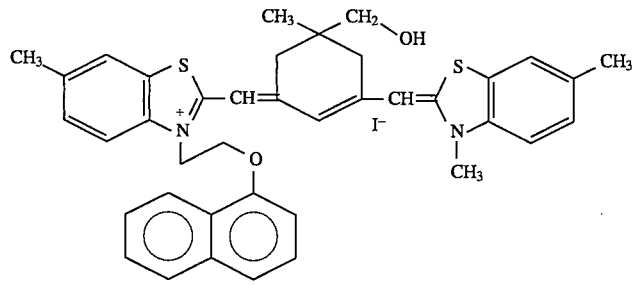 E-12

-continued

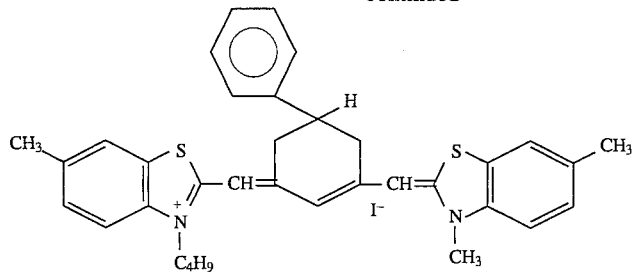
G-1

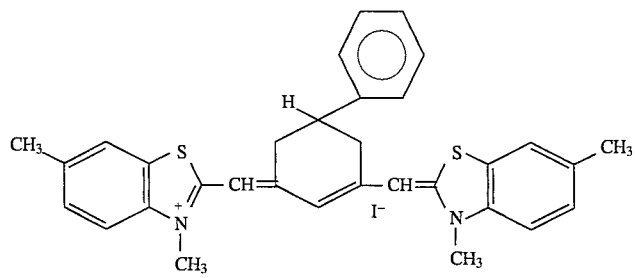
G-3

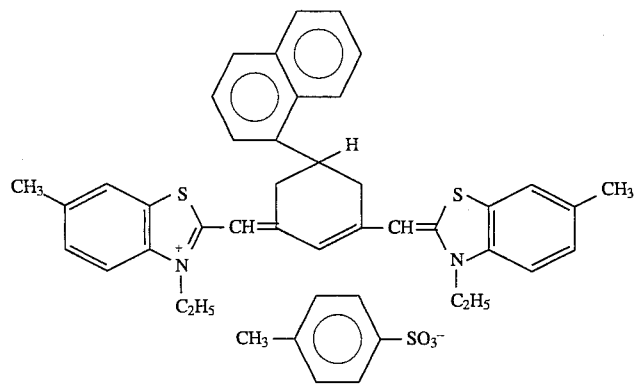
G-4

16. A silver halide photographic light-sensitive material according to claim 4, wherein the emulsion particles spectrally sensitized by the red-sensitive methine dye represented by formula (I) are sensitized by gold.

17. A silver halide photographic light-sensitive material according to claim 4, wherein the amount of the thiosulfonic compound is from $1\times10^{-6}$ to $3\times10^{-4}$ mols per mol of silver halide.

18. A silver halide photographic light-sensitive material according to claim 4, wherein the amount of the sulfinic compound is from $1\times10^{-6}$ to $3\times10^{-4}$ mols per mol of silver halide.

19. A silver halide photographic light-sensitive material according to claim 4, wherein the amount of the the red-sensitive methine dye represented by formula (I) is from $0.5\times10^{-6}$ to $1.0\times10^{-2}$ mols per mol of silver halide.

20. A silver halide photographic light-sensitive material according to claim 4, wherein $R^1$ in formula (I) is a phenyl or naphthyl group.

21. A silver halide photographic light-sensitive material according to claim 4, wherein $R^2$ or $R^3$ in formula (I) is a 1-naphthoxyethyl or p-phenylphenoxyethyl group.

\* \* \* \* \*